United States Patent
Rastegar

(10) Patent No.: US 12,352,550 B2
(45) Date of Patent: Jul. 8, 2025

(54) INERTIAL IGNITERS FOR LOW-G AND LONG DURATION FIRING ACCELERATION MUNITIONS AND THE LIKE

(71) Applicant: Omnitek Partners LLC, Ronkonkoma, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 17/947,148

(22) Filed: Sep. 18, 2022

(65) Prior Publication Data

US 2023/0087616 A1    Mar. 23, 2023

Related U.S. Application Data

(60) Provisional application No. 63/246,192, filed on Sep. 20, 2021.

(51) Int. Cl.
| | |
|---|---|
| *F42C 15/24* | (2006.01) |
| *F42C 9/02* | (2006.01) |
| *F42C 15/20* | (2006.01) |

(52) U.S. Cl.
CPC ............. *F42C 15/24* (2013.01); *F42C 9/02* (2013.01); *F42C 15/20* (2013.01)

(58) Field of Classification Search
CPC .... F42C 9/00; F42C 9/02; F42C 15/24; F42C 15/00; F42C 15/005; F42C 15/20; F42C 15/26

USPC ........ 102/216, 247, 249, 251, 252, 254, 256
See application file for complete search history.

(56) References Cited

U.S. PATENT DOCUMENTS

| | | | | |
|---|---|---|---|---|
| 3,610,154 | A * | 10/1971 | Brown | F02K 9/95 102/202 |
| 7,437,995 | B2 * | 10/2008 | Rastegar | C06C 9/00 102/253 |
| 7,587,980 | B2 * | 9/2009 | Rastegar | F42C 15/24 102/253 |
| 7,832,335 | B2 * | 11/2010 | Rastegar | F42C 15/34 102/253 |
| 8,550,001 | B2 * | 10/2013 | Rastegar | F42C 15/24 102/253 |
| 8,931,413 | B2 * | 1/2015 | Rastegar | F42C 15/24 102/221 |
| 9,160,009 | B2 * | 10/2015 | Rastegar | F42C 15/24 |
| 12,123,696 | B2 * | 10/2024 | Rastegar | F42C 15/24 |
| 2024/0068789 | A1 * | 2/2024 | Rastegar | F42C 15/24 |

* cited by examiner

*Primary Examiner* — James S Bergin

(57) ABSTRACT

An inertial mechanism including an activating mechanism and a time delay mechanism coupled to the activating mechanism for delaying a time in which the activating mechanism is activated after a predetermined acceleration profile occurs. Where a coupling of the time delay mechanism with the activating mechanism to activate the activating mechanism initially moves away from the coupling when the predetermined acceleration profile occurs before the coupling occurs after a time delay.

9 Claims, 32 Drawing Sheets

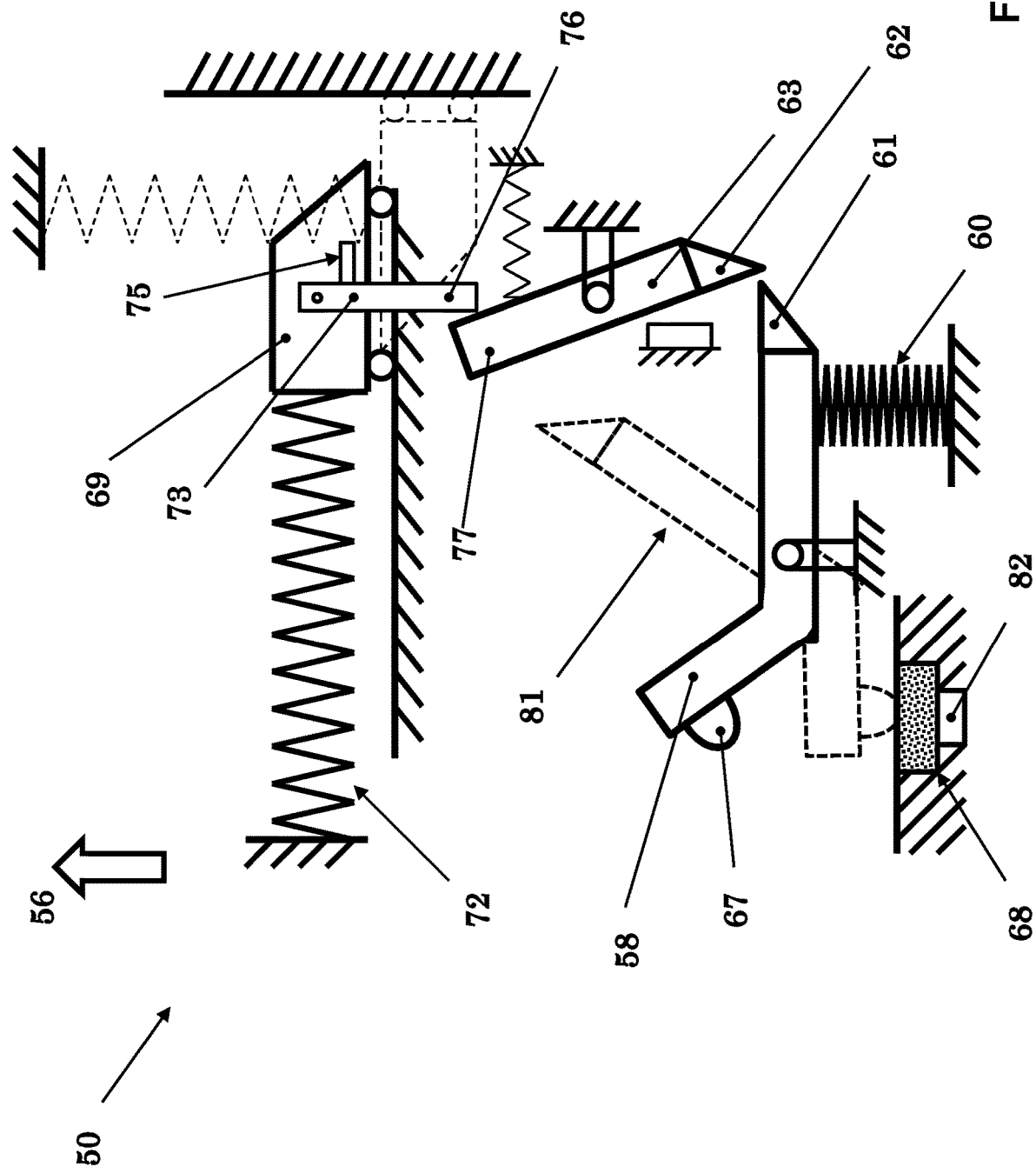

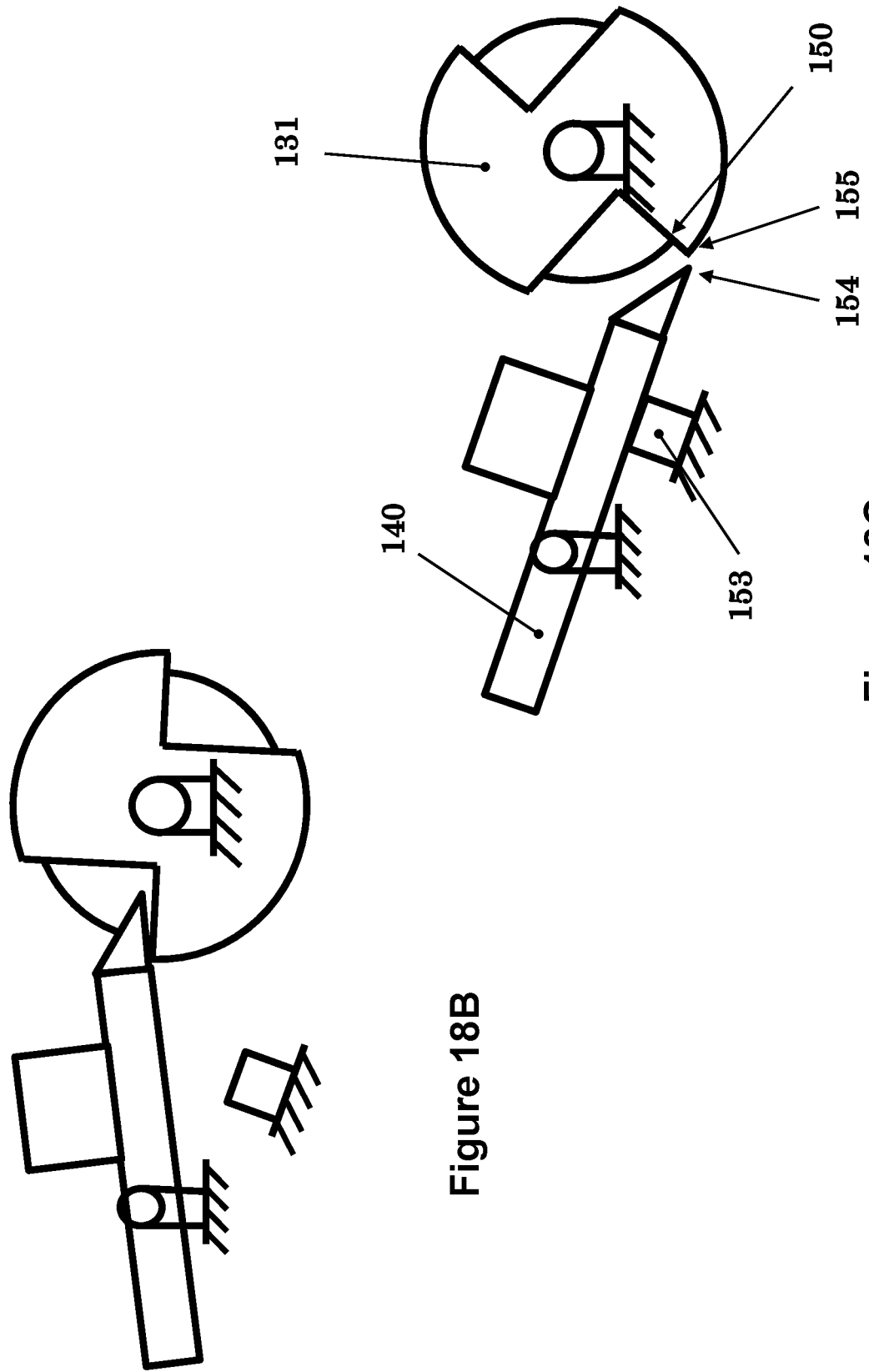

INERTIAL IGNITERS FOR LOW-G AND LONG DURATION FIRING ACCELERATION MUNITIONS AND THE LIKE

CROSS-REFERENCE TO RELATED APPLICATION

This application claims the benefit of priority to U.S. Provisional Application No. 63/246,192, filed on Sep. 20, 2021, the entire contents of which is incorporated herein by reference.

BACKGROUND

1. Field

The present disclosure relates generally to mechanical inertial igniters, and more particularly to compact, reliable mechanical inertial igniters for activating reserve batteries and the like in munitions with relatively low-G and long duration firing acceleration.

2. Prior Art

Reserve batteries of the electrochemical type are well known in the art for a variety of uses where storage time before use is extremely long. Reserve batteries are in use in applications such as batteries for gun-fired munitions including guided and smart, mortars, fusing mines, missiles, and many other military and commercial applications. The electrochemical reserve-type batteries can in general be divided into two different basic types.

The first type includes the so-called thermal batteries, which are to operate at high temperatures. Unlike liquid reserve batteries, in thermal batteries the electrolyte is already in the cells and therefore does not require a release and distribution mechanism such as spinning. The electrolyte is dry, solid and non-conductive, thereby leaving the battery in a non-operational and inert condition. These batteries incorporate pyrotechnic heat sources to melt the electrolyte just prior to use in order to make them electrically conductive and thereby making the battery active. The most common internal pyrotechnic is a blend of Fe and $KClO_4$. Thermal batteries utilize a molten salt to serve as the electrolyte upon activation. The electrolytes are usually mixtures of alkali-halide salts and are used with the Li(Si)/$FeS_2$ or Li(Si)/$CoS_2$ couples. Some batteries also employ anodes of Li(Al) in place of the Li(Si) anodes. Insulation and internal heat sinks are used to maintain the electrolyte in its molten and conductive condition during the time of use.

Thermal batteries have long been used in munitions and other similar applications to provide a relatively large amount of power during a relatively short period of time, mainly during the munitions flight. Thermal batteries have high power density and can provide a large amount of power as long as the electrolyte of the thermal battery stays liquid, thereby conductive. The process of manufacturing thermal batteries is highly labor intensive and requires relatively expensive facilities. Fabrication usually involves costly batch processes, including pressing electrodes and electrolytes into rigid wafers, and assembling batteries by hand. The batteries are encased in a hermetically sealed metal container that is usually cylindrical in shape.

The second type includes the so-called liquid reserve batteries in which the electrodes are fully assembled for cooperation, but the liquid electrolyte is held in reserve in a separate container until the batteries are desired to be activated. In these types of batteries, by keeping the electrolyte separated from the battery cell, the shelf life of the batteries is essentially unlimited. The battery is activated by transferring the electrolyte from its container to the battery electrode compartment (hereinafter referred to as the "battery cell").

A typical liquid reserve battery is kept inert during storage by keeping the aqueous electrolyte separate in a glass or metal ampoule or in a separate compartment inside the battery case. The electrolyte compartment may also be separated from the electrode compartment by a membrane or the like. Prior to use, the battery is activated by breaking the ampoule or puncturing the membrane allowing the electrolyte to flood the electrodes. The breaking of the ampoule or the puncturing of the membrane is achieved either mechanically using certain mechanisms usually activated by the firing setback acceleration or by the initiation of certain pyrotechnic material. In these batteries, the projectile spin or a wicking action is generally used to transport the electrolyte into the battery cells.

Reserve batteries are inactive and inert when manufactured and become active and begin to produce power only when they are activated. Reserve batteries have the advantage of very long shelf life of up to 20 years that is required for munitions applications.

Thermal batteries generally use some type of initiation device (igniter) to provide a controlled pyrotechnic reaction to produce output gas, flame or hot particles to ignite the heating elements of the thermal battery. There are currently two distinct classes of igniters that are available for use in thermal batteries. The first class of igniter operates based on electrical energy. Such electrical igniters, however, require electrical energy, thereby requiring an onboard battery or other power sources with related shelf life and/or complexity and volume requirements to operate and initiate the thermal battery. The second class of igniters, commonly called "inertial igniters," operate based on the firing acceleration. The inertial igniters do not require onboard batteries for their operation and are thereby often used in munitions applications such as in gun-fired munitions and mortars.

Inertial igniters are also used to activate liquid reserve batteries through the rupture of the electrolyte storage container or membrane separating it from the battery core. The inertial igniter mechanisms may also be used to directly rupture the electrolyte storage container or membrane.

Inertial igniters used in munitions must be capable of activating only when subjected to the prescribed setback acceleration levels and durations and not when subjected to any of the so-called no-fire conditions such as accidental drops or transportation vibration or the like. This means that safety in terms of prevention of accidental ignition is one of the main concerns in inertial igniters.

In recent years, new improved chemistries and manufacturing processes have been developed that promise the development of lower cost and higher performance thermal and liquid reserve batteries that could be produced in various shapes and sizes, including their small and miniaturized versions.

Mechanical inertial igniters have been developed for many munitions applications in which the munitions are subjected to relatively high firing setback accelerations of generally over 1,000 Gs with long enough duration that provides enough time for the inertial igniter to activate the igniter pyrotechnic material, which may consist of a primer or an appropriate pyrotechnic material that is directly applied to the inertial igniter as described in previous art (for example, U.S. Pat. Nos. 9,160,009, 8,550,001, 8,931,413, 7,832,335 and 7,437,995, the contents of which are hereby considered included by reference).

In some munition applications, the setback acceleration duration is not long enough for inertial igniters without preloaded springs to either activate or to provide the required percussion impact to initiate the pyrotechnic material of the device (such as a percussion primer or directly applied pyrotechnic materials).

In some other munition applications, the setback acceleration level is not high enough and/or the striker mass of the inertial igniter cannot be made large enough due to the inertial igniter size limitations and/or the striker mass cannot be provided with long enough travel path due to the inertial igniter height limitations so that the striker mass cannot gain enough speed to impact the percussion primer or the directly applied pyrotechnic material with the required mechanical energy to initiate them.

For such applications, the mechanical inertial igniter must be provided with a source of mechanical energy to accelerate the striker element of the inertial igniter to gain enough kinetic energy to initiate the provided percussion primer or the directly applied pyrotechnic material of the device.

In some other munition applications, the setback acceleration level is low, sometimes in the order of 10-20 G and its duration is relatively long, sometimes of the order of 50-100 msec or more that must be differentiated from other accidental no-fire conditions.

Inertia-based igniters must provide two basic functions. The first function is to provide the capability to differentiate the accidental events such as drops over hard or soft surfaces or transportation vibration or the like, i.e., all no-fire events, from the prescribed firing setback acceleration (all-fire) event. In inertial igniters, this function is performed by keeping the device striker fixed to the device structure during all no-fire events until the prescribed firing setback acceleration event is detected. At which time, the device striker is released.

The second function of an inertia-based igniter is to provide the means of accelerating the device striker to the kinetic energy level that is needed to initiate the provided percussion primer or other device pyrotechnic material as it (hammer element) strikes an "anvil" over and around which the pyrotechnic material is provided. In general, the striker is provided with a relatively sharp point which strikes the pyrotechnic material covering a raised surface over the anvil, thereby allowing a relatively thin pyrotechnic layer to be pinched to achieve a reliable ignition mechanism. In many applications, percussion primers are directly mounted on the anvil side of the device and the required initiation pin is machined or attached to the striker to impact and initiate the primer. In either configuration, exit holes are provided on the inertial igniter to allow the reserve battery activating flames and sparks to exit.

Two basic methods are currently available for accelerating the device striker to the needed velocity (kinetic energy) level. The first method is based on allowing the setback acceleration to accelerate the striker mass following its release. This method requires the setback acceleration to be relatively high and have long enough duration to allow for the time that it takes for the striker mass to be released and for the striker mass to be accelerated to the required velocity before pyrotechnic impact. In addition, the striker mass must have enough space to travel so that it could gain the required velocity, which means that the inertial igniter must be allowed to have the required height (here, height is intended to be measured in the direction of the firing acceleration). As a result, this method is generally applicable to larger caliber and mortar munitions in which the setback acceleration is high, and duration is relatively long and in the order of 10-15 milliseconds. This method is also suitable for impact induced initiations in which the impact induced decelerations are high and have relatively long duration.

The second method relies on potential energy stored in a spring (elastic) element, which is then released upon the detection of the prescribed all-fire conditions. This method is suitable for use in munitions that are subjected to very low firing acceleration levels, such as in the order of 10-20 G, or very short setback accelerations, such as those of the order of 1-2 milliseconds, or when the setback acceleration level is low and space constraints does now allow the use of relatively large striker mass or where the height limitations of the available space for the inertial igniter does not provide enough travel distance for the inertial igniter striker to gain the required velocity and thereby kinetic energy to initiate the pyrotechnic material.

Inertia-based igniters must therefore comprise two components so that together they provide the mechanical safety, the capability to differentiate the prescribed all-fire condition from all no-fire conditions, and to provide the required striking action to achieve ignition of the pyrotechnic elements. The function of the safety system is to keep the striker element in a relatively fixed position until the prescribed all-fire condition (or the prescribed impact induced deceleration event) is detected, at which time the striker element is to be released, allowing it to accelerate toward its target under the influence of the remaining portion of the setback acceleration or the potential energy stored in its spring (elastic) element of the device. The ignition itself may take place because of striker impact, or simply contact or proximity. For example, the striker may be akin to a firing pin and the target akin to a standard percussion cap primer. Alternately, the striker-target pair may bring together one or more chemical compounds whose combination with or without impact will set off a reaction resulting in the desired ignition.

An example of the above second method of initiating the inertial igniter that relies on potential energy stored in a spring (elastic) element, which is then released upon the detection of the prescribed all-fire conditions, is the prior art inertial igniter embodiment 300 of FIGS. 1-5.

The full isometric view of the prior art inertial igniter embodiment 300 is shown in FIG. 1. The inertial igniter 300 is constructed with igniter body 301 and the cap 302 (FIG. 3), which is attached to the body 301 with the screws 303 (FIG. 3) through the tapped holes 336. When needed, an access hole 304 is provided for an arming pin to prevent accidental activation of the inertial igniter while handling or accidental drop or the like before assembly into the intended reserve battery or the like.

The top view of the inertial igniter 300 of FIG. 1 with its cap 302 removed is shown in the schematic of FIG. 2. The cross-sectional view B-B (FIG. 2) of the inertial igniter 300 is also shown in the schematic of FIG. 3. In the cross-sectional view of FIG. 3, the cap 302 of the inertial igniter 300 is also shown. In the top view of FIG. 2, the release lever 318 and its rotary joint pin 319 (shown in FIGS. 1 and 3) and striker mass engagement pin 321 as shown engaged with the provided surface on the striker mass 305 (see also FIG. 3) are shown.

As can be seen in the top view of FIG. 3 of the inertial igniter with the cap 302, the inertial igniter is provided with the striker mass 305, which is rotatable about the axis of the shaft 307. The striker mass 305 and shaft 307 assembly is shown in the cross-sectional view A-A (see FIG. 2) of FIG.

4. As can be seen in the cross-sectional view A-A of FIG. 4, the striker mass 305 is free to rotate about the shaft 307 by the provided clearance in the passing hole 313 in the body of the striker mass 305. On both sides of the striker mass 305, bushings 306 are provided to essentially fill the gap between the shaft 307 and both wound sides of the torsion spring 309. The bushings 306 are provided with enough clearance with the torsion spring 309 to allow its free rotational movement with minimal friction. The bushings 306 are also provided to constrain radial movement of the torsion spring 309 as it is preloaded and released to activate the inertial igniter as described later.

The shaft 307 is mounted onto the inertial igniter body 301 through the holes 308 in the wall 314 of the inertial igniter body, FIGS. 1 and 4. The shaft 307 is fitted in the holes 308 tightly to prevent it from sliding out of the inertial igniter body.

The two wound halves of the torsional spring 309 are mounted over the shaft 307 over the sleeves 306 as can be seen in the top view of FIG. 2 and the cross-sectional view of FIG. 4, with the "U" section 310 of the torsion spring 309 engaging the provided mating surface 311 of the striker mass 305 as can be seen in the top view of FIG. 2 and more clearly in the cross-sectional view of FIG. 3. The free legs 312 of the torsion spring 309 rests against the bottom surface 315 as the torsion spring 309 is preloaded in its pre-activation state as shown in FIG. 4. Alternatively, the free legs 312 of the torsion spring 309 may be positioned to rest against the inside surface of the cap 302 (not shown).

In the cross-sectional view of the inertial igniter 300 shown in its pre-activation state in FIG. 3, the striker mass release lever 318 and its striker mass engagement pin 321 are shown in their pre-loaded state. It is appreciated by those skilled in the art that in the configuration shown in FIG. 3, the clockwise rotation of the striker mass (as seen in the view of FIG. 3) by the preloaded torsional spring 309 is prevented by the striker mass engagement pin 321 of the release lever 318 as described later. It is noted that in the pre-activation configuration shown in the cross-sectional view of FIG. 3, the free-ends 312 of the torsional spring 309 are pressing against the bottom surface 315 of the inertial igniter body 301, FIG. 4, on one end and tend to rotate the striker mass 305 in the clockwise direction about the shaft 307 as viewed in the schematic of FIG. 3 via its "U" shaped portion, which is engaged with matching surfaces 311 of the striker mass 305, FIG. 2, on the other end. In the pre-activation configuration of FIG. 3, the striker mass engagement pin 321 of the release lever 318 is shown to prevent clockwise rotation of the striker mass 305 as described below, thereby forcing the striker mass 305 to remain in it illustrated configuration, thereby keeping the torsional spring 309 in its pre-loaded state.

As can be seen in the cross-sectional schematic of FIG. 3, which shows the state of the inertial igniter 300 in its pre-activation state, the inertial igniter is provided with a release lever 318. The release lever 318 is connected to the inertial igniter body 301 via the rotary joint provided by the pin 319 passing through the hole 320 across the length of the release lever 318—along the line perpendicular to the plane of the cross-sectional view of FIG. 3. The pin 319 is firmly mounted in the holes 328 (FIG. 1), while the mating hole 320 in the release lever 318 is provided with minimal clearance to allow for unimpeded rotation (clockwise and counterclockwise as viewed in the cross-sectional view of FIG. 3). Alternatively, ball bearings or low friction bushings may be used at this joint.

The striker mass engagement pin 321 is mounted onto the release lever 318 as shown in the schematic of FIG. 1, in which the protruding sides 329 of the release lever is provided with the holes 322, in which the striker engagement pin 321 is assembled. In the schematic of FIG. 1, the striker mass engagement pin 321 in shown to be mounted in the provided holes 322 of the release lever 318 via ball bearings 323 to minimize resistance to its rotation relative to the release lever 318. As it is described later in this enclosure, the striker engagement pin 321 rotation relative to the release lever 318 is desired to generate minimal resistance due to friction between their mating surfaces to minimize variation in the inertial igniter activation acceleration levels.

In the pre-activation configuration of the inertial igniter 300 shown in the schematic of FIG. 3, the striker engagement pin 321 of the release lever 318 is shown to be positioned over the provided curved surfaces 316 (FIG. 3 and under pin 321 in FIG. 2), resisting the force applied by the preloaded torsional spring 309 via the striker mass 305, thereby keeping the inertial igniter in its pre-activation state shown in FIG. 3.

The force applied by the striker mass 305 to the striker mass engagement pin 321 via the striker mass surfaces 316 is prevented from rotating the release lever in the counter-clockwise direction and thereby pushing the striker mass engagement pin 321 to the left as seen in the cross-sectional view of FIG. 3, which would then release the striker mass 305 to rotate in the clockwise direction by the preloaded torsional spring 309. This is accomplished using one or more of the following methods. The features enabling these methods to maintain the striker mass 305 in its pre-activation state shown in FIG. 3 are also used to configure inertial igniters to the prescribed no-fire and all-fire condition requirements of each application.

The first method that can be used to keep the inertial igniter in its pre-activation state is based on the use of the curvature of the striker mass surfaces 316 that engages the striker mass engagement pin 321 of the release lever 318, FIG. 3. In this method, lips 317 are provided on the striker mass surfaces 316 as shown in the schematic of FIG. 3. As a result, for the striker mass engagement pin 321 of the release lever 318 to disengage the striker mass surfaces 316, i.e., to rotate in the counterclockwise direction as viewed in FIG. 3, the striker mass engagement pin must force rotation of the striker mass 305 in the counterclockwise direction as viewed in FIG. 3, i.e., it must increase the preloading level of the torsional spring 309. As a result, the inertial igniter would stay in its pre-activation state shown in FIG. 3.

The second method that can be used to keep the inertial igniter in its pre-activation state is based on the provision of at least one elastic element (spring) element to bias the release lever 318 in the direction of clockwise rotation. As an example, the biasing preloaded compressive spring 325 may be positioned between the release lever 318 and the bottom surface 315 of the inertial igniter body 301 as shown in the schematic of FIG. 3. The spring 325 can be positioned in a pocket 324 to keep from moving out of position. It is appreciated by those skilled in the art that many different spring types may also be used for the indicated clockwise rotation biasing of the release lever 318 as seen in the view of FIG. 3.

It is noted that the acceleration of the inertial igniter 300 in the direction of the arrow 330 shown in FIG. 3 would act on the inertia of the release lever 318 and apply a downward force at its center of mass equal to the product of its mass and the acceleration in the direction of the arrow 330, which would tend to rotate the release lever 318 in the counterclockwise direction. The rotation of the release lever 318 is, however, resisted by the biasing force of the preloaded compressive spring 325 and the required counterclockwise rotation of the striker mass 305 in order for the striker mass engagement pin 321 to be able to travel leftward due to the rotation of the release lever 318 about the pin 319. It is appreciated that for the pin 321 to move to the left in the direction of releasing the striker mass 305, it must push the lips 317 of the striker mass surfaces 316 downwards, thereby forcing the striker mass 305 to undergo the required amount of counterclockwise rotation, which would in turn provide resistance to counterclockwise rotation of the release lever 318.

It is therefore appreciated that the level of acceleration of the inertial igniter 300 that is needed for the release lever 318 to rotate the required amount in the counterclockwise direction for the striker mass engagement pin 321 to disengage the striker mass 305 and thereby allow it to be freely accelerated in the clockwise direction can be varied by varying one or more of the following parameters to match a prescribed all-fire acceleration level and duration thresholds. The all-fire acceleration level threshold can be reduced by varying one or more of the following inertial igniter parameters: (a) reducing the preloading of the compressive spring 325 and its rate, (b) increasing the moment of inertia of the release lever 318 about the axis of the 319, (c) reducing the extent of the lips 317, i.e., the amount of counterclockwise rotation of the striker mass 305 that is required for striker mass engagement pin 321 to release the striker mass; and (d) by positing the pin 319 laterally relative to the striker mass engagement pin 321 as viewed in FIG. 3 in the pre-activation configuration of the inertial igniter 300 to minimize the amount of counterclockwise rotation of the striker mass 305 that is required for the striker mass engagement pin 321 to release the striker mass. The all-fire duration threshold for the activation of the inertial igniter 300 at a prescribed acceleration level can be reduced by varying one or more of the following inertial igniter parameters: (a) by reducing the preloading of the compressive spring 325 and its rate; (b) by increasing the moment of inertia of the release lever 318 about the axis of the 319; and (3) varying the striker mass engagement pin 321 and the striker mass surfaces 316 and the lips 317 geometries to reduce the amount of counterclockwise rotation of the release lever 318 that is required for the striker mass 305 to be released. The opposite changes in the inertial igniter 300 parameters would have the opposite effect.

Now, when the inertial igniter 300 is accelerated in the direction of the arrow 330, FIG. 3, as the prescribed acceleration level threshold and duration is reached, the release lever 318 is rotated in the counterclockwise direction until the striker mass engagement pin 321 moves far enough to the left and pass over the lips 317, thereby releasing the striker mass 305. At this point, the stored mechanical (potential) energy in the torsional spring 309 would begin to rotationally accelerate the striker mass 305 in the clockwise direction about the axis of the shaft 307. The striker mass 305 is thereby accelerated in the clockwise direction until the percussion pin 331 strikes the percussion primer 332 and causing it to initiate as shown in the cross-sectional view of FIG. 5. It is noted that in the cross-sectional view of FIG. 5, the inertial igniter cap 302 containing the percussion primer 332 with the provided flame exit hole 333 are shown. The release lever 318, FIG. 3, in its released position as indicated by the numeral 337 is also shown in the cross-sectional view of FIG. 5, thereby providing a complete cross-sectional view of the inertial igniter 300 in its post-activation state. In this state, the biasing elastic element (spring) 325, FIG. 3, is shown to be compressively deformed and indicated by the numeral 328.

Once the percussion primer 332 is initiated, the flames and sparks generated by the initiation of the primer 332 would then exit from the hole 333 in the inertial igniter cap 302, FIGS. 3 and 5. The cross-sectional view of the inertial igniter 300 in this post-activation configuration is shown in FIG. 5. The hole 333 at the center of the cap 302, FIG. 3, is provided for the exiting primer or other pyrotechnic material generated flames and sparks upon the inertial ignite activation.

It is appreciated that the pre-activation torsional preloading level of the torsional spring 309 and its spring rate must be high enough and the range of rotation of the striker mass 305 from its pre-activation (FIG. 3) to its post-activation positions must be large enough so that the striker mass 305 would gain enough kinetic energy after its release so that as it impacts the percussion primer 332 (FIG. 5) as was previously described it would initiate the percussion primer.

It is also appreciated by those skilled in the art that the percussion primer or other pyrotechnic material that is to be initiated to activate the reserve battery must be kept sealed from elements to ensure proper operation of the percussion primer or the pyrotechnic material that is used and to ensure the require shelf life of the assembled reserve battery and the striker mechanism.

The shortcomings of the prior art mechanical inertial igniters are related to their following limitations for the following applications in munitions and the like:

1. They are not capable of detecting relatively long duration firing accelerations of the order of 50-100 milliseconds or longer,
2. Their required height and overall size are generally significantly larger than are desired for munitions applications, such as when the firing acceleration is low,
3. They are not capable of detecting long duration firing or impact accelerations when the acceleration levels are relatively high.

In addition, due to the unavoidable friction related forces, the difference between the no-fire impulse due to the acceleration level and duration acting on the striker mass release mechanism and the all-fire impulse due to the setback acceleration level and its duration acting on the striker mass release mechanism must be large enough to ensure the high reliability that is required for the proper operation of the inertial igniters. In most munitions, operational reliability requirement of sometimes over 99.9 percent at 95 percent confidence level is common and in certain cases must be even higher. In munitions in which the difference between no-fire and all-fire acceleration levels acting on the striker mass release mechanism is relatively small, the friction forces between the relevant moving parts of the inertial igniter must therefore be minimized.

It is also appreciated by those skilled in the art that currently available G-switches of different type that are used for opening or closing an electrical circuit are configured to perform this function when they are subjected to a prescribed acceleration level without accounting for the duration of the acceleration level. As such, they suffer from the shortcoming of being activated accidentally, e.g., when the object in which they are used is subjected to short duration shock loading such as could be experienced when dropped on a hard surface as was previously described for the case of inertial igniter used in munitions.

When used in applications such as in munitions, it is highly desirable for G-switches to be capable to differentiate the accidental and short duration shock (acceleration) events such as those experienced by dropping on hard and soft surfaces, i.e., all no-fire conditions, from significantly longer duration firing setback (shock) accelerations, i.e., all-fire condition. Such G-switches should activate when firing setback (all-fire) acceleration and its duration results in an impulse level threshold corresponding to the all-fire event has been reached, i.e., they must operate as an "impulse switch". This requirement necessitates the employment of safety mechanisms like those used in the inertial igniter embodiments, which can allow the switch activation only when the firing setback acceleration level and duration thresholds have been reached. The safety mechanism can be thought of as a mechanical delay mechanism, after which a separate electrical switch mechanism is actuated or released to provide the means of opening or closing at least one electrical circuit.

SUMMARY

A need therefore exists for methods to configure mechanical inertial igniters for munitions applications and the like in which the setback acceleration levels are low, sometimes in the order of 10-20 Gs, while its duration is long, sometimes in the order of 50-100 milliseconds or more, and due to space limitations, the inertial igniter must be relatively compact and small. In addition, the inertial igniters are required to be highly reliable, for example, have better than 99.9 percent reliability with 95 percent confidence level.

A need also exists for mechanical inertial igniters that are developed based on the above methods and that can satisfy the safety requirement of munitions, i.e., the no-fire conditions, such as accidental drops and transportation vibration and other similar events.

A need therefore exists for novel miniature mechanical inertial igniters for reserve batteries such as thermal and liquid reserve batteries used in munitions such as rockets and missiles and gun-fired munitions and mortars and the like, that could be used in fuzing and other similar applications, that are safe (i.e., satisfy the munitions no-fire conditions), are small, and that can be used in applications in which the setback acceleration level is low (for example, tens of Gs) and/or the setback acceleration duration is long (for example, in the order of 50-100 milliseconds or more).

A need also exists for mechanical inertial igniters that are developed based on the above methods and that can satisfy the safety requirement of munitions, i.e., the no-fire conditions, such as accidental drops and transportation vibration and other similar events, and that once subjected to such accidental conditions, its mechanisms remains functional and reset to or close to its configuration prior to experiencing such accidental (no-fire) events.

To ensure safety and reliability, inertial igniters should not initiate during acceleration events which may occur during manufacture, assembly, handling, transport, accidental drops, etc. Additionally, once under the influence of an acceleration profile particular to the intended firing of ordinance, the device should initiate with high reliability.

In addition, the inertial igniters used in munitions are generally required to have a shelf life of better than 20 years and could generally be stored at temperatures of sometimes in the range of —65 to 165 degrees F. The inertial igniter configurations must also consider the manufacturing costs and simplicity in the configurations to make them cost effective for munitions applications.

Accordingly, methods are provided that can be used to configure fully mechanical inertial igniters that can satisfy the prescribed no-fire requirements while satisfying relatively low all-fire setback acceleration level and long duration requirements. For initiation of percussion primer or other provided pyrotechnic materials, the methods rely on potential energy stored in a spring (elastic) element, which is then released upon the detection of the prescribed all-fire conditions. These methods are suitable for use in munitions that are subjected to very low setback accelerations with very long durations, such as in the presence of available space constraints.

Also provided are fully mechanical igniters that are configured based on the above methods that can satisfy the prescribed no-fire requirements while satisfying relatively low all-fire firing setback acceleration level and long duration requirements.

For initiation of percussion primer or other provided pyrotechnic materials, the methods rely on potential energy stored in a spring (elastic) element, which is then released upon the detection of the prescribed all-fire conditions. These methods are suitable for use in munitions that are subjected to very low setback accelerations with very long durations, such as in the presence of available space constraints.

Also provided is a method for initiating reserve thermal batteries. The method comprising: releasing a striker mass upon an acceleration duration and magnitude greater than a prescribed threshold; and transferring potential energy stored in an elastic element (spring element) to the striker mass to gain enough kinetic energy to strike and initiate the provided percussion cap or pyrotechnic material.

The method also comprises a mechanism that releases the striker mass only upon an acceleration duration and magnitude greater than a prescribed threshold (all-fire condition).

Those skilled in the art will appreciate that the inertial igniters disclosed herein may provide one or more of the following advantages over prior art inertial igniters:

Provide inertial igniters that are safe and can differentiate no-fire conditions from all-fire conditions based on the prescribed all-fire setback acceleration level (target impact acceleration level when used for target impact activation) and its prescribed duration.

Provide inertial igniters that can be activated by log G setback acceleration levels with relatively long durations.

Provide inertial igniters that are very short in height to minimize the space that is occupied by the inertial igniter in the reserve battery and other locations that they are used, which is made possible by separating the striker mass release mechanism from the mechanism that accelerates the striker element, i.e., the use of potential energy stored in the device elastic element.

Provide inertial igniters that allow the use of standard off-the-shelf percussion cap primers.

Accordingly, an inertial igniter is provided. The inertial igniter comprising: a striker mass movable towards one of a percussion primer or pyrotechnic material; a striker mass release element for releasing the striker mass to strike the percussion primer or pyrotechnic material upon an acceleration time and magnitude greater than a prescribed threshold.

The inertial igniter further comprises a mechanical delay mechanism for releasing the striker mass when the prescribed all-fire acceleration threshold level persists for the prescribed period and essentially resetting to its initial configuration if the prescribed all-fire acceleration threshold level does not persist for the prescribed period.

The inertial igniter further comprises an elastic element (such as a torsion spring) that is preloaded to provide the required amount of potential energy to accelerate the striker mass to the required velocity to achieve reliable percussion cap or pyrotechnic material initiation upon impact.

The inertial igniter striker mass and the release element are rotationally movable to minimize the effects of friction on the operation of the inertial igniter.

The striker mass release element can be configured to be returnable from the path of releasing the striker mass when the acceleration duration and magnitude (all-fire condition) threshold is not reached.

The inertial igniter can also be provided with a safety pin that prevents its activation for the purpose of safety during transportation and assembly in the reserve battery or the like.

The inertial igniter can also be provided with an arm/disarm switch that when is set to the disarm position, it prevents its activation for the purpose of safety during transportation and assembly in the reserve battery or the like.

Also provided is a method for initiating a thermal battery. The method comprising: releasing a striker mass upon an acceleration duration and magnitude greater than a prescribed threshold; and transferring potential energy stored in an elastic element (spring element) to the striker mass to gain enough kinetic energy to strike and initiate the provided percussion cap or pyrotechnic material.

The method can further comprise returning the striker mass release element to its original (zero acceleration condition) position when the acceleration duration and magnitude (all-fire condition) threshold is not reached.

It is appreciated by those skilled in the art that the disclosed inertial igniter mechanisms may also be used to construct electrical impulse switches, which are activated like the so-called electrical G switches but with the added time delays to account for the activation shock level duration requirement, i.e., like the disclosed inertial igniters to activate when a prescribed shock loading (acceleration) level is experienced for a prescribed length of time (duration). The electrical "impulse switches" may be configured as normally open or closed and with or without latching mechanisms. Such impulse switch embodiments that combine such safety mechanisms with electrical switching mechanisms are described herein together with alternative methods of their construction.

Also disclosed are inertial igniters with the capability to open or close an electrical switch, which can then be used by the user to determine the activation status of the inertial igniter as assembled in the reserve battery or the like. This capability may also be used for all-fire event detection in munitions or the like.

A need therefore exists for novel miniature impulse switches for use in munitions or the like that can differentiate accidental short duration shock loading (so-called no-fire events for munitions) from generally high but longer duration, i.e., high impulse threshold levels, that correspond to all-fire conditions in gun fired munitions or the like. Such impulse switches must be small in size and volume to make them suitable for being integrated into electronic circuit boards or the like. They must also be readily scalable to different all-fire and no-fire conditions for different munitions, such as for low G setback acceleration with relatively long duration. Reliability is also of much concern since most munitions are required to have a shelf life of up to 20 years and could generally be stored at temperatures of sometimes in the range of −65 to 165 degrees F. This requirement is usually satisfied best if the device is in a sealed compartment. The impulse switch must also consider the manufacturing costs and simplicity of configuration to make it cost effective for munitions applications.

Those skilled in the art will appreciate that the compact impulse-based electrical impulse switches disclosed herein may provide one or more of the following advantages over prior art electrical G-switches:

Provide impulse-based electrical G-switches that are relatively small in both height and volume, Provide impulse-based electrical switches that differentiate all-fire conditions from all no-fire conditions, even those no-fire conditions that result in low setback acceleration levels with relatively long duration, thereby eliminating the possibility of accidental activation, Provide electrical impulse switches that are modular in configuration and can therefore be readily customized to different no-fire and all-fire requirements, Provide impulse switches that may be normally open or normally closed and that are modular in configuration and can be readily customized for opening or closing or their combination of at least one electric circuit.

Accordingly, impulse-based impulse switches with modular configuration for use in electrical or electronic circuitry are provided that activate upon a prescribed acceleration profile threshold. In most munition applications, the acceleration profile is usually defined in terms of firing setback acceleration and its duration.

BRIEF DESCRIPTION OF THE DRAWINGS

These and other features, aspects, and advantages of the apparatus will become better understood with regard to the following description, appended claims, and accompanying drawings where:

FIG. 9F illustrates the schematic of the second inertial igniter mechanism embodiment FIG. 9A as the striker mass is released by the actuation of its release mechanism by the delay mechanism mass.

FIG. 18B illustrates the frontal view "A" of the lateral and spin acceleration and spin velocity insensitive mechanical delay mechanism embodiment of FIG. 17 while being subjected to the prescribed acceleration and winding the spring of the mechanical delay mechanism embodiment of FIG. 17.

FIG. 18C illustrates the frontal view "A" of the lateral and spin acceleration and spin velocity insensitive mechanical delay mechanism embodiment of FIG. 17 as completes winding the spring of the mechanical delay mechanism embodiment of FIG. 17 and releases it to begin its torsional oscillatory motion.

DETAILED DESCRIPTION

The inertial igniter embodiments use striker mass members that are provided with pre-loaded spring (elastic) elements to provide stored potential energy to accelerate the striker mass with the required kinetic energy to initiate a percussion primer or other pyrotechnic material upon the release of the striker mass, as was described for the prior art inertial igniters of FIGS. 1-5. In normal conditions, the inertial igniters are provided with a locking mechanism that keeps their ignition pin away from the percussion primer. The locking mechanism is provided with a release mechanism that is activated once the inertial igniter is subjected to the prescribed all-fire condition, i.e., to the minimum setback acceleration for a minimum amount of time, at which time the preloaded spring would accelerate the striker mass to the required kinetic energy for its ignition pin to initiate the provided percussion primer upon impact.

In the embodiments, the same method and similar mechanisms are used in the configuration of the striker mass, its preloaded spring and striker mass release mechanism once the prescribed acceleration and duration thresholds are detected.

The inertial igniters are, however, provided with novel long delay mechanisms that ensure that the setback acceleration threshold level persist during the prescribed period (all-fire duration) before allowing the striker mechanism to be released. As a result, the prescribed minimum setback acceleration threshold and its duration for inertial igniter initiation is satisfied.

The methods to configure the above novel long delay mechanism inertial igniters are herein described through the following examples. It is appreciated by those skilled in the art that the delay mechanisms alone or as integrated with the aforementioned striker mass and its release mechanism must provide the means of ensuring that the inertial igniter is initiated only after the prescribed minimum setback acceleration threshold and its duration (all-fire condition) has been detected.

Figure 1:
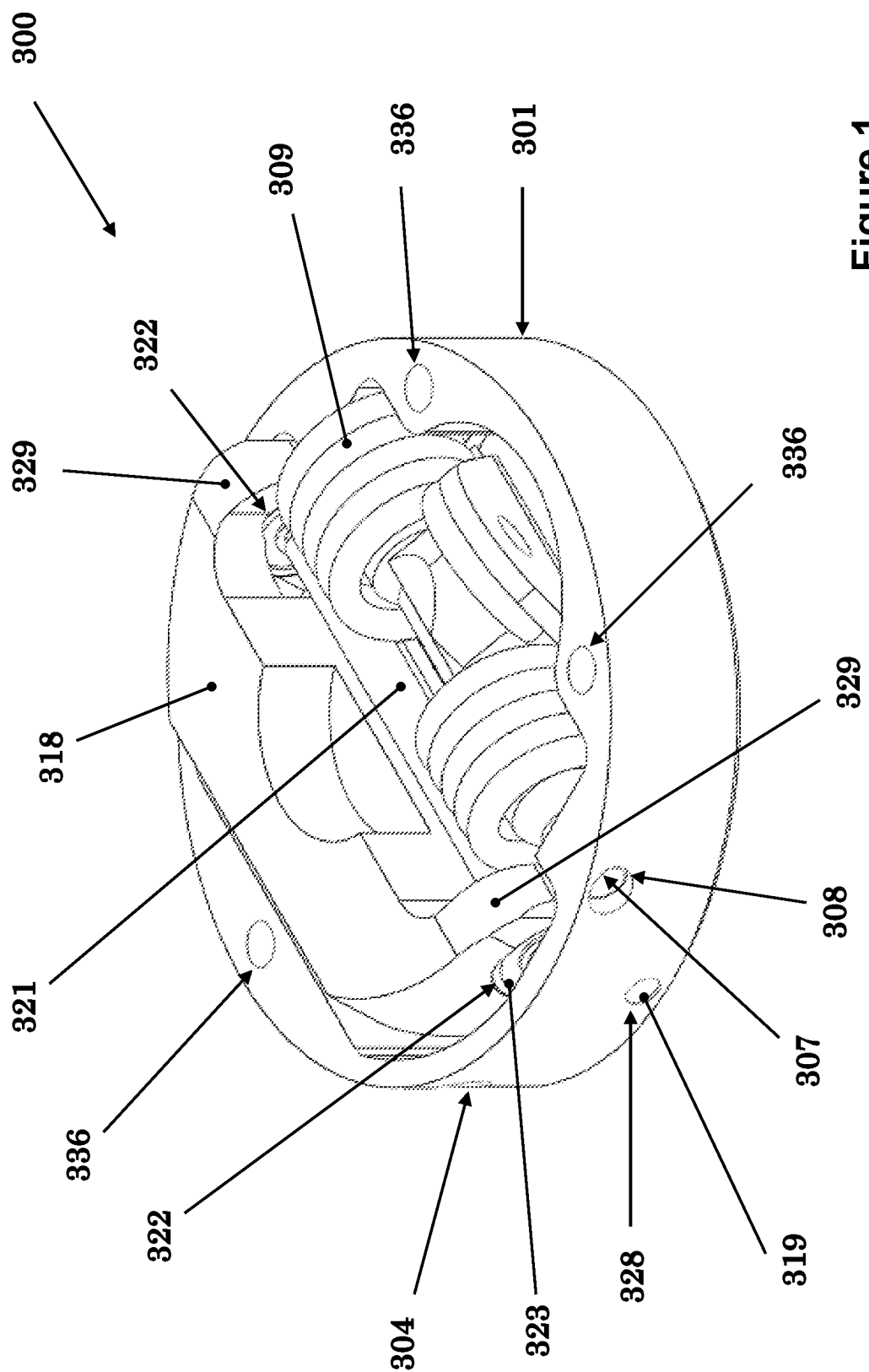
FIG. 1 illustrates a schematic of the isometric drawing of a prior art inertial igniter operating with stored potential energy.
Figure 2:
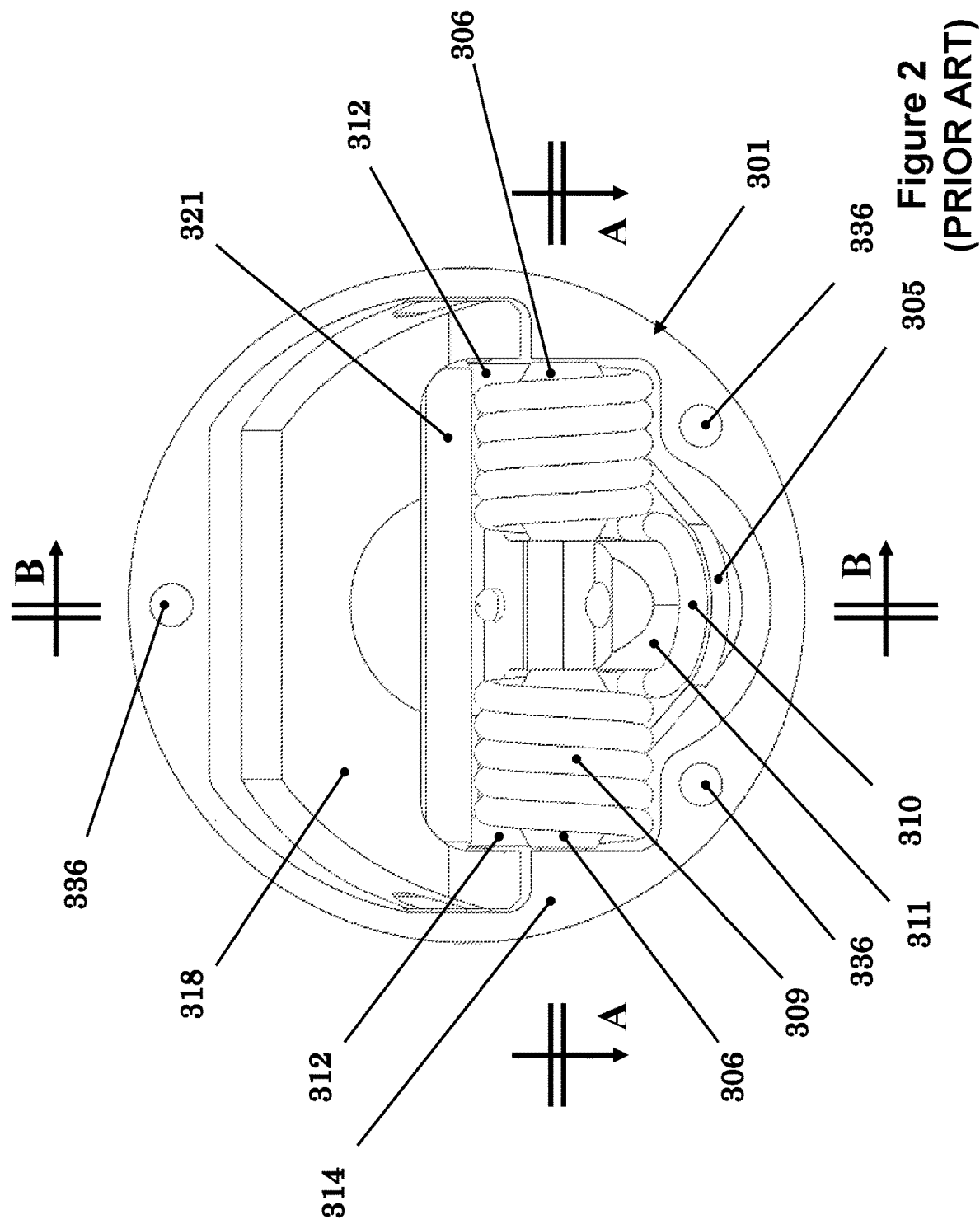
FIG. 2 illustrates a schematic of the top view of the prior art inertial igniter of FIG. 1 with its cap removed to show the internal components of the device. The striker mass element release arm and its inertial igniter body attached shaft are also removed for clarity.
Figure 3:
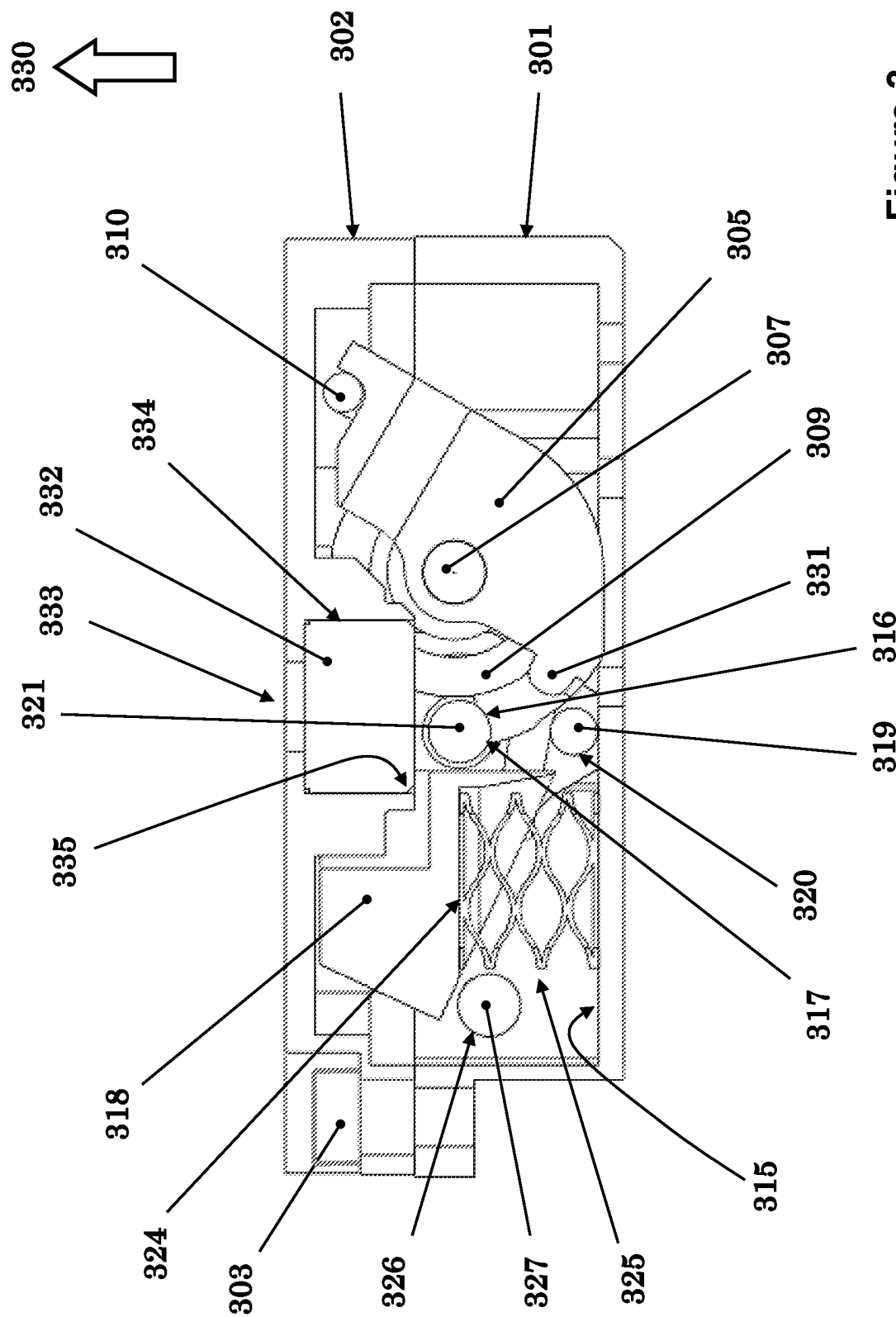
FIG. 3 illustrates a schematic of a cross-sectional view of the prior art inertial igniter of FIG. 1 in its pre-activation state with the inertial igniter cap assembly removed for clarity.
Figure 4:
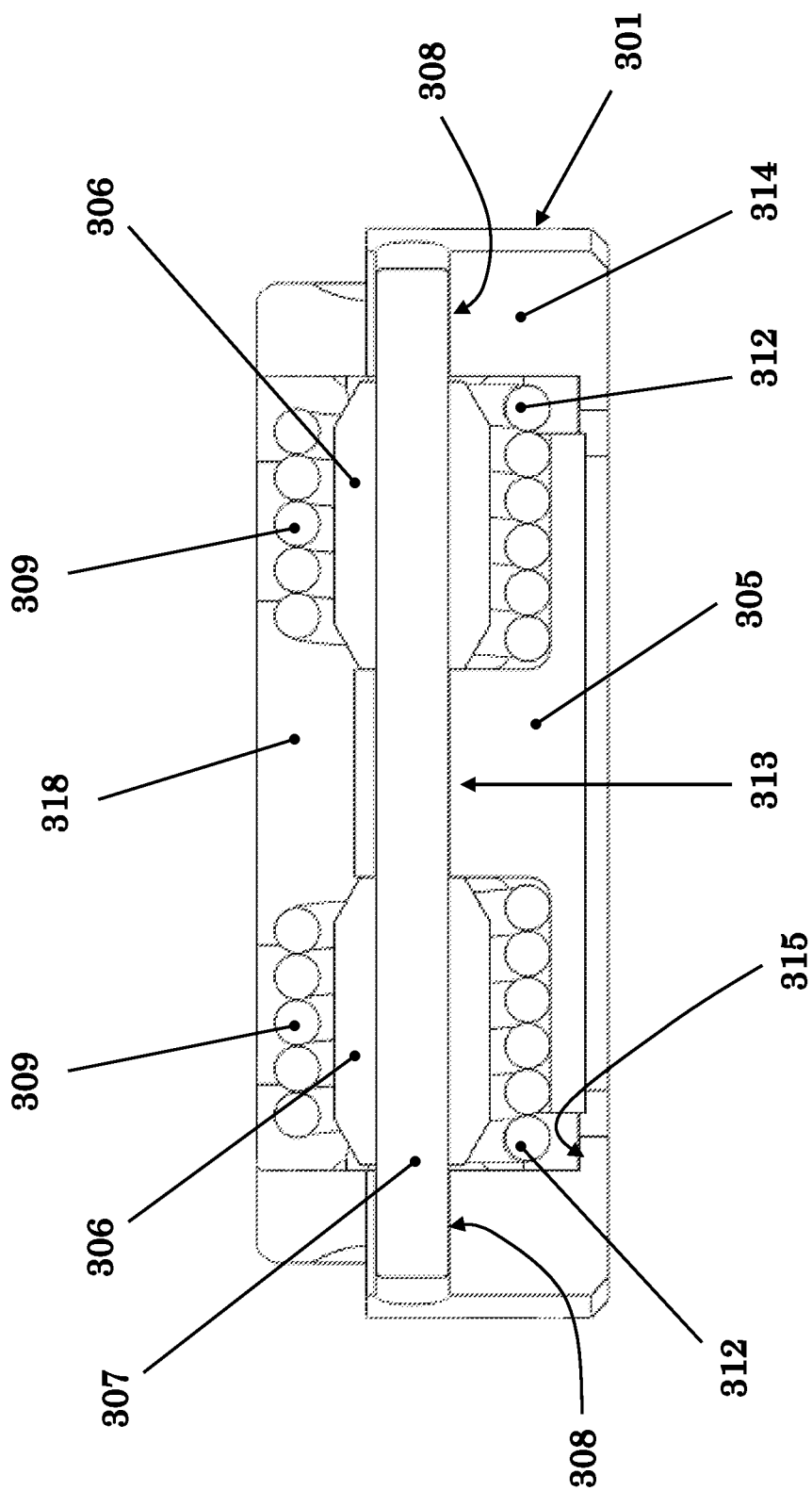
FIG. 4 illustrates the cross-sectional view A-A indicated in the top view of FIG. 2 of the inertial igniter.
Figure 5:
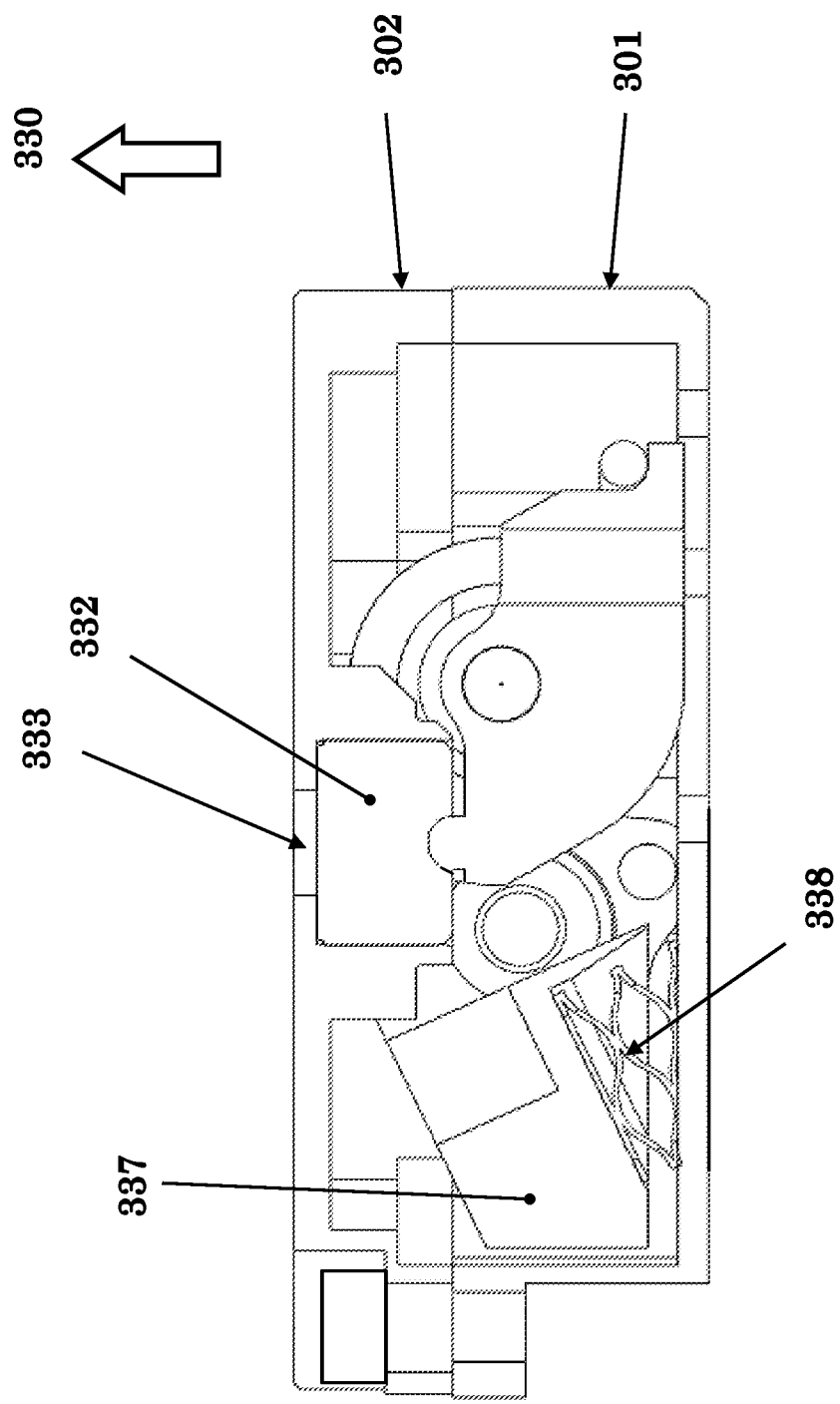
FIG. 5 illustrates the schematic of the cross-sectional view of the prior art inertial igniter of FIG. 1 in its post-activation state.
Figure 6A:
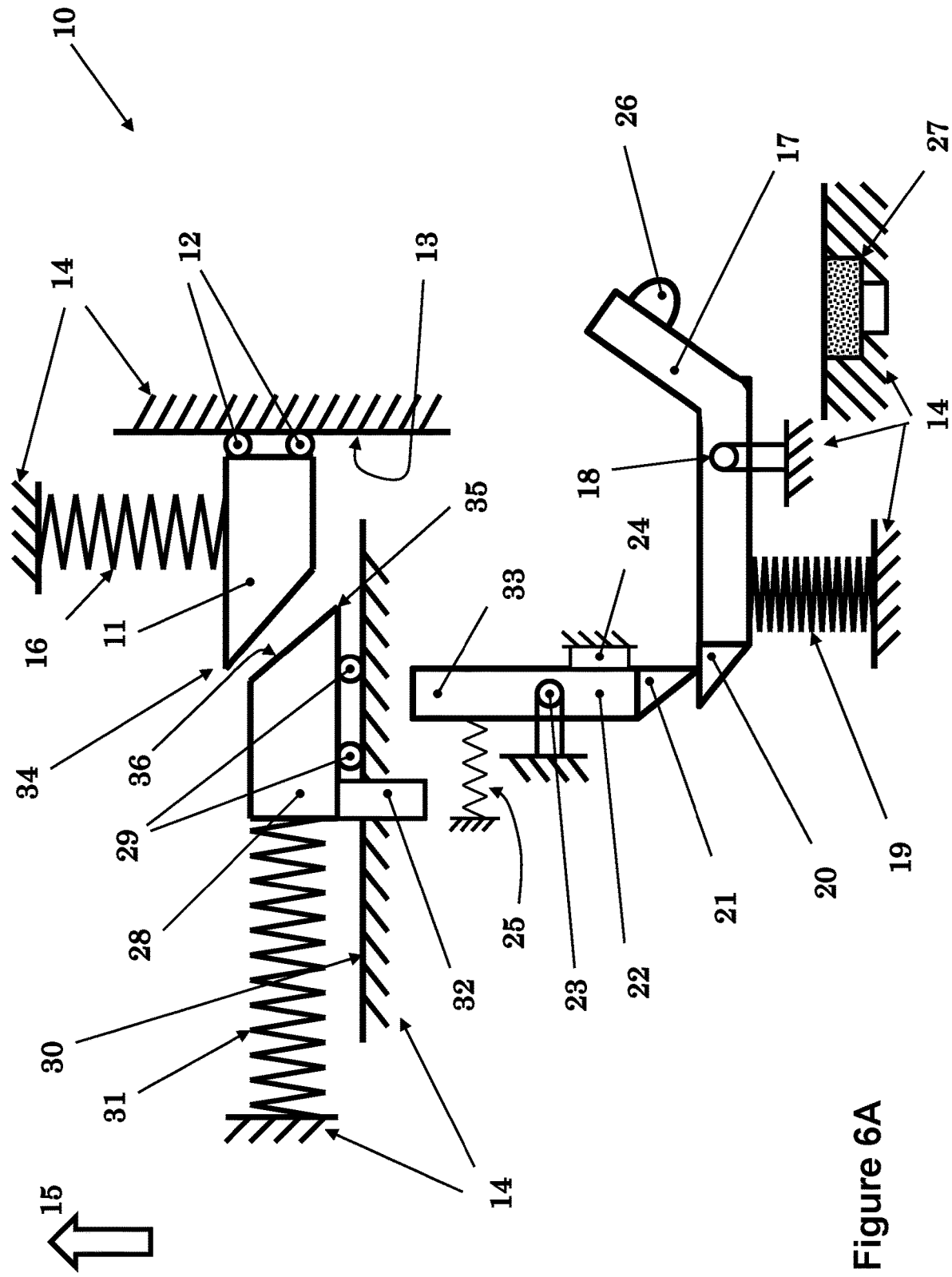
FIG. 6A illustrates the schematic of the first inertial igniter mechanism embodiment for low setback accelerations with long durations.

A method of configuring a delay mechanism that can be used in inertial igniters to actuate the release mechanism of a striker mass with preloaded spring (elastic) member only after the prescribed minimum setback acceleration threshold and its duration (all-fire condition) has been detected is described by its application to the inertial igniter embodiment 10 shown in the schematic of FIG. 6A.

The inertial igniter 10 of FIG. 6A is provided with a spring loading mass 11, which is free to translate in a guide (shown as the rolling members 12) along the surface 13 of the inertial igniter body 14 (shown as ground) in the direction parallel to the direction of firing acceleration indicated by the arrow 15. The spring loading mass 11 is provided with a preloaded tensile spring 16, which is attached to the inertial igniter body 14 on one end and to the spring loading mass 11 on the other end as shown in FIG. 6A.

The inertial igniter 10 of FIG. 6A is also provided with a striker mass member 17, which is attached to the inertial igniter body 14 by the rotary joint 18. The striker mass member 17 is also provided with a preloaded compressive spring 19, which biases it to keep its tip 20 against the tip 21 of the striker mass release member 22 as shown in FIG. 6A. The striker mass release member 22 is also attached to the inertial igniter body 14 by the rotary joint 23, and is provided with a preloaded tensile spring 25, which bias it against the stop 24 on the inertial igniter body 14 as shown in the configuration of FIG. 6A. The striker mass member 17 is also provided with a sharp tip 26, which is configured to initiate the percussion primer 27 (or other appropriate pyrotechnic material) upon impact as described later.

The inertial igniter 10 of FIG. 6A is also provided with a delay mechanism mass 28, which is free to translate in a guide (shown as the rolling members 29) along the surface 30 of the inertial igniter body 14 (shown as ground) in the direction perpendicular to the direction of firing acceleration indicated by the arrow 15. The delay mechanism mass 28 is provided with the spring 31, which is attached to the inertial igniter body 14 on one end and to the delay mechanism mass 28 on the other end as shown in FIG. 6A. In normal conditions shown in FIG. 6A, the spring 31 is in its free length (unloaded) condition. The delay mechanism mass 28 is also provided with an extended member 32, which is configured to engage the tip 33 of the striker mass release member 22 as described later.

Figure 6B:
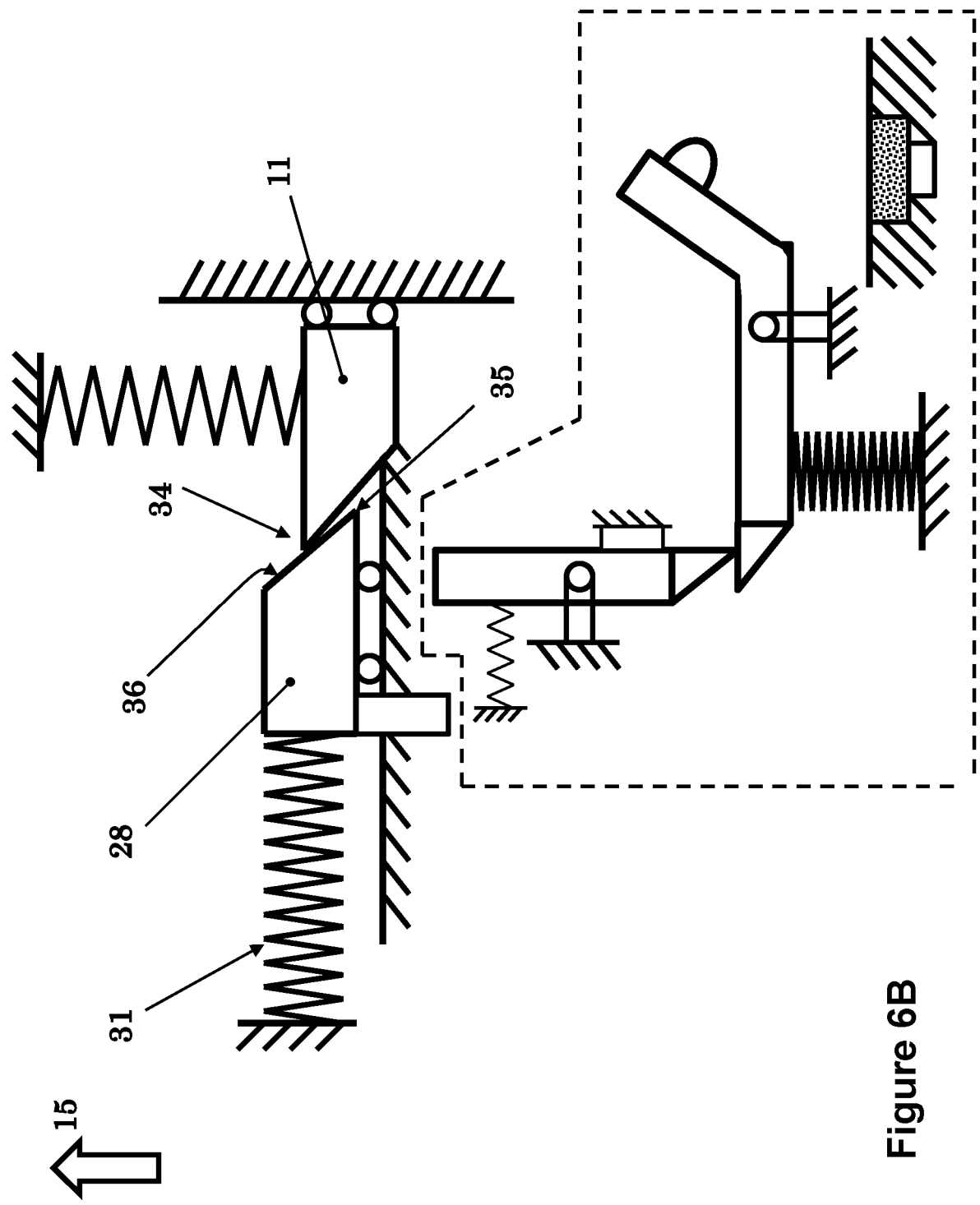
FIG. 6B illustrates the schematic of the first inertial igniter mechanism embodiment of FIG. 6A as subjected to setback threshold or higher acceleration level and the delay mechanism mass is displaced and released.

The inertial igniter embodiment 10 of FIG. 6A operates as follows. In the schematic of FIG. 6A, the inertial igniter 10 is shown in its pre-initiation state. Now if the device to which the inertial igniter is attached (for example a rocket or a missile) is accelerated in the direction of the arrow 15, if the acceleration is above the prescribed firing acceleration threshold, the inertial force due to the mass of the spring loading mass 11 is configured to overcome the preloading force of the tensile spring 16, and begin to move downward as viewed in FIG. 6A and as shown in FIG. 6B, causing the tip 34 of the spring loading mass 11 to come in contact with the surface 36 of the delay mechanism mass 28, and begin to push it back (to the left as seen in the view of FIG. 6B) and compress the spring 31.

Figure 6C:
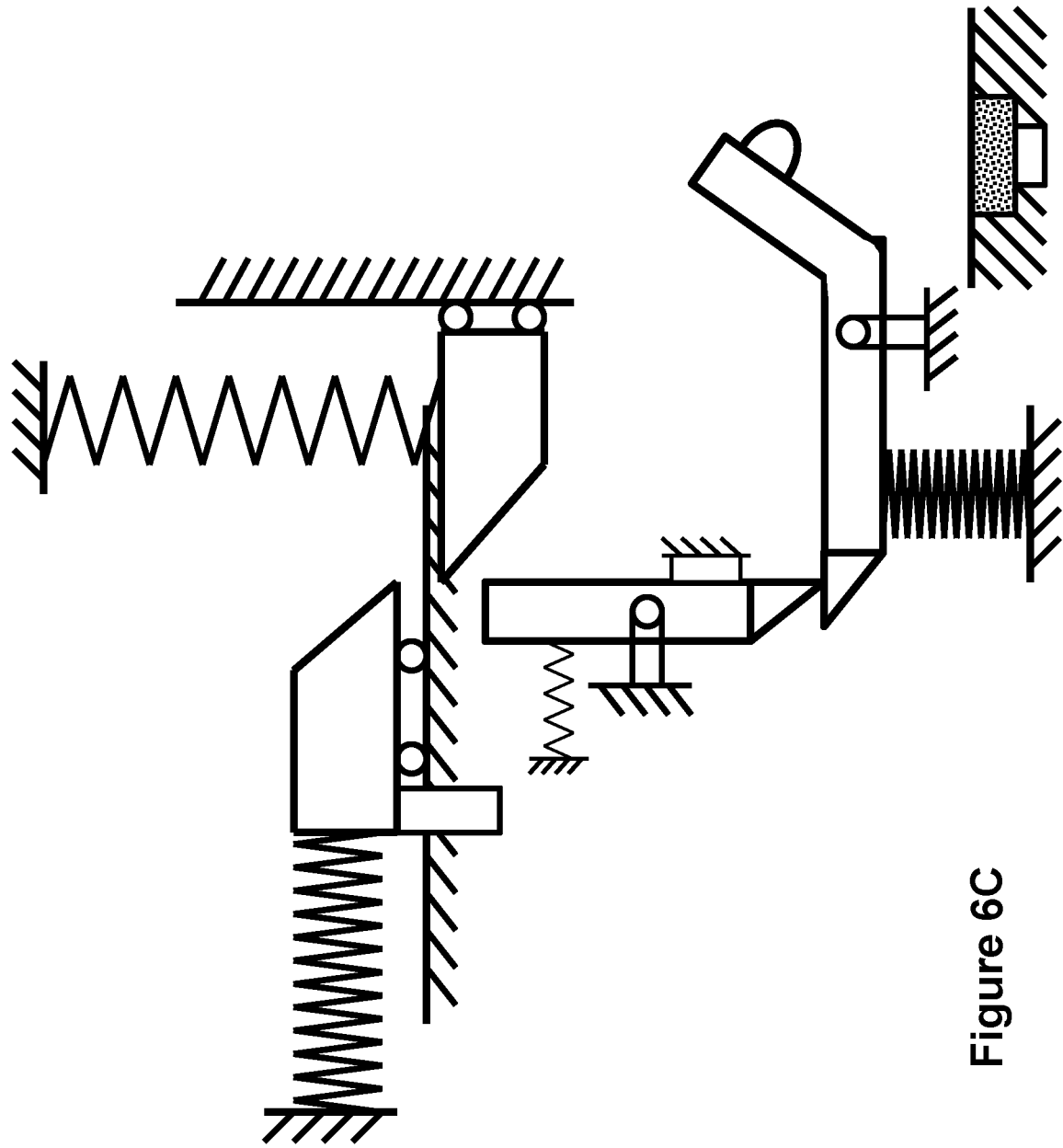
FIG. 6C illustrates the schematic of the first inertial igniter mechanism embodiment of FIG. 6A as the striker mass release mechanism actuation member of the delay mechanism is released.

If the prescribed acceleration persists, the spring loading mass 11 keeps moving down until its tip 34 clears the surface 36 of the delay mechanism mass 28 as shown in FIG. 6C, at which time the delay mechanism mass 28 has been pushed back and the spring 31 has been compressed their maximum amounts as shown in FIG. 6C. At this time, the compressively loaded spring 31 begins to accelerate the delay mechanism mass 28 to the right and its extended member 32 towards the tip 33 of the striker mass release member 22.

It is appreciated that if while the spring loading mass 11 is moving down and before releasing the delay mechanism mass 28 the acceleration threshold in the direction of the arrow 15 is ceased, the preloaded tensile spring 16 would bring the spring loading mass 11 to a stop and return it to its initial pre-acceleration and normal condition state.

Figure 6D:
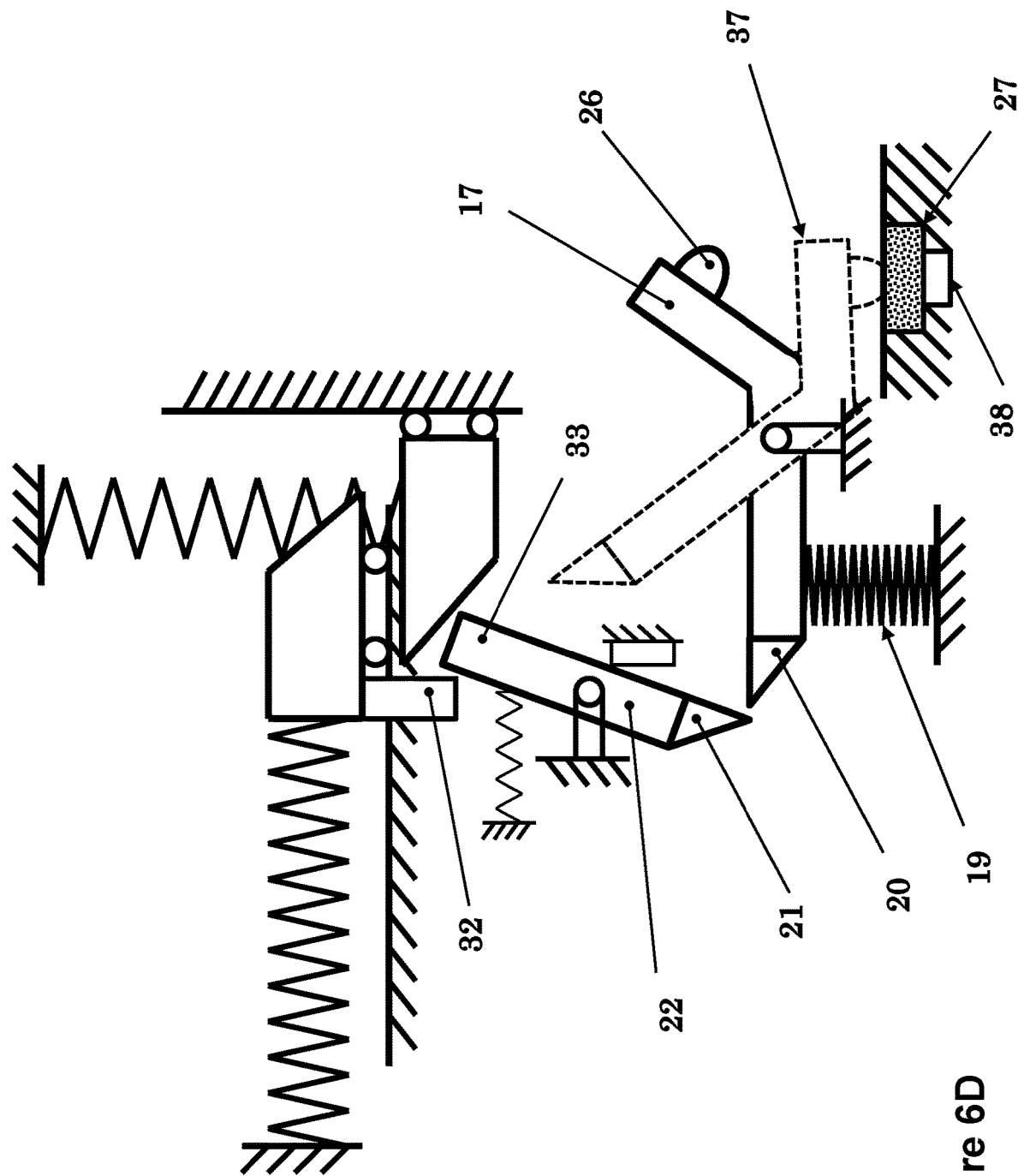
FIG. 6D illustrates the schematic of the first inertial igniter mechanism embodiment FIG. 6A as the striker mass is released by the actuation of its release mechanism by the delay mechanism mass.

Then at some point, the extended member 32 engages the tip 33 of the striker mass release member 22 and forces it to rotate in the clockwise direction as viewed in the schematic of FIG. 6D, which causes the tip 21 of the striker mass release member 22 to slide past the surface of the tip 20 of the striker mass member 17 as shown in FIG. 6D. The striker mass member 17 is thereby released and the preloaded compressive spring 19 begins to rotationally accelerate the striker mass member 17 in the clockwise direction. The preloaded compressive spring 19 is configured to accelerate the striker mass member 17 to the required kinetic energy for its ignition pin 26 to initiate the provided percussion primer 27 upon impact as shown by dashed lines in FIG. 6D. The generated ignition flame and sparks would then exit from the provided opening 38 to perform its intended function, for example to enter a thermal battery and activate the battery by igniting the battery pyrotechnic pallets.

It is appreciated by those skilled in the art that the delay mechanism mass 28 and the spring 31 assembly act as a vibrating mass-spring system with a natural frequency of $$\omega = \sqrt{\frac{k}{m}} \quad (1)$$

where k is the stiffness of the spring 31 and m is the mass of the delay mechanism mass 28, and ω (radian/second) is the natural frequency of vibration of the mass-spring system. The period T of each cycle of vibration (oscillation) of the mass-spring system is then given as $$T = \frac{2\pi}{\omega} \text{ seconds} \quad (2)$$

It is also appreciated by those skilled in the art that the mass-spring system of delay mechanism mass 28 and the spring 31 is in its rest position in the schematic of FIG. 6A. The mass element 28 is then displaced to its position shown in the schematic of FIG. 6C by the spring loading mass 11, from which position it is released and starts it oscillatory motion. Thus, by the time that the delay mechanism mass 28 reaches its initially rest position of FIG. 6A, it has traveled one quarter of its cyclic motion, which would have taken a quarter of the period T, equation (2), i.e., a time duration of T/4 (seconds). The delay mechanism mass 28, however, passes its initially rest position of FIG. 6A as shown in the schematic of FIG. 6D before its extended member 32 would engage the tip 33 of the striker mass release member 22 and forces it to rotate in the clockwise direction as viewed in the schematic of FIG. 6D and thereby release the striker mass member 17. The delay mechanism mass 28, however, cannot travel a quarter of the cycle (to rest) in quarter of period T time since it needs enough kinetic energy to engage and force the striker mass release member 22 to rotate in the clockwise direction and release the striker mass member 17.

Thus, the total time t that it takes the delay mechanism mass 28 to release the striker mass member 17 by engaging and rotating the striker mass release member 22 can be greater than T/4 (seconds) but less than T/2 (seconds), i.e., T/2>t>T/4.

It is therefore appreciated that by varying the stiffness k of the spring 31 and mass m of the delay mechanism mass 28, the period T of the mass-spring system can be adjusted to match the required delay time from the detection of the aforementioned (setback in the case of fired munitions) acceleration threshold to the time of percussion primer initiation.

It is appreciated by those skilled in the art that once the inertial igniter embodiment 10 of FIG. 6A has detected the aforementioned prescribed acceleration threshold, i.e., once the spring loading mass 11 has overcome the preloading force of the tensile spring 16 and has completed spring 31 compression and has released the delay mechanism mass 28, the striker mass 17 is released after the above inertial igniter configured time t. This means that if the prescribed acceleration threshold persists less than the prescribed duration threshold, the striker mechanism would still initiate the percussion primer and thereby the reserve battery. In some munition applications, such as in those with relatively short setback acceleration durations, this might not be an issue. However, in most munitions, such as in rockets and missiles with relatively long setback duration threshold requirements, if the acceleration threshold is ceased before the prescribed duration threshold has elapsed, then the striker mass 17 must not be released to initiate the inertial igniter percussion primer or other provided pyrotechnic material and the inertial igniter must reset to its initial state shown in FIG. 6A. The following two modified inertial igniter embodiment of the embodiment 10 of FIG. 6A describe the methods of alleviating this shortcoming of the embodiment 10 the latter applications.

Figure 7A:
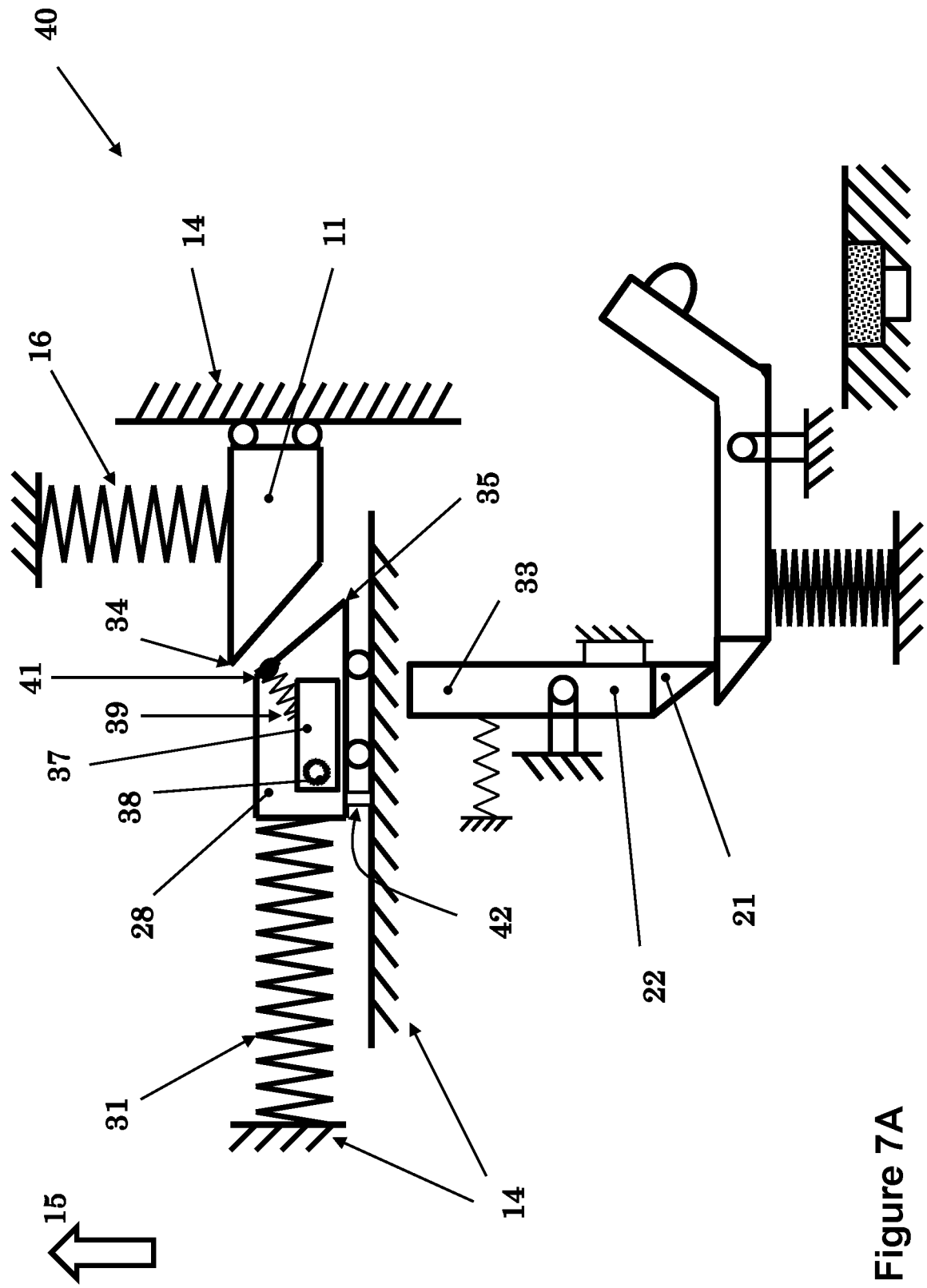
FIG. 7A illustrates the schematic of the first modified inertial igniter of FIG. 6A to prevent ignition before the prescribed duration of the acceleration threshold has elapsed.

The schematic of the first modified inertial igniter embodiment 40 of the inertial igniter embodiment 10 of FIG. 6A is shown in FIG. 7A. All components of the inertial igniter embodiment 40 are identical to those of the embodiment 10, except for the extended member 32 of the delay mechanism mass 28, which instead of being fixedly attached to the delay mechanism mass, the "extended member" (indicated by the numeral 37 in FIG. 7A) is attached to the delay mechanism mass 28 by a rotary joint 38. In the normal conditions, the member 37 is held in the position shown in FIG. 7A by the preloaded tensile spring 39, which is attached to the delay mechanism mass 28 on one end 41 and to the member 37 on the other end as shown in FIG. 7A, such as by pins that do not constrain their rotation.

Figure 7B:
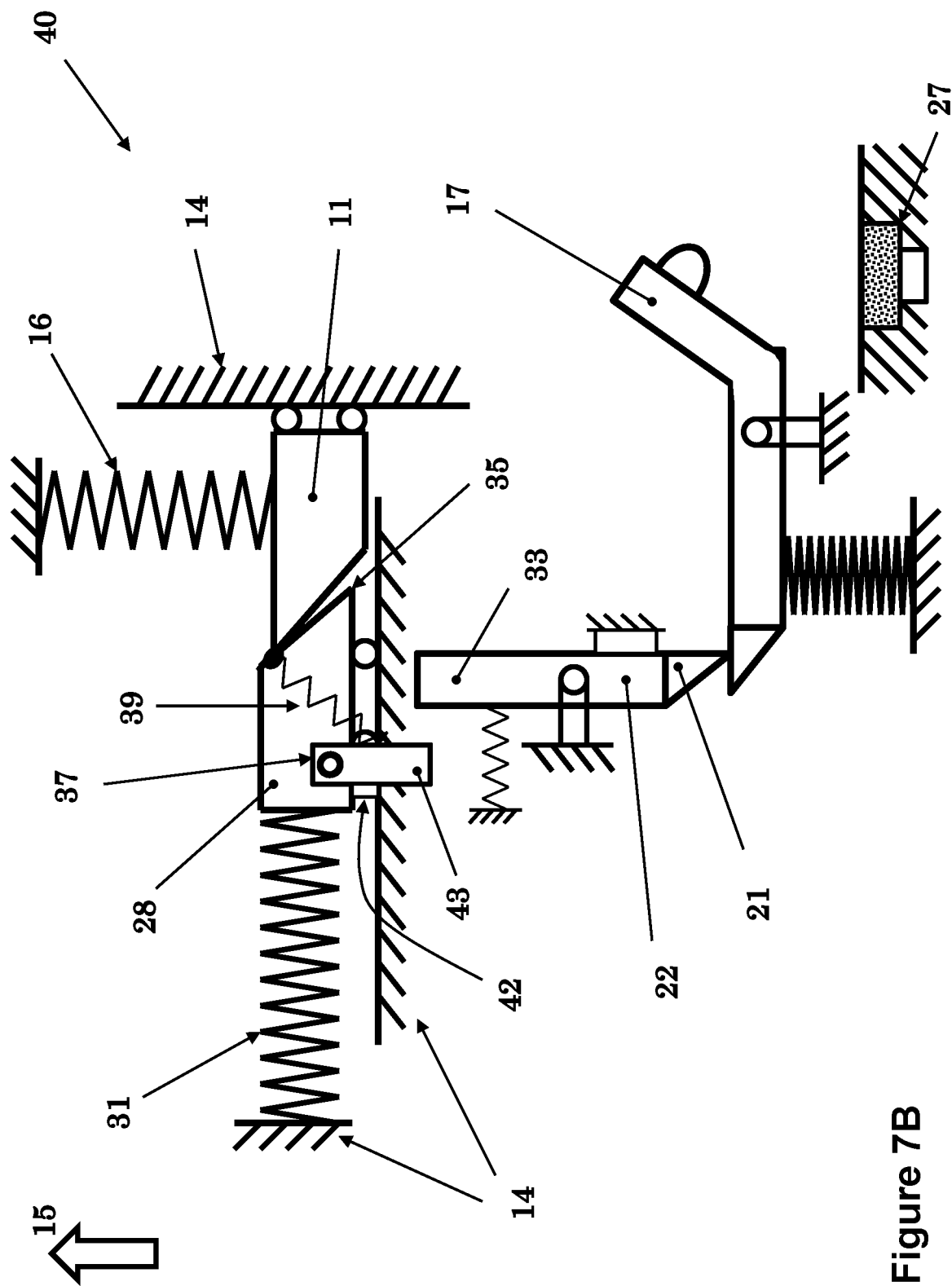
FIG. 7B illustrates the schematic of the modified inertial igniter of FIG. 7A configuration when the prescribed acceleration threshold has ceased before its prescribed duration has elapsed.

Then as the device to which the inertial igniter embodiment 40 of FIG. 7A is attached is accelerated in the direction of the arrow 15, and while the spring loading mass 11 overcomes the preloading force of the tensile spring 16 and begins to compress the spring 31 to release the delay mechanism mass 28, the acceleration also acts on the mass of the member 37 and after overcoming the preloading force of the spring 39, begins to rotate the member 37 in the clockwise direction as viewed in FIG. 7A towards the provided stop 42. The preload level and stiffness of the spring 39 and the effective inertia of the member 37 are selected such that the member 37 is fully deployed and essentially held against the stop 42 as shown in FIG. 7B before the delay mechanism mass 28 is released as shown in FIG. 6D.

Now if the acceleration in the direction of the arrow 15 stays at or above the prescribed (all-fire in munitions) threshold, then the inertial igniter embodiment 40 functions as was described for the inertial igniter embodiment of FIG. 6A and at the indicated time t, the tip 43 of the member 37 would engage the tip 33 of the striker mass release member 22 and cause the striker mass 17 to be released and initiate the percussion primer 27 as shown in the schematic of FIG. 6D.

However, if at any time before the tip 43 of the member 37 engages the tip 33 of the striker mass release member 22 and releases the striker mass 17 the acceleration level in the direction of the arrow 15 drops below the prescribed threshold, the member 37 is rotated in the counterclockwise direction by the preloaded tensile spring 39 towards the configuration shown in FIG. 7A, thereby preventing the striker mass from being released and therefore the percussion primer 27 from being initiated. As a result, the modified inertial igniter embodiment 40 of FIG. 7A would only initiate the provided percussion primer or other pyrotechnic material 27 if the acceleration in the direction of the arrow 15 stays at or above the prescribed threshold and for the entire prescribed duration (all-fire condition in munitions).

It is appreciated that in the inertial igniter embodiment 40 of FIG. 7A the member 37 is shown to be deployed by rotation about a rotary joint 38, with which it is attached to the delay mechanism mass 28. Alternatively, the member 37 may instead be provided a guide (not shown) on the delay mechanism mass 28 to allow it to slide up and down in the direction parallel to the arrow 15, while being normally held up and away from engagement with the tip 33 of the striker mass release member 22 by a preloaded tensile spring like the spring 39. Then the member 37 would be similarly deployed by the acceleration in the direction of the arrow 15 when the acceleration is at or above the prescribed threshold for engagement with the tip 33 of the striker mass release member 22 and is withdrawn when the acceleration drops below the prescribed threshold to prevent engagement with the tip 33 of the striker mass release member 22.

Figure 8A:
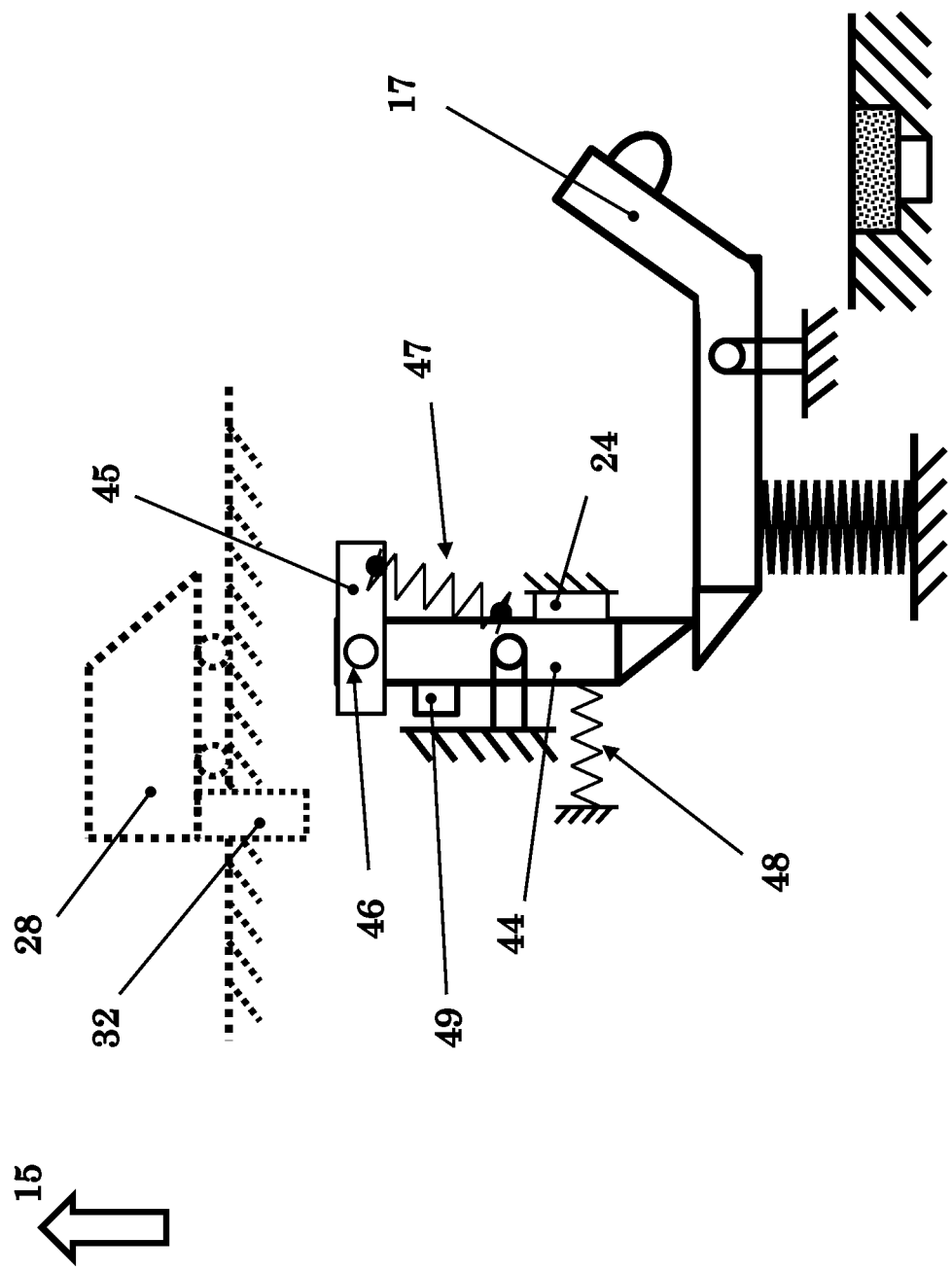
FIG. 8A illustrates the striker mass release member together with the striker mass mechanism component of the inertial igniter embodiment of FIG. 6B as indicated by an enclosed dashed-lines area.

In the second modified inertial igniter embodiment of the inertial igniter embodiment 10 of FIG. 6A, all components of the inertial igniter embodiment are identical to those of the embodiment 10, except for the striker mass release member 22, which is configured to avoid engagement with the extended member 32 of the delay mechanism mass 28 unless the inertial igniter is being subjected to acceleration in the direction of the arrow 15 that is at or above the prescribed (all-fire in munitions) threshold. In FIG. 8A, only the modified striker mass release member 44 (22 in FIG. 6A) together with the striker mass 17 mechanism components and the delay mechanism mass 28 and its components (shown in dashed lines) of the inertial igniter 10 are shown. The schematic of FIG. 8A shows the configuration of the striker mass release mechanism of the inertial igniter in normal conditions.

As can be seen in the schematic of FIG. 8A, as compared to the embodiment of FIG. 6A, the tip 33 of the striker mass release member 22 (44 in FIG. 8A) is lowered to below the extended member 32 of the delay mechanism mass 28, and is provided with the member 45, which is attached to the striker mass release member 44 by the rotary joint 46. In normal conditions shown in FIG. 8A, the member 45 is held in the configuration shown in FIG. 8A, i.e., under the extended member 32 of the delay mechanism mass 28 to prevent their engagement, by the compressive spring 47, which is attached to the member 45 on one end and to the striker mass release member 44 on the other end, such as with pin joints that allow free rotation. In the normal condition configuration shown in FIG. 8A, the compressive spring 47 is essentially in its free length condition. Alternatively, an unloaded torsional spring (not shown) may be used instead of the compressive spring 47. In addition, the preloaded tensile spring 25 may also be replaced with a preloaded torsion spring (not shown) in all described embodiments. The preloaded tensile spring 25 may also be replaced by a preloaded compressive spring (48 in FIG. 8A) and positioned to bias the striker mass release member 44 against the stop 24 as shown in FIG. 8A.

Figure 8B:
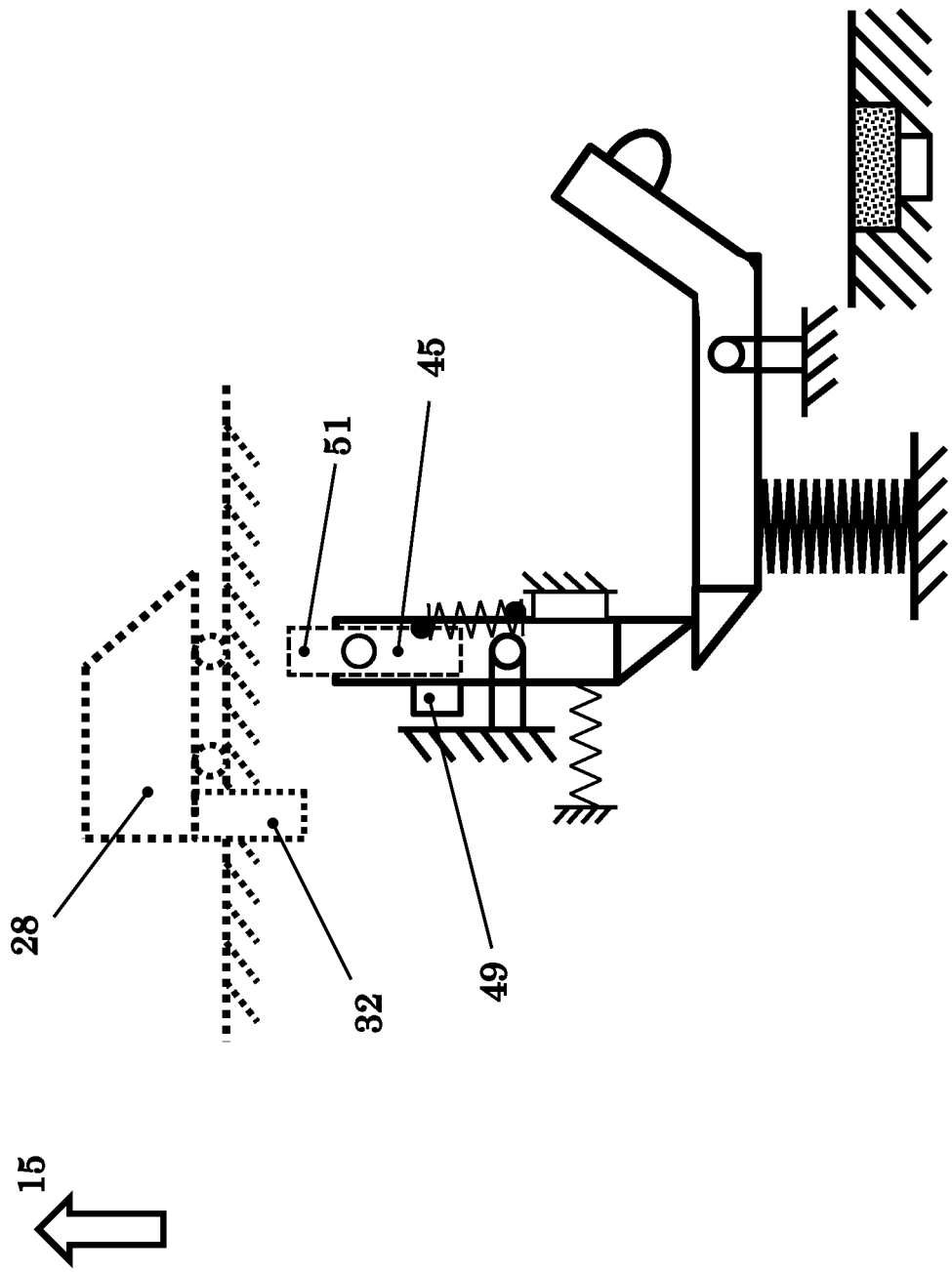
FIG. 8B illustrates the striker mass release member together with the striker mass mechanism component of FIG. 8A as the inertial igniter is subjected to the prescribed acceleration threshold.

Then as the device to which the inertial igniter embodiment with the components of FIG. 8A is attached is accelerated in the direction of the arrow 15 at or above the prescribed acceleration threshold, and while the spring loading mass 11 overcomes the preloading force of the tensile spring 16 and begins to compress the spring 31 to release the delay mechanism mass 28, FIG. 7A, the acceleration also acts on the mass of the member 45 with its mass center to the right of the rotary joint 46 as viewed in FIG. 8A, and after overcoming any present preloading force of the spring 47, begins to rotate the member 45 in the counterclockwise direction as viewed in FIG. 8A towards the provided stop 49. The stop 49 is fixedly attached to the striker mass release member 44. The preload level and the stiffness of the spring 47 and the effective inertia of the member 45 are selected such that the member 45 is fully deployed and essentially held against the stop 49 as shown in FIG. 8B before the delay mechanism mass 28 is released as shown in FIG. 6D.

Now if the acceleration in the direction of the arrow 15 stays at or above the prescribed (all-fire in munitions) threshold, then the inertial igniter embodiment 40 functions as was described for the inertial igniter embodiment of FIG. 6A and at the indicated time t, the extended member 32 of the delay mechanism mass 28 would engage the tip 51 of the striker mass release member 45 and cause the striker mass 17 to be released and initiate the percussion primer 27 as shown in the schematic of FIG. 6D.

However, if at any time before the extended member 32 of the delay mechanism mass 28 engages the tip 51 of the striker mass release member 45 and releases the striker mass 17 the acceleration level in the direction of the arrow 15 drops below the prescribed threshold, the member 45 is rotated in the clockwise direction by the tensile spring 47 towards the configuration shown in FIG. 8A, thereby preventing the striker mass 17 from being released and therefore the percussion primer 27 from being initiated. As a result, the modified inertial igniter embodiment 40 of FIG. 7A would only initiate the provided percussion primer or other pyrotechnic material 27 if the acceleration in the direction of the arrow 15 stays at or above the prescribed threshold and for the entire prescribed duration (all-fire condition in munitions).

It is appreciated by those skilled in the art that in the modifies inertial igniter embodiments of FIGS. 7A and 8A, if the acceleration in the direction of the arrow 15 is at or above the prescribed threshold but does not persist the entire prescribe duration, then the striker mass 17 is not released and the inertial igniter returns to its initial (normal) state, i.e., the inertial igniter is reset, and can later be initiated if the prescribed acceleration threshold and duration are detected.

Figure 9A:
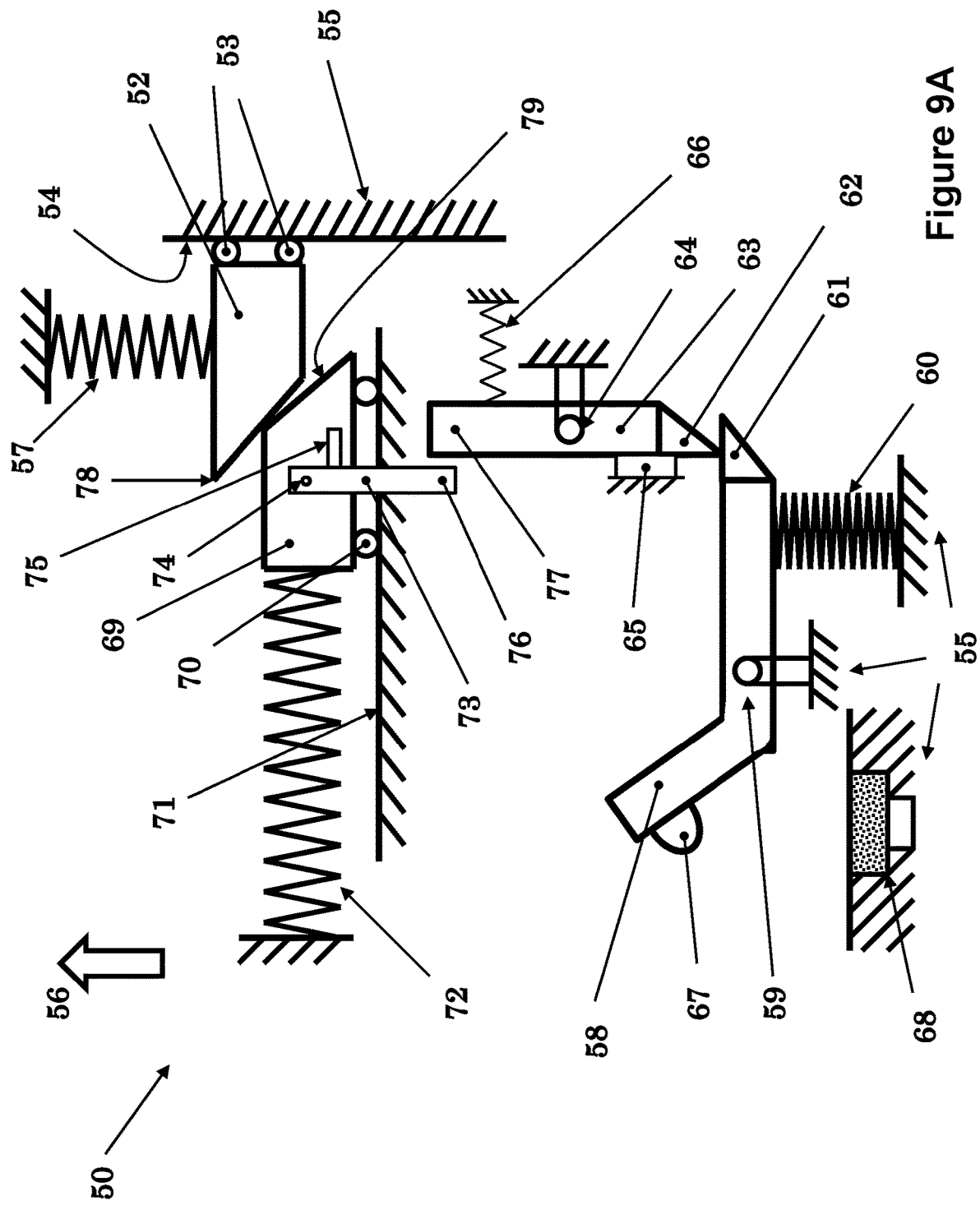
FIG. 9A illustrates the schematic of the second inertial igniter mechanism embodiment for low setback accelerations with long durations.

The second inertial igniter embodiment 50 is shown in the schematic of FIG. 9A. The inertial igniter 50 is similarly provided with a spring loading mass 52, which is free to translate in a guide (shown as the rolling members 53) along the surface 54 of the inertial igniter body 55 (shown as ground) in the direction parallel to the direction of firing acceleration indicated by the arrow 56. The spring loading mass 52 is provided with the preloaded tensile spring 57, which is attached to the inertial igniter body 55 on one end and to the spring loading mass 52 on the other end as shown in FIG. 9A.

The inertial igniter embodiment 50 of FIG. 9A is also provided with a striker mass member 58, which is attached to the inertial igniter body 55 by the rotary joint 59. The striker mass member 58 is also provided with a preloaded compressive spring 60, which biases it to keep its tip 61 against the tip 62 of the striker mass release member 63 as shown in FIG. 9A. The striker mass release member 63 is also attached to the inertial igniter body 55 by the rotary joint 64, and is provided with a preloaded tensile spring 66, which bias it against the stop 65 on the inertial igniter body 55 as shown in the configuration of FIG. 9A. The striker mass member 58 is also provided with a sharp tip 67, which is configured to initiate the percussion primer 68 (or other appropriate pyrotechnic material) upon impact as described later.

The inertial igniter embodiment 50 of FIG. 9A is also provided with a delay mechanism mass 69, which is free to translate in a guide (shown as the rolling members 70) along the surface 71 of the inertial igniter body 55 (shown as ground) in the direction perpendicular to the direction of firing acceleration indicated by the arrow 56. The delay mechanism mass 69 is provided with the spring 72, which is attached to the inertial igniter body 55 on one end and to the delay mechanism mass 69 on the other end as shown in FIG. 9A. In normal conditions shown in FIG. 9A, the spring 72 is in its free length (unloaded) condition. The delay mechanism mass 69 is also provided with the link member 73, which is attached to the delay mechanism mass 69 by the rotary joint 74. In normal conditions, the link member 73 is held against the stop 75 on the delay mechanism mass 69 by a very lightly preloaded and low spring rate (such as torsional) spring (not shown for clarity). In the configuration shown in FIG. 9A, the tip 76 of the link member 73 is seen to be configured to engage the tip 77 of the striker mass release member 63 as the delay mechanism mass 69 travels to the right as viewed in FIG. 9A.

The inertial igniter embodiment 50 of FIG. 9A operates as follows. In the schematic of FIG. 9A, the inertial igniter 50 is shown in its pre-initiation state. Now if the device to which the inertial igniter is attached (for example a rocket or a missile) is accelerated in the direction of the arrow 56, if the acceleration is at or above the prescribed (all-fire) acceleration threshold, the inertial force due to the mass of the spring loading mass 52 is configured to overcome the preloading force of the tensile spring 57, and begin to move the spring loading mass 52 downward as viewed in FIG. 9A, causing the tip 78 of the spring loading mass 52 to come in contact with the surface 79 of the delay mechanism mass 69, and begin to push it back (to the left—as seen in the view of FIG. 6B for the embodiment 10 of FIG. 9A) and compress the spring 72.

Figure 9B:
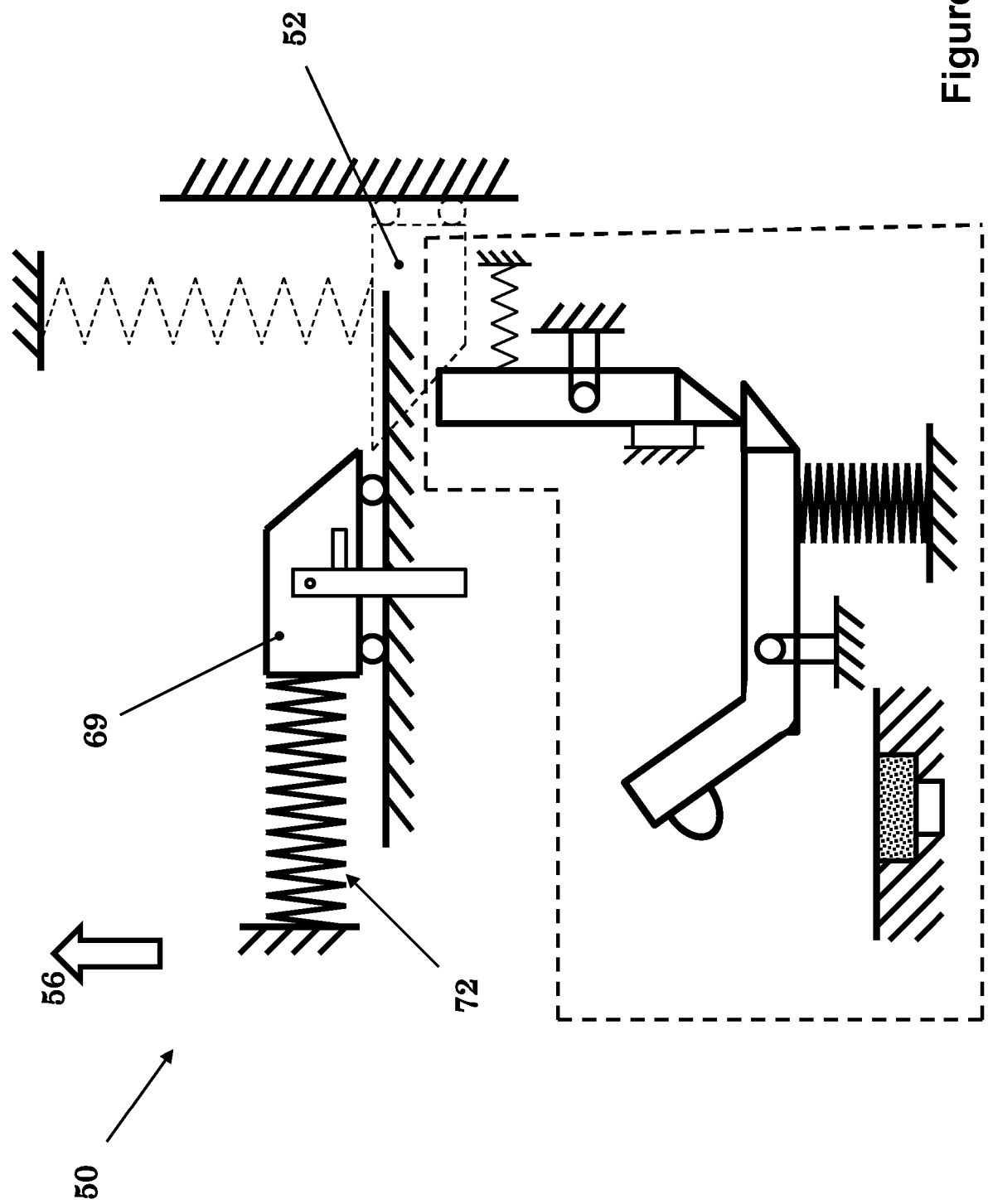
FIG. 9B illustrates the schematic of the second inertial igniter mechanism embodiment of FIG. 9A as subjected to setback threshold or higher acceleration level and the delay mechanism mass is displaced and released.

If the prescribed acceleration persists, the spring loading mass 52 (shown in dashed lines) keeps moving down until its tip 78 clears the surface 79 of the delay mechanism mass 69 as shown in FIG. 9B, at which time the delay mechanism mass 69 has been pushed back and the spring 72 has been compressed their maximum amounts as shown in FIG. 9B. At this time, the compressively loaded spring 72 begins to accelerate the delay mechanism mass 69 to the right as viewed in FIG. 9B.

It is appreciated that if while the spring loading mass 52 is moving down and before releasing the delay mechanism mass 69 the acceleration threshold in the direction of the arrow 56 is ceased, the preloaded tensile spring 57 would bring the spring loading mass 52 to a stop and return it to its initial pre-acceleration and normal condition state.

Figure 9C:
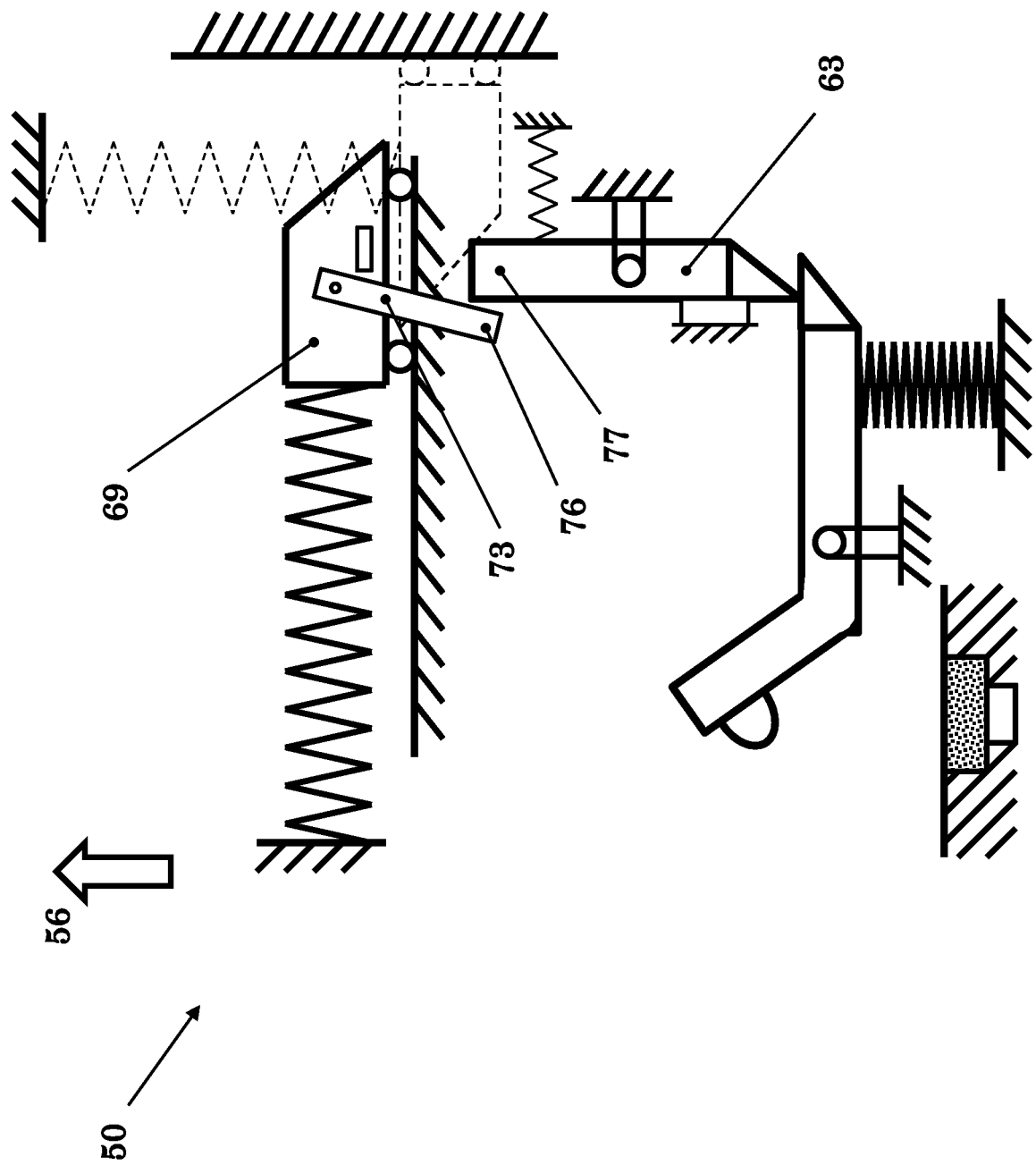
FIG. 9C illustrates the schematic of the second inertial igniter mechanism embodiment of FIG. 9A as the delay mechanism mass begins to pass the striker mass release mechanism lever.

Then as the delay mechanism mass 69 moves to the right as viewed in FIG. 9C, at some point, the tip 76 of the link member 73 engages the tip 77 of the striker mass release member 63, which would force the link member 73 to begin to rotate in the clockwise direction relative to the delay mechanism mass 69. The delay mechanism mass 69 will then continue translating to the right until it comes to a stop after reaching its maximum oscillation position as shown in FIG. 9D (essentially half the period of its aforementioned free oscillation period T, equation (2)), while at some point the tip 76 of the link member 73 clears the tip 77 of the striker mass release member 63.

Figure 9D:
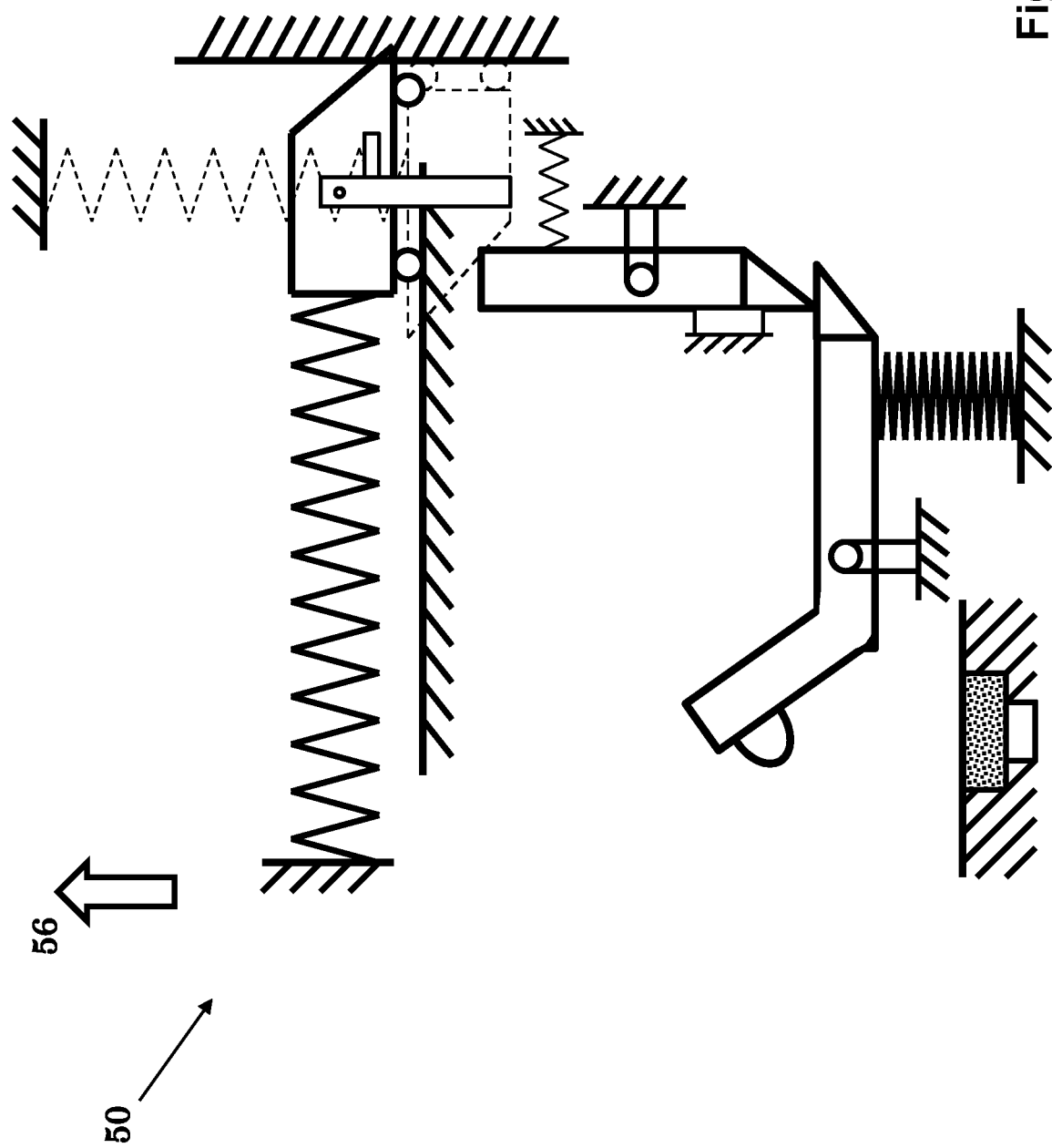
FIG. 9D illustrates the schematic of the second inertial igniter mechanism embodiment of FIG. 9A as the delay mechanism mass passes the striker mass release mechanism lever.
Figure 9E:
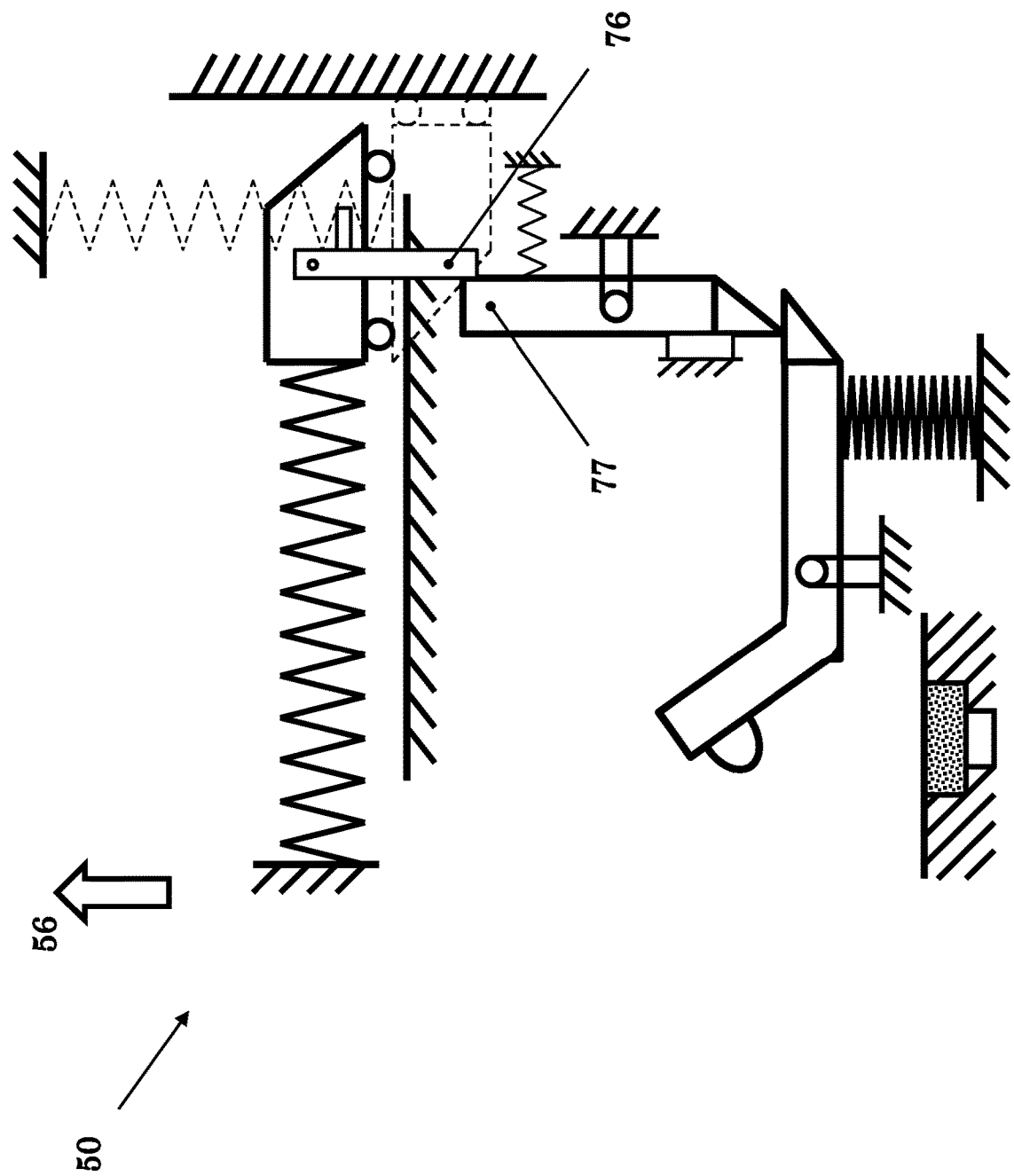
FIG. 9E illustrates the schematic of the second inertial igniter mechanism embodiment FIG. 9A as the delay mechanism mass engages the striker mass release mechanism lever as it returns from its rightmost displacement.

The delay mechanism mass 69 will then begin to travel back to the left as viewed in FIG. 9E. Then at some point the tip 76 of the link member 73 engages the tip 77 of the striker mass release member 63 as shown in FIG. 9E. Then as the delay mechanism mass 69 translates further to the left, the tip 76 of the link member 73 (being prevented from rotating in the counterclockwise direction by the stop 75) begins to rotate the striker mass release member 63 in the counterclockwise direction as viewed in FIG. 9F, which causes the tip 62 of the striker mass release member 63 to slide past the surface of the tip 61 of the striker mass member 58 as shown in FIG. 9F. The striker mass member 58 is thereby released and the preloaded compressive spring 60 begins to rotationally accelerate the striker mass member 58 in the counterclockwise direction. The preloaded compressive spring 60 is configured to accelerate the striker mass member 58 to the required kinetic energy for its ignition pin 67 to initiate the provided percussion primer 68 upon impact as shown by dashed lines in FIG. 9F. The generated ignition flame and sparks would then exit from the provided opening 82 to perform its intended function, for example to enter a thermal battery and activate the battery by igniting the battery pyrotechnic pallets.

It is appreciated by those skilled in the art that as was previously described for the inertial ignite embodiment 10 of FIG. 6A, the mass-spring system of delay mechanism mass 69 and the spring 72 is in its rest position in the schematic of FIG. 9A. The mass element 69 is then displaced to its position shown in the schematic of FIG. 9B by the spring loading mass 52, from which position it is released and starts it oscillatory motion. Thus, by the time that the delay mechanism mass 69 reaches its initial rest position of FIG. 9A, it has traveled one quarter of its cyclic motion, which would have taken a quarter of the period T, equation (2), i.e., a time duration of T/4 (seconds). It is noted that here we are neglecting energy losses due to friction and other effects, which are usually not considerable in low frequency oscillations and when the components, such as bearings and bearing surfaces are properly selected and configured.

The delay mechanism mass 28, would then pass its initial rest position of FIG. 6A as shown in the schematic of FIG. 6C and comes to rest after reaching its maximum oscillation position as shown in FIG. 9D, i.e., after traveling half of its full cyclic oscillatory motion from rest position of FIG. 9B to the rest position of FIG. 9D, for a duration of half the cycle period of T, equation (2).

The delay mechanism mass 69 will then begin to travel back to the left as viewed in FIG. 9E. Then at some point, such as after passing the initial rest position of FIG. 6A, the tip 76 of the link member 73 engages the tip 77 of the striker mass release member 63 and rotates the striker mass release member 63 in the counterclockwise direction as viewed in FIG. 9F and releases the striker mass member 58 and initiate the percussion primer 68 as was previously described. It is therefore appreciated that the time elapsed as the delay mechanism mass 69 moves from its rest position of FIG. 9D to counterclockwise rotation of the striker mass release member 63 to release the striker mass member 58 would be more than a quarter but less than half the period T, equation (2), of the oscillation of the mass (69) and spring (72) system.

Thus, the total time t that it takes the delay mechanism mass 69 to release the striker mass member 58 by engaging and rotating the striker mass release member 63 can be greater than 3T/4 (seconds) but less than T (seconds), i.e., T>t>3T/4.

It is therefore appreciated that by varying the stiffness k of the spring 72 and mass m of the delay mechanism mass 69, the period T, equation (2), of the mass-spring system can be adjusted to match the required delay time from the detection of the aforementioned (setback in the case of fired munitions) acceleration threshold to the time of percussion primer initiation.

It is also appreciated by those skilled in the art that for the same mass-spring sizes, the inertial igniter embodiment type 50 of FIG. 9A can provide more than almost twice the delay time as is possible with the inertial igniter embodiment type 10 of FIG. 6A. The inertial igniter embodiment type 50 of FIG. 9A are therefore more suitable for acceleration events with longer duration thresholds.

It is also appreciated by those skilled in the art that once the inertial igniter embodiment 50 of FIG. 9A has detected the aforementioned prescribed acceleration threshold, i.e., once the spring loading mass 52 has overcome the preloading force of the tensile spring 57 and has completed spring 72 compression and has released the delay mechanism mass 69 as shown in FIG. 9B, the striker mass 58 is released after the above inertial igniter configured time t. This means that if the prescribed acceleration threshold persists less than the prescribed duration threshold, the striker mechanism would still initiate the percussion primer and thereby the reserve battery. In some munition applications, such as in those with relatively short setback acceleration durations, this might not be an issue. However, in most munitions, such as in rockets and missiles with relatively long setback duration threshold requirements, if the acceleration threshold is ceased before the prescribed duration threshold has elapsed, then the striker mass 58 must not be released to initiate the inertial igniter percussion primer or other provided pyrotechnic material and the inertial igniter must reset to its initial state shown in FIG. 9A.

It is also appreciated by those skilled in the art that the two methods to modify the inertial igniter embodiment 10 of FIG. 6A as described for the embodiments of FIGS. 7A and 8A may also be used to modify the inertial igniter embodiment 50 of FIG. 9A to alleviate its above shortcoming as described below.

Figure 10:
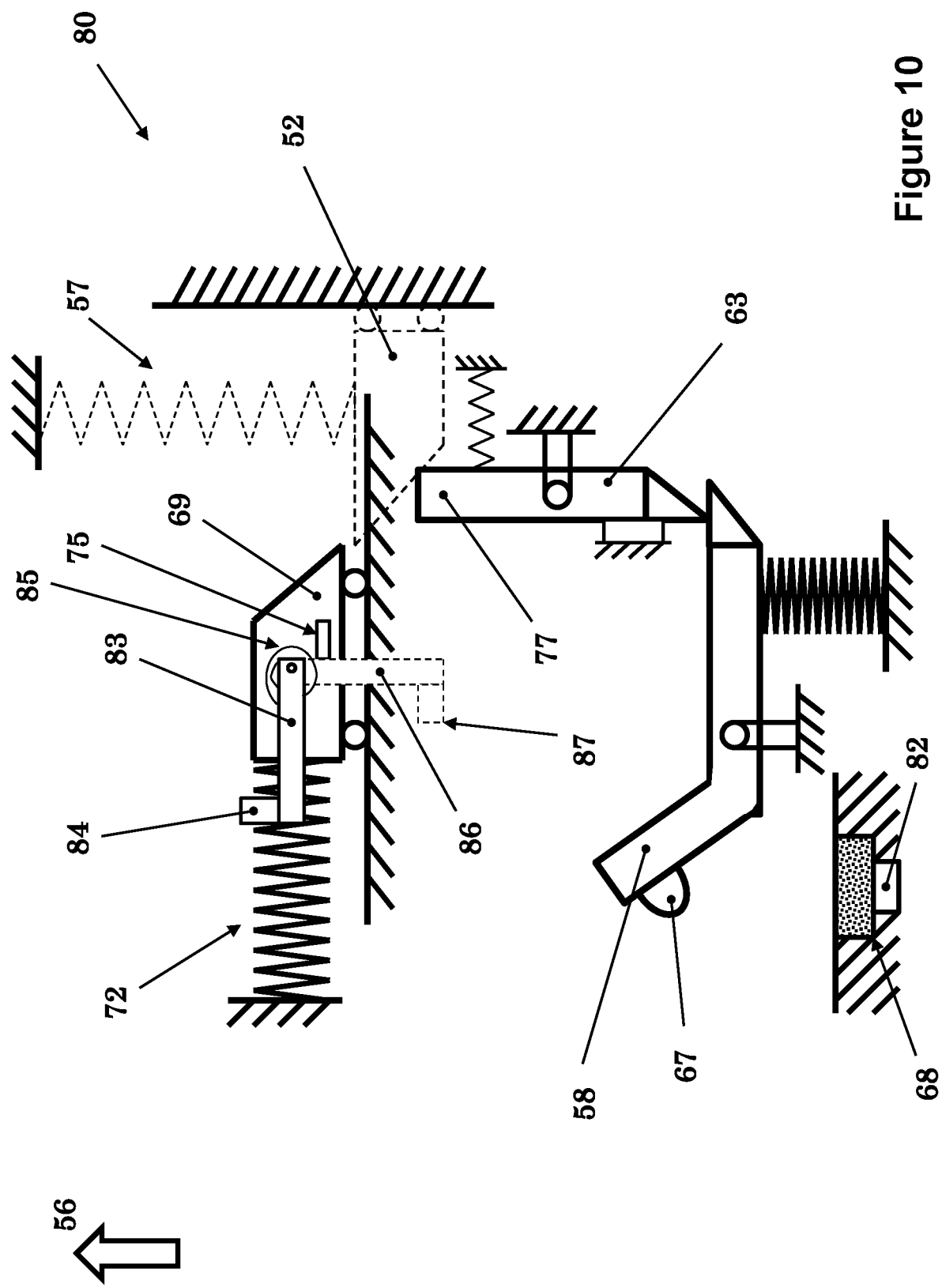
FIG. 10 illustrates the schematic of the first modified inertial igniter of FIG. 9A to prevent ignition before the prescribed duration of the acceleration threshold has elapsed.

The schematic of the first modified inertial igniter embodiment 80 of the inertial igniter embodiment 50 of FIG. 9A is shown in FIG. 10. All components of the inertial igniter embodiment 80 are identical to those of the embodiment 50, except for the link member 73, which is replaced with the modified link member 83, which is similar to the link member 73. The link member 83 may be provided with a small side mass 84 to shift its center of mass slightly from the centerline of the link member for the reason described later. The link member 83 is also provided with the torsional spring 85, which in normal conditions is biased to keep the link member in the position shown in FIG. 10, i.e., horizontally as viewed in FIG. 10. The torsion spring is attached on one end to the link member 83 and to the delay mechanism mass 69 on the other end. A stop member (not shown) may also be provided on the delay mechanism mass 69 to prevent further clockwise rotation of the link member 83.

Then as the device to which the inertial igniter embodiment 80 of FIG. 10 is attached is subjected to an acceleration that is at or above the prescribed threshold in the direction of the arrow 56, and while the spring loading mass 52 overcomes the preloading force of the tensile spring 57 (both shown in dashed lines in FIG. 10) and compresses the spring 72 and releases the delay mechanism mass 69 as shown in FIG. 10, the acceleration also acts on the mass of the link member 84, and rotates it in the counterclockwise direction towards the stop 75 to the configuration shown with dashed lines and indicated by the numeral 86, while overcoming the force of the torsion spring 85. It is appreciated that as can be seen in the schematic of FIG. 10, the provision of the small mass 84 is intended to position the center of mass of the link member 83 to the right of the centerline of the link member as seen in its dashed lines configuration, thereby ensuring that the link member is positioned at or close to the stop 75 when the inertial igniter is subjected to the prescribed acceleration threshold. The torsion spring 85 rate and the effective inertia of the link member 83 in its positioning 86 are selected to provide minimal resistance to its clockwise rotation as it engages the tip 77 of the striker mass release member 63 as shown in the schematic of FIG. 9C.

Now if the acceleration in the direction of the arrow 56 stays at or above the prescribed (all-fire in munitions) threshold, then the inertial embodiment 80 functions as was described for the inertial igniter embodiment of FIG. 9A and at the indicated time t, the tip 87 of the member 83 (in its positioning 86) would engage the tip 77 of the striker mass release member 63 and cause the striker mass 58 to be released and initiate the percussion primer 68 as shown in the schematic of FIG. 9F.

However, if at any time before the tip 87 of the link member 83 engages the tip 77 of the striker mass release member 63 the acceleration level in the direction of the arrow 56 drops below the prescribed threshold, the link member 37 is rotated in the clockwise direction by the preloaded tensile spring 85 towards the configuration shown in solid line in FIG. 10, thereby preventing the striker mass from being released and therefore the percussion primer 68 from being initiated. As a result, the modified inertial igniter embodiment 80 of FIG. 10 would only initiate the percussion primer or other pyrotechnic material 68 if the acceleration in the direction of the arrow 56 stays at or above the prescribed threshold and for the entire prescribed duration t (all-fire condition in munitions).

It is appreciated that in the inertial igniter embodiment 80 of FIG. 10 the member 83 is shown to be deployed by rotation about a rotary joint 74 (FIG. 9A), with which it is attached to the delay mechanism mass 69. Alternatively, the link member 83 may instead be provided a guide (not shown) on the delay mechanism mass 69 to allow it to slide up and down in the direction parallel to the arrow 56, while being normally held up and away from engagement with the tip 77 of the striker mass release member 63 by a preloaded tensile spring like the spring 39 in FIG. 7A. Then the sliding link member 83 would be similarly deployed by the acceleration in the direction of the arrow 56 when the acceleration is at or above the prescribed threshold for engagement with the tip 77 of the striker mass release member 63 and is withdrawn when the acceleration drops below the prescribed threshold to prevent engagement with the tip 77 of the striker mass release member 63.

Figure 11A:
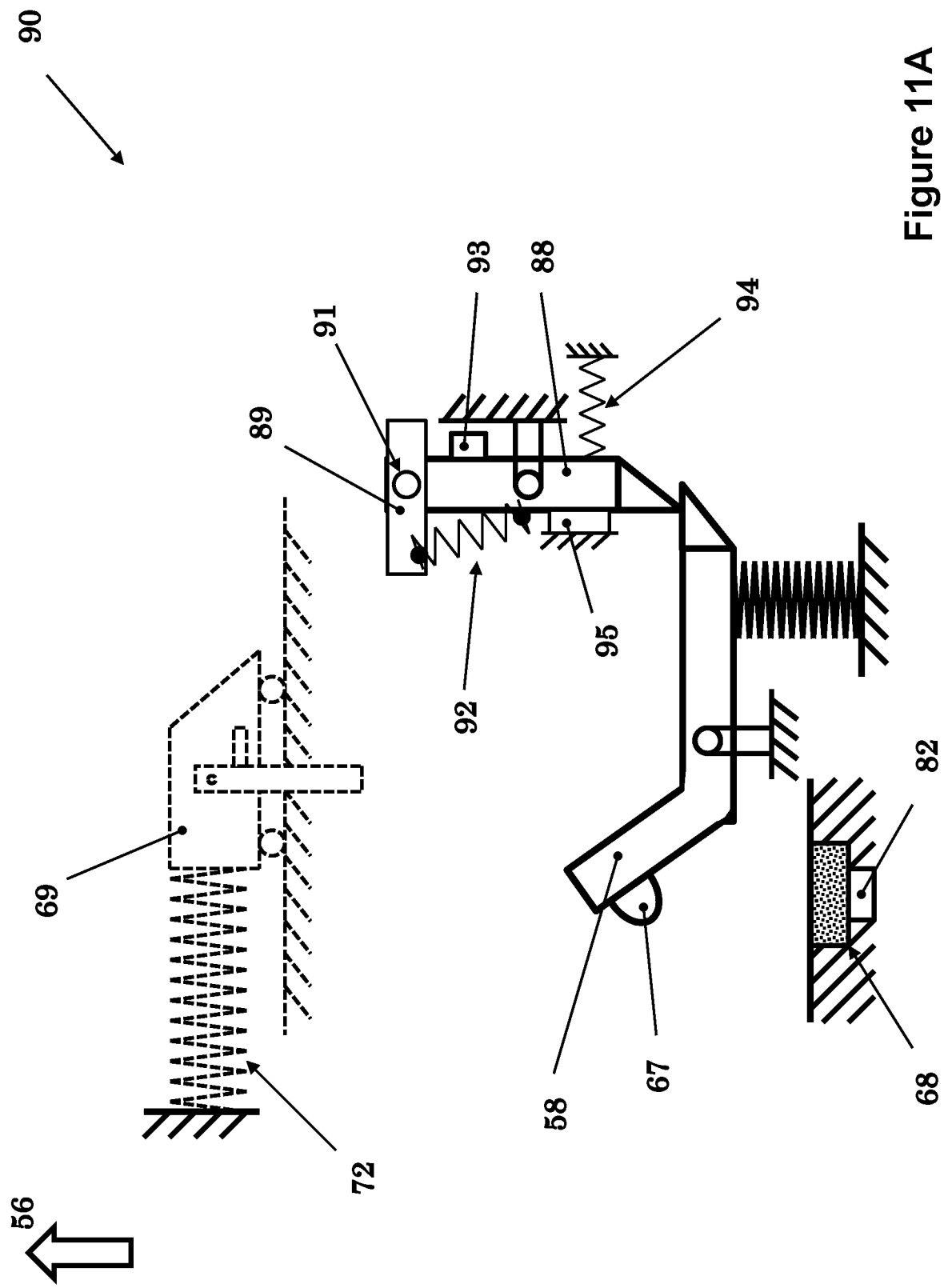
FIG. 11A illustrates the schematic of the second modified inertial igniter of FIG. 9A to prevent ignition before the prescribed duration of the acceleration threshold has elapsed.

The schematic of the second modified inertial igniter embodiment 90 of the inertial igniter embodiment 50 of FIG. 10 is shown in FIG. 11. All components of the inertial igniter embodiment 90 are identical to those of the embodiment 50, except for the striker mass release member 63, which is replaced with the modified striker mass release member 88. The modified striker mass release member 88 is configured to avoid engagement with the tip 76 of the link member 73 of the delay mechanism mass 69 unless the inertial igniter is being subjected to an acceleration in the direction of the arrow 56 that is at or above the prescribed threshold (all-fire in munitions). In FIG. 11A, only the modified striker mass release member 88 (63 in FIG. 9A) together with the striker mass 58 mechanism components and the delay mechanism mass 69 and its components (shown in dashed lines) of the inertial igniter 50 (FIG. 9A) are shown. The schematic of FIG. 11A shows the configuration of the striker mass release mechanism of the inertial igniter in normal conditions.

The striker mass release member 63 (striker mass release member 88 in FIG. 11A) together with the striker mass 58 mechanism component of the inertial igniter 50, as shown in the enclosed dashed-lines area in FIG. 9B, is shown in the schematic of FIG. 11A. The schematic of FIG. 11A shows the configuration of the striker mass release mechanism of the inertial igniter in normal conditions.

As can be seen in the schematic of FIG. 11A, as compared to the embodiment of FIG. 9A, the tip 77 of the striker mass release member 63 (88 in FIG. 11A) is lowered to below the tip 76 of the link member 73 of the delay mechanism mass 69, and is provided with the member 89, which is attached to the striker mass release member 88 by the rotary joint 91. In normal conditions shown in FIG. 11A, the member 89 is held in the configuration shown in FIG. 11A, i.e., under the tip 76 of the link member 73 of the delay mechanism mass 69 to prevent their engagement, by the compressive spring 92, which is attached to the member 89 on one end and to the striker mass release member 88 on the other end, such as with pin joints that allow free rotation. In the normal condition configuration shown in FIG. 11A, the compressive spring 92 is essentially in its free length condition. Alternatively, an unloaded torsional spring (not shown) may be used instead of the compressive spring 92. In addition, the preloaded compressive spring 94, which biases the striker mass release member 88 against the stop 95 may also be replaced with a preloaded torsion spring (not shown) in all described embodiments.

Figure 11B:
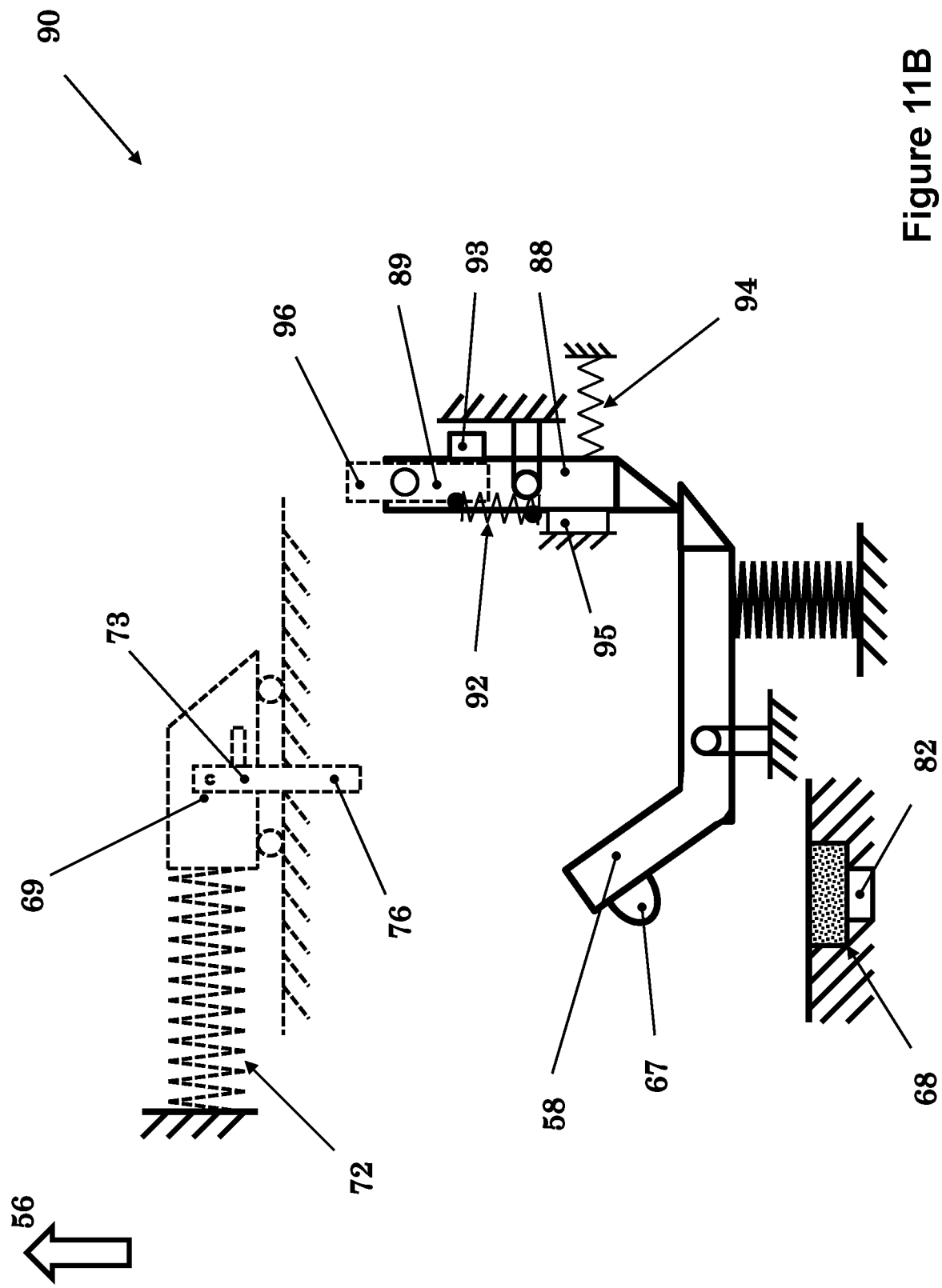
FIG. 11B illustrates the schematic of the modified inertial igniter of FIG. 11A as it is subjected to the prescribed acceleration threshold.

Then as the device to which the inertial igniter embodiment 90 with the components of FIG. 11A is attached is accelerated in the direction of the arrow 56 at or above the prescribed acceleration threshold (all-fire condition in munitions), and while as shown in FIG. 9A the spring loading mass 52 overcomes the preloading force of the tensile spring 57 and begins to compress the spring 72 to release the delay mechanism mass 69, FIG. 9B, the acceleration also acts on the mass of the member 89 with its center to the left of the rotary joint 91 as viewed in FIG. 11A, and after overcoming any present preloading force of the spring 92, begins to rotate the member 89 in the clockwise direction as viewed in FIG. 11A towards the provided stop 93. The preload level and the stiffness of the spring 92 and the effective inertia of the member 89 are selected such that the member 89 is fully deployed and essentially held against the stop 93 as shown in FIG. 11B as the delay mechanism mass 69 is released as shown in FIG. 9B.

Now if the acceleration in the direction of the arrow 56 stays at or above the prescribed (all-fire in munitions) threshold, then the inertial igniter embodiment 40 functions as was described for the inertial igniter embodiment of FIG. 9A and at the indicated time t, the tip 76 of the link member 73 of the delay mechanism mass 69 would engage the tip 96 of the striker mass release member 89, going through the stages shown in FIGS. 9C-9E, and cause the striker mass 58 to be released and initiate the percussion primer 68 as shown in the schematic of FIG. 9F.

However, if at any time before the tip 76 of the link member 73 of the delay mechanism mass 69 engages the tip 96 of the striker mass release member 89 on its return motion as shown in FIG. 9E to begin to rotate the striker mass release member 88 in the counterclockwise direction as viewed in FIG. 11B to release the striker mass 58 the acceleration level in the direction of the arrow 56 drops below the prescribed threshold, the member 89 is rotated in the clockwise direction by the compressive spring 92 towards the configuration shown in FIG. 11A. As a result, the striker mass 58 is not released and therefore the percussion primer 68 is not initiated. As a result, the modified inertial ignite embodiment 90 of FIG. 11A would only initiate the provided percussion primer or other pyrotechnic material 68 if the acceleration in the direction of the arrow 56 stays at or above the prescribed threshold and for the entire prescribed duration (all-fire condition in munitions).

It is appreciated by those skilled in the art that in the modifies inertial igniter embodiments of FIGS. 10 and 11A, if the acceleration in the direction of the arrow 56 is at or above the prescribed threshold but does not persist the entire prescribe duration, then the striker mass 58 is not released and the inertial igniter returns to its initial (normal) state, i.e., the inertial igniter is reset, and can later be initiated if the prescribed acceleration threshold and duration are detected.

It is appreciated by those skilled in the art that in the inertial igniter embodiment 80 of FIG. 10, once the link member 86 has passed to the right of the striker mass release member 63 as viewed in FIG. 10, if the acceleration in the direction of the arrow 56 drops below the prescribed threshold and if the tip 87 of the link member 86 is too close to the tip 77 of the striker mass release member 63, then the tip 87 of the link member 86 may not have enough room to clear the tip 77 of the striker mass release member 63 as it is rotated by the torsion spring in the clockwise direction relative to the delay mechanism mass 69. As a result, the releasing of the striker mass 58 is not prevented if the acceleration in the direction of the arrow 56 falls below the prescribed threshold as the link member 86 approaches the striker mass release member 63 for its actuation and is too close to it.

It is, however, also appreciated by those skilled in the art that the above shortcoming is not present in the inertial igniter embodiment 90 since as can be seen in FIG. 11B, the tip 96 of the member 89 is quickly removed from the path of the tip 76 of the link member 73 by the force of the spring 92 due to its short engagement tip length.

In the above inertial igniter embodiments, percussion primers are shown to be used to generate the required flame and sparks. It is appreciated that alternatively, appropriate pyrotechnic materials, such as those generally used in percussion primers or one of the recently developed green (no-lead) versions may be used directly as described for the prior art inertial igniters of FIGS. 1-5.

The above disclosed inertial igniter embodiments are configured to initiate a percussion primer or some other appropriate pyrotechnic material when subjected to an acceleration that is at or above a prescribed threshold for a prescribed duration (all-fire condition for munitions). The basic operating mechanism of these embodiments may also be used to construct normally open (closed) electrical switches that close (open) a circuit when subjected to similar accelerations that are at or above a prescribed threshold for a prescribed duration (all-fire condition for munitions).

In the above disclosed inertial igniter embodiments, a striker mass member is released once an acceleration in the intended direction (direction of firing for munitions) that is at or above a prescribed threshold for a prescribed duration is detected, a striker mass is released and is accelerated to the required velocity by a preloaded spring (elastic) member to initiate a provided percussion primer or other pyrotechnic material upon impact. The same mechanism used for the release of the striker mass upon detection of the prescribed acceleration threshold and its duration can be used to provide the means of opening or closing or both of at least one electrical circuit, i.e., act as a so-called "Impulse Switch", that is actuated only if it is subjected to the above prescribed minimum acceleration threshold for the prescribed minimum duration, while staying inactive during all other "impulse" conditions, even if the acceleration level is higher than the prescribed minimum acceleration threshold but its duration is shorter than the prescribed duration threshold.

Such "impulse switches" also have numerous non-munitions applications. For example, such impulse switches can be used to detect events such as impacts, falls, structural failure, explosions, etc., and open or close electrical circuits to initiate prescribed actions.

Such "impulse switch" embodiments for opening/closing electrical circuits, with and without latching features, are described herein together with alternative methods of their configuration, such as modular configurations that can be readily assembled to the customer requirements.

The disclosed "impulse switches" function like the disclosed inertia igniter embodiments. They similarly comprise of two basic mechanisms so that together they provide for mechanical safety, and the switching mechanism, which provides the means to open or close electrical circuits. The function of the safety system is to prevent activation of the switching mechanism until the prescribed minimum acceleration threshold and its minimum duration has been detected and would only then release the switching mechanism, thereby allowing it to undergo its actuation motion to open or close the electrical circuit by connecting or disconnecting electrical contacts. The switching mechanism may be held in its activated state, i.e., may be provided with a so-called latching mechanism, or may move back to its pre-activation state after opening or closing the circuit.

The basic configuration of such impulse switches using the configuration and functionalities of the disclosed inertial igniter embodiments is herein described using the inertial igniter embodiment of FIGS. 9A-9F. However, it is appreciated by those skilled in the art that other inertial igniter embodiments may also be similarly modified to function as impulse switches.

Figure 12:
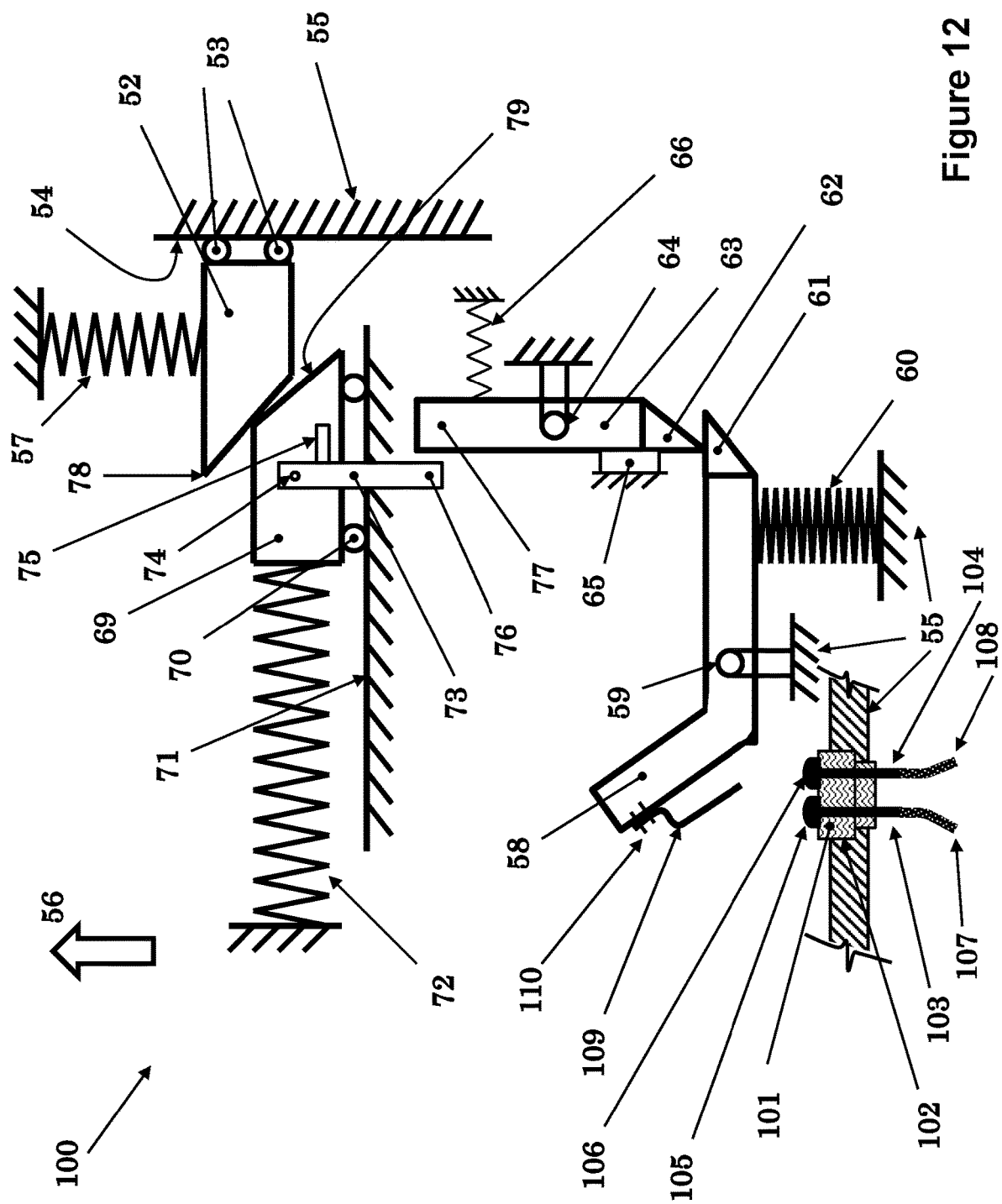
FIG. 12 illustrates a schematic view of the normally open impulse switch embodiment for closing electrical circuits when subjected to a prescribed all-fire or the like condition in its non-activated state.

The schematic of such an impulse switch embodiment 100 is shown in FIG. 12. The basic configuration of the impulse switch 100 is the same as the inertial igniter embodiment 50 of FIGS. 9A-9F, except that its percussion primer 68 and the sharp pin 67 of the striker mass 58 are removed and replaced the electrical switching components and thereby converting the inertial igniter embodiment 50 into impulse switches for opening or closing electrical circuits as described below.

In the impulse switch embodiment 100 of FIG. 12, an element 101, which is constructed of an electrically non-conductive material is fixed to the impulse switch body 55.

The electrically non-conductive element 101 may be attached to the impulse switch body 55 by fitting it into a provided pocket 102 in impulse switch body. The element 101 is provided with two electrically conductive elements 103 and 104 with contact ends 105 and 106, respectively. The electrically conductive elements 103 and 104 may be provided with the extended ends to form contact "pins" for direct insertion into provided holes in a circuit board or may alternatively be provided with wires 107 and 108, respectively, for connection to appropriate circuit junctions.

Previously described striker mass member 58 is provided with a flexible strip of electrically conductive material 109, FIG. 12, instead of the sharp pin 67, FIG. 9A. The flexible strip of electrically conductive material 109 is fixedly attached to the surface of the striker mass member 58 as shown in FIG. 12, for example, with fasteners 110 or by soldering or other methods known in the art.

The basic operation of the impulse switch 100 of FIG. 12 is very similar to that of the inertial igniter 50 of FIGS. 6A-6D. Here again and as was described for the inertial igniter 50, when the impulse switch 100 is accelerated in the direction of the arrow 56 at or above the prescribed threshold for the prescribed duration, the striker mass release member 63 is rotated in the counterclockwise direction until the striker mass member 58 is released as was described for the inertial igniter 50 and shown in FIG. 6D.

Figure 14:
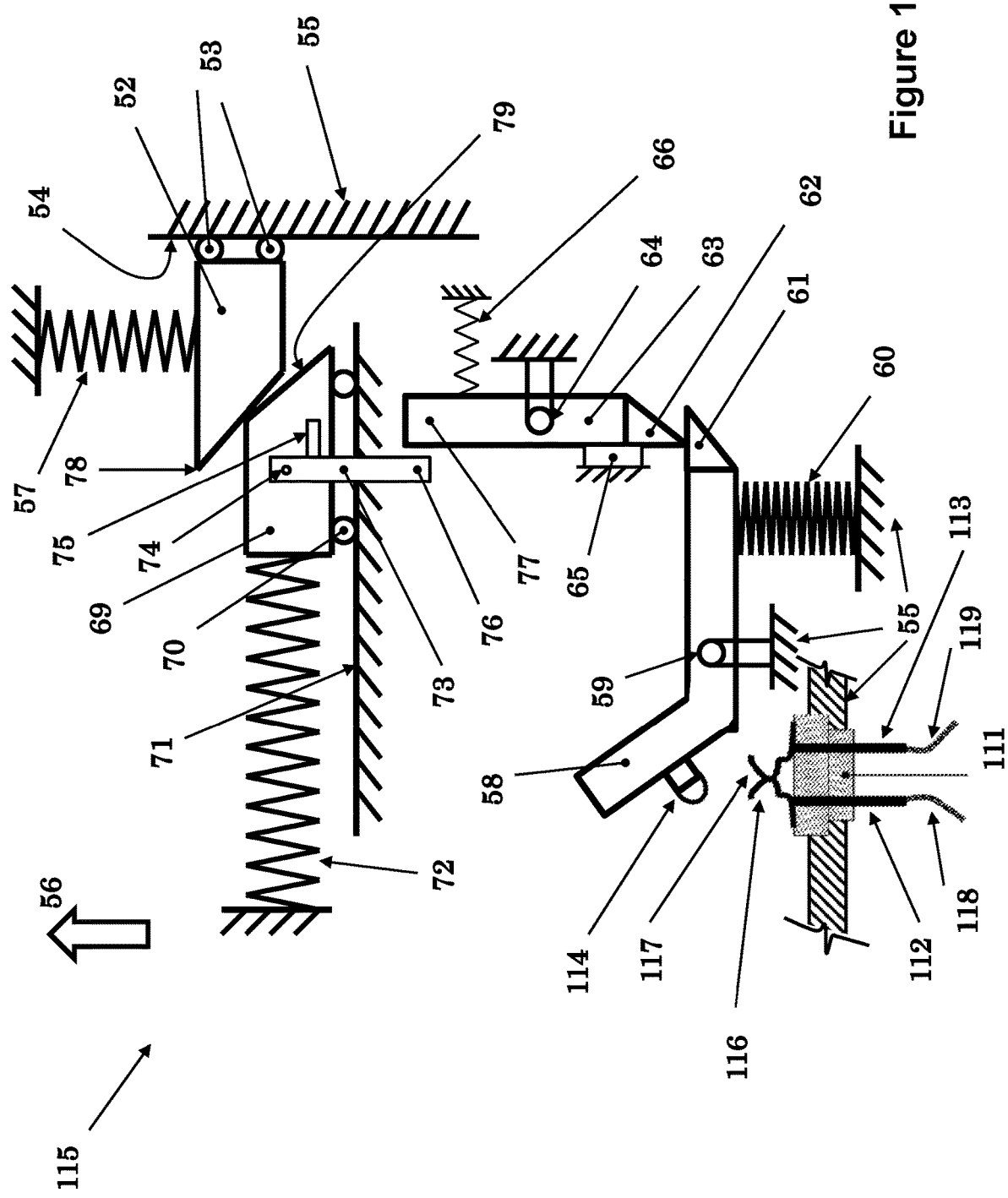
FIG. 14 illustrates a schematic view of the normally closed impulse switch embodiment for closing electrical circuits when subjected to a prescribed all-fire or the like condition in its non-activated state.

At this point, the mechanical (potential) energy in the preloaded compressive spring 60 begins to rotationally accelerate the striker mass 58 in the counterclockwise direction until the strip of the electrically conductive material 109 comes into contact with the contact ends 105 and 106, thereby closing the circuit to which the impulse switch 100 is connected through the electrically conductive elements 103 and 104 or wires 107 and 108 as shown in the schematic view of FIG. 14.

Figure 13:
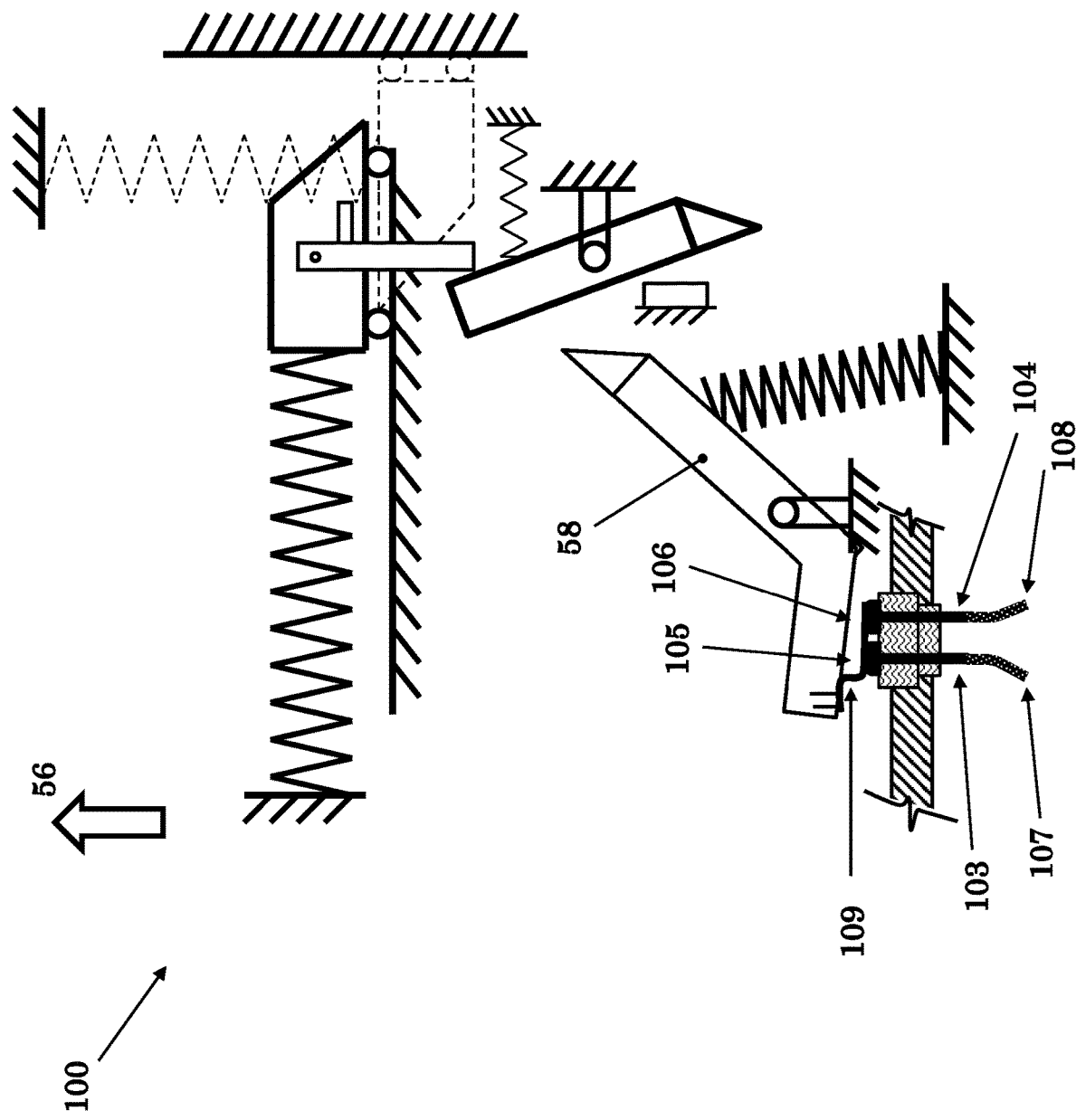
FIG. 13 illustrates a schematic view of the normally open impulse switch embodiment of FIG. 12 for closing electrical circuits in its activated state after having been subjected to a prescribed all-fire or the like condition.

It is appreciated by those skilled in the art that the impulse switch 100 of FIGS. 12-13 is a "normally open impulse switch" and once activated due to the prescribed minimum acceleration level threshold in the direction of the arrow 56 for the prescribed duration, it would close the circuit to which it is connected as described above. The "normally open impulse switch" 100 may also be configured to be a "latching" type, i.e., keep the circuit closed after activation, or be a "non-latching" type, i.e., close the switch and momentarily open it.

To make the impulse switch 100 into a "latching normally open impulse switch" type, the level of preload in the compressive spring 60 is selected such that once the impulse switch is activated as shown in its activated state in the schematic of FIG. 13, the compressive spring 60 is still in its preloaded compressive state. As a result, following activation, as is seen in the schematic of FIG. 13, the electrically conductive material 109 strip is still forced against the contacts 105 and 106 by the still compressively preloaded spring 60.

However, to make the impulse switch 100 into a "non-latching normally open impulse switch" type, the level of preload in the compressive spring 60 is selected such that once the impulse switch is activated as shown in its activated state in the schematic view of FIG. 13, the compressive spring 60 has passed its free length (not loaded) state, i.e., it is loaded in tension, thereby moments after closing the circuit as shown in the schematic of FIG. 13, the striker mass 58 is rotated back in the clockwise direction as viewed in FIG. 13, and the contact between the electrically conductive material 109 strip and the contacts 105 and 106 is lost, thereby the circuit using the impulse switch 100 is open again.

The normally open impulse switch 100 of FIGS. 12-13 may also be modified to function as a normally closed impulse switch. The schematic of such a normally closed impulse switch embodiment 115 is shown in FIG. 14. The basic configuration and operation of the impulse switch 115 is identical to that of the normally open impulse switch embodiment 100 of FIGS. 12-13, except for its electrical switching contacts and related elements described below to convert it from a normally open to a normally closed impulse switch.

In the normally closed impulse switch embodiment 115 of FIG. 14, like the normally open impulse switch 100 of FIG. 12, an element 111, which is constructed of an electrically non-conductive material is fixed to the impulse switch body 55. The electrically non-conductive element 111 may be attached to the impulse switch body 55 by fitting it into a provided pocket (102 in FIG. 12) in the impulse switch body. The element 111 is provided with two electrically conductive elements 112 and 113 with flexible contact ends 116 and 117, respectively. The flexible electrically conductive contact ends 116 and 117 are biased to press against each other as seen in the schematic of FIG. 14. As a result, a circuit connected to the electrically conductive elements 112 and 113 is normally closed in the pre-activation state of the impulse switch 115 as shown in the configuration of FIG. 14.

The electrically conductive elements 112 and 113 may be provided with the extended ends to form contact "pins" for direct insertion into provided holes in a circuit board or may alternatively be provided with wires 118 and 119, respectively, for connection to appropriate circuit junctions.

Previously described striker mass member 58 is provided with an electrically nonconductive wedge element 114, which is fixed to the surface of the striker mass member 58 as shown in FIG. 14, for example, by an adhesive or using other methods known in the art.

The basic operation of the impulse switch 115 of FIG. 14 is very similar to that of the inertial igniter 50 of FIGS. 6A-6D. Here again and as was described for the inertial igniter 50, when the impulse switch 115 is accelerated in the direction of the arrow 56 at or above the prescribed threshold for the prescribed duration, the striker mass release member 63 is rotated in the counterclockwise direction until the striker mass member 58 is released as was described for the inertial igniter 50 and shown in FIG. 6D.

Figure 15:
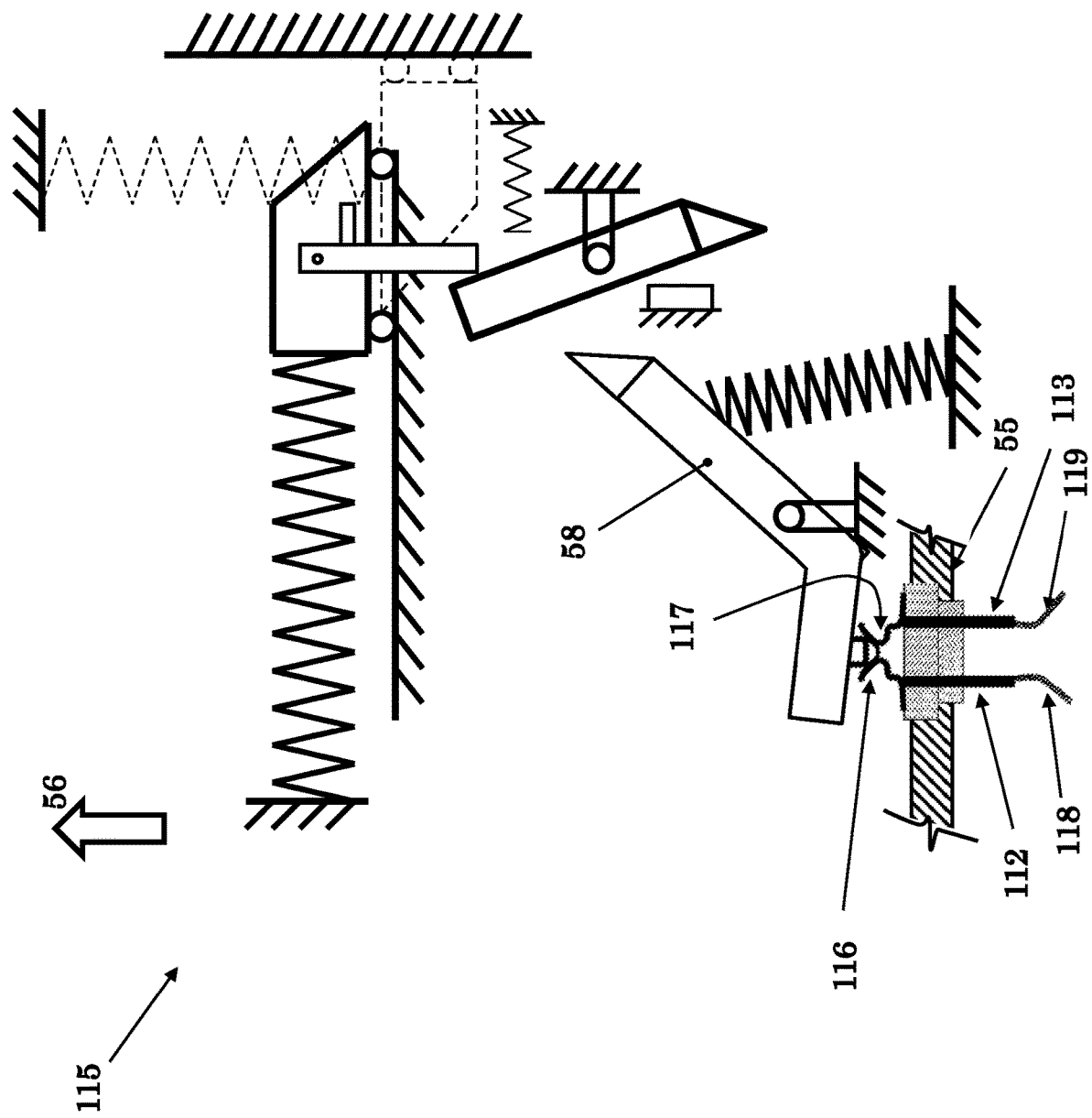
FIG. 15 illustrates a schematic view of the normally closed impulse switch embodiment of FIG. 13 for closing electrical circuits in its activated state after having been subjected to a prescribed all-fire or the like condition.

At this point, the mechanical (potential) energy in the preloaded compressive spring 60 begins to rotationally accelerate the striker mass 58 in the counterclockwise direction until the electrically nonconductive wedge element 114 is inserted between the contacting surfaces of the flexible electrically conductive contact ends 116 and 117, thereby opening the circuit to which the impulse switch 115 is connected (through the electrically conductive elements 112 and 113 or wires 118 and 119) as shown in the schematic view of FIG. 15.

It is appreciated by those skilled in the art that the impulse switch 115 of FIGS. 14-15 is a "normally closed impulse switch" and once activated due to the prescribed minimum acceleration level threshold in the direction of the arrow 56 for the prescribed duration, it would open the circuit to which it is connected as described above. The "normally closed impulse switch" 115 may also be configured to be a "latching" type, i.e., keep the circuit open after activation, or be a "non-latching" type, i.e., open the switch and momentarily close as described below.

To make the impulse switch 115 into a "latching normally closed impulse switch" type, the level of preload in the compressive spring 60 is selected such that once the impulse switch is activated as shown in its activated state in the schematic of FIG. 15, the compressive spring 60 is still in its preloaded compressive state. As a result, following activation, as is seen in the schematic of FIG. 15, the electrically nonconductive wedge element 114 would thereby stay inserted between the contacting surfaces of the flexible electrically conductive contact ends 116 and 117 and the circuit stays open.

However, to make the impulse switch 115 into a "non-latching normally closed impulse switch" type, the level of preload in the compressive spring 60 is selected such that once the impulse switch is activated as shown in its activated state in the schematic view of FIG. 15, the compressive spring 60 has passed its free length (not loaded) state, i.e., it is loaded in tension, thereby moments after closing the circuit as shown in the schematic of FIG. 15, the striker mass 58 is rotated back in the clockwise direction as viewed in FIG. 15, and the flexible electrically conductive contact ends 116 and 117 come into contact and the impulse switch is closed again.

The embodiments 100 and 115 of FIGS. 12-13 and 14-15, respectively, illustrate how the inertial igniter embodiment 50 of FIGS. 9A-9F can be converted to normally open and normally closed electrical "impulse switches" of latching and non-latching types. It is appreciated by those skilled in the art that the inertial igniters of FIGS. 6A-6D, 7A-7B, 8A-8B, 10 and 11A-11B may also be similarly converted to any of the above electrical "impulse switch" types.

It is appreciated by those skilled in the art that in thermal and other reserve batteries that use inertial igniters, such as if the inertial igniter is assembled inside the battery housing or inside the device housing, it is highly desirable to have the capability of determining if the initiator has been activated or not, for example after an accidental drop. In certain cases, the inertial igniter has activated but the reserve battery has failed to activate. In yet another case, the inertial igniter may have been activated but the percussion primer or other pyrotechnic material that is used may have not been ignited. In short, it is highly desirable for the reserve battery user to be able to determine the status of the battery without having to perform x-ray or other complicated and expensive testing. In addition, in certain applications, it is highly desirable for the munitions and/or the weapon system control system to be able to obtain the above battery status information for optimal operation and safety. To this end, the disclosed inertial igniter embodiments may be readily equipped to perform the above tasks as described below by an example of the required modifications to the embodiment 50 of FIGS. 6A-6D. The remaining embodiments may be similarly modified to perform the described functionality.

Figure 16:
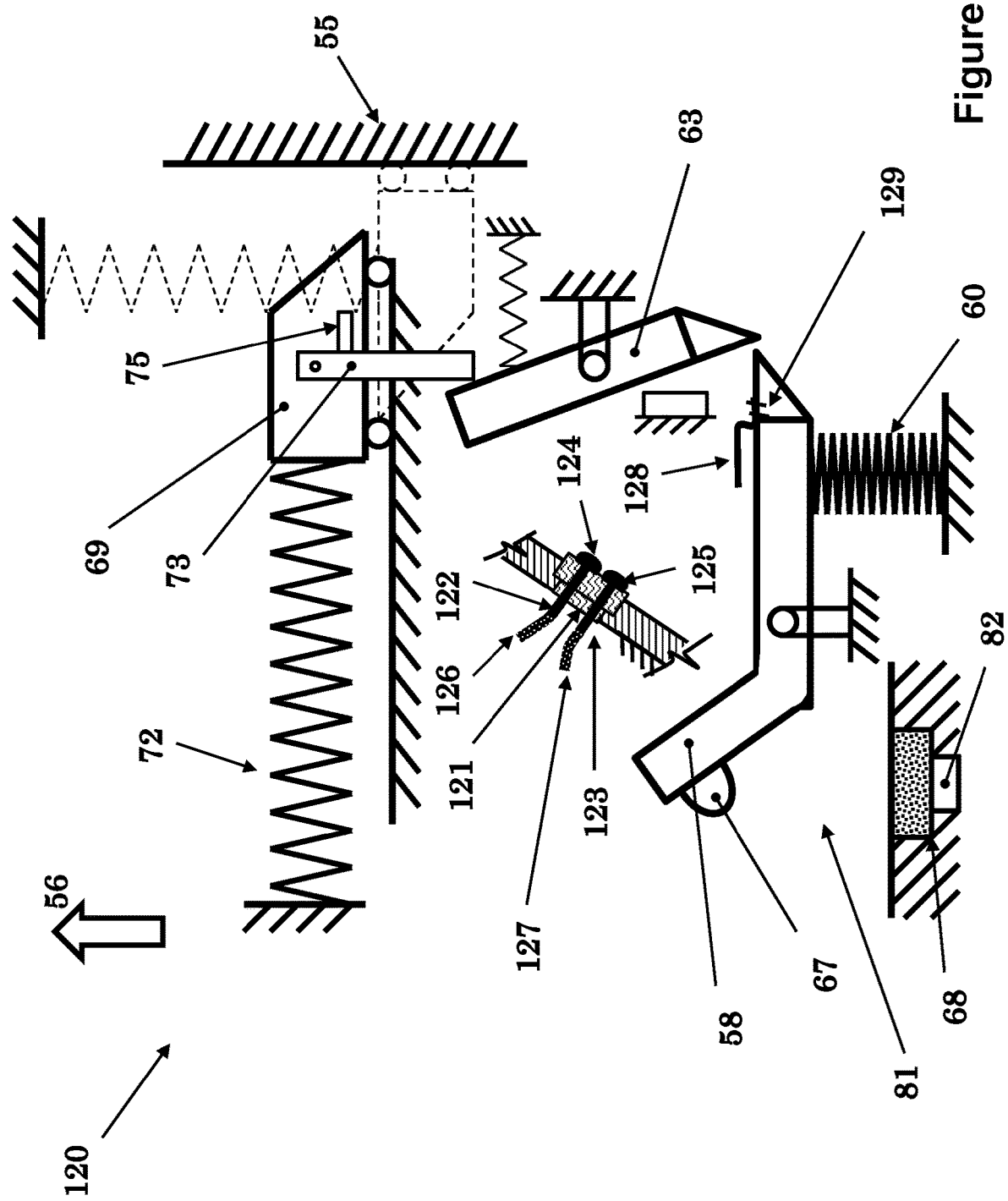
FIG. 16 illustrates the schematic of an "inertial igniter with activation state indicating sensor" embodiment constructed with the inertial igniter of FIG. 9A with an integrated normally open impulse switch.

FIG. 16 shows the schematic view of the embodiment 50 just as the striker mass 58 is released as shown in FIG. 9F, with the modification for the inertial igniter to also function as an electrical switch, which would indicate if the inertial igniter has been activated, i.e., for the user to determine the activation state of the inertial igniter. The resulting inertial igniter with the integrated "activation state indicating sensor" of FIG. 16 is indicated by the numeral 120 and is hereinafter referred to as the "inertial igniter with activation sensor".

The "inertial igniter with activation state indicating sensor" embodiment 120 of FIG. 16 is identical to the inertial igniter embodiment 50 of FIGS. 6A-6D, except for the addition of the following electrical contact forming components to provide the means of sensing whether the inertial igniter has been activated. In the "inertial igniter with activation state indicating sensor" embodiment 120, like the impulse switch embodiment 100 of FIG. 12, an element 121(101 in FIG. 12), which is constructed of an electrically non-conductive material is fixed to the body 55 (shown as ground) of the inertial igniter. The electrically non-conductive element 121 may be attached to the body 55 of the inertial igniter by fitting it in the matching opening as shown in FIG. 16. The element 121 is provided with two electrically conductive elements 122 and 123 with contacts 124 and 125, respectively. The electrically conductive elements 122 and 123 may be extended to form contact "pins" for direct insertion into provided holes in a circuit board or may alternatively be provided with wires 126 and 127 for connection to appropriate circuit junctions.

Previously described striker mass 58 is then provided with a flexible strip of electrically conductive material 128, which is fixed to the surface of the striker mass 58 as shown in FIG. 16, for example, with fasteners 129 or by soldering or other methods known in the art.

The operation of the "inertial igniter with activation state indicating sensor" embodiment 120 of FIG. 16 is the same as that of the inertial igniter 50 of FIGS. 6A-6D. Here again and as was described for the inertial igniter 50, when the "inertial igniter with activation state indicating sensor" embodiment 120 is accelerated in the direction of the arrow 56 at or above the prescribed threshold and for the prescribed duration (all-fire condition in munitions), the striker mass release member 63 is rotated in the counterclockwise direction until the striker mass member 58 is released and is rotationally accelerated in the counterclockwise direction until the sharp tip 67 of the striker mass member 58 strikes the percussion primer or other appropriate pyrotechnic material 68 and initiates it as shown in FIG. 6D. In the meantime, the strip of the electrically conductive material 128 would come into contact with the contact ends 124 and 125, thereby closing the circuit to which the electrically conductive elements 122 and 123 (or their connected wires 126 and 127) are connected, indicating that the "inertial igniter with activation state indicating sensor" has been activated.

Alternatively, since the striker mass member 58 is usually metallic, for example made from brass or stainless steel and therefore electrically conductive, there may not be any need for the flexible strip of electrically conductive material 128. In such cases, the contact ends 124 and 125 may be flexible to ensure contact with the surface of the striker mass member 58.

The "inertial igniter with activation state indicating sensor" embodiment 120 is shown to perform percussion primer initiation as well as an impulse switch functionality. As a result, when the device is packaged in a reserve battery or in any other device for initiation of pyrotechnic materials or the like, the user or the system controller or diagnostic system can check the activation status of the inertial igniter for safety and/or for system readiness or the like. The activation status sensor component of the device may also be used as an input to the system activation status indication algorithm, for example as an independent sensory input to munitions fuzing to indicate if the munitions was fired.

The "inertial igniter with activation state indicating sensor" embodiment 120 acts as a normally open and latching electrical impulse switch, in which the switch is closed and stays closed when the inertial igniter is activated. It is appreciated by those skilled in the art that the electrical impulse switch may also be configured to be of a non-latching type. Similarly, the electrical impulse switch may also be configured as a normally closed electrical impulse switch of latching and non-latching type as was described for the impulse switch embodiment of FIGS. 12-15.

The disclosed inertial igniter embodiments of FIGS. 6A-6D, 7A-7B, 8A-8B, 9A-9F, 10 and 11A-11B; the electrical switch embodiments of FIGS. 12-15, and the "inertial igniter with activation state indicating sensor" embodiment of FIG. 16 are all configured with a linearly oscillating mass-spring mechanisms (delay mechanism mass 69 and spring 72 for the case of the inertial igniter 50 of FIGS. 9A-9F).

In certain applications, such as in many gun-fired munitions, rockets, and missiles, besides the setback acceleration, munitions are also subjected to considerable lateral acceleration pulses (usually called balloting in munitions). In such applications, as can, for example, be seen in the schematic of FIG. 9A, the inertial igniter embodiment 50 may be subjected to acceleration/deceleration pulses in the directions perpendicular to the direction of the firing indicated by the arrow 56. It is appreciated by those skilled in the art that such acceleration/deceleration pulses, even though they are always very short in duration and do not result in a net displacement of the munition inside the barrel or the like, can have a net effect on the previously described prescribed duration t of the prescribed (firing) acceleration threshold.

It is also appreciated by those skilled in the art that in certain munitions applications, the munitions are subjected to significant spin accelerations as well as setback acceleration during launch. In addition, while the inertial igniter is in the process of initiating its percussion primer, i.e., during the previously indicated duration t of the prescribed (firing setback in munitions) acceleration threshold, the munition may have gained a considerable spin velocity. It is appreciated that as can be observed, for example in the schematic of FIG. 9A, since the delay mechanism mass 69 displaces laterally relative to the spin axis of the munition to which it is attached (which is parallel to the direction of acceleration shown by the arrow 56), therefore the delay mechanism mass 69 would be subjected to a varying centrifugal force, which would affect its oscillation period T, equation (2), thereby the intended duration t that the inertial igniter is to be subjected to the prescribed (setback) acceleration threshold to release the inertial igniter striker mass member 58.

It is appreciated that for such applications, the inertial igniter (and the related electrical impulse switches) must be configured to be essentially insensitive to lateral and spin accelerations and spin velocity.

It is also appreciated by those skilled in the art that the effect of such short lateral acceleration and deceleration pulses with no net displacement is generally negligible when the previously indicated duration t of the prescribed (firing setback in munitions) acceleration threshold is long as compared to the duration of the lateral acceleration and deceleration pulses, for example, tens of milliseconds of duration t for the prescribed acceleration threshold as compare to tens of microseconds for the lateral acceleration and deceleration pulses.

In applications in which the effect of lateral acceleration and deceleration pulses and/or spin acceleration and/or spin rate during the inertial igniter initiation process as a result of the applied prescribed acceleration threshold for the prescribed duration is not negligible, then the inertial igniter mechanisms must be configured such that they are not sensitive to the effects and can reliably operate in such environments.

It is appreciated that can be seen in the above inertial igniter embodiments; the inertial igniters are constructed by the following two relatively independently operating mechanisms.

The first mechanism, referred to as the mechanical delay mechanism, is configured to actuate certain member, in this case a member that would release the inertial igniter striker mass when the mechanical delay mechanism is subjected to the prescribed acceleration threshold (firing setback acceleration for munitions) that persists for the prescribed duration (all-fire condition for munitions), and resetting to its initial configuration if the prescribed acceleration threshold and/or its prescribed duration conditions are not met. For example, in the inertial igniter embodiment 50 of FIG. 9A, the assembly of the mass member 69 with the link 73 and the spring 72 and the actuating mass 52 and its spring member 57 provide the mechanical delay mechanism for this inertial ignite embodiment.

The second mechanism, referred to as the striker mechanism, consists of a mass element with a preloaded spring (elastic) element (for example, striker mass 58 and preloaded compression spring 60 in the embodiment 50 of FIG. 9A) with the required amount of stored potential energy to accelerate the striker mass to the required velocity to achieve reliable percussion cap or pyrotechnic material initiation upon impact. The striker mass is provided with a release mechanism (member striker mass release member 63 in the embodiment 50 of FIG. 9A), which is actuated by the mechanical delay mechanism upon detection of the prescribed acceleration threshold and its duration condition.

In the following embodiments, mechanical delay mechanism configurations are provided that are insensitive to the previously described lateral acceleration and deceleration pulses, spin accelerations and spin velocity. It is appreciated that the spin is intended to indicate rotation about the direction of acceleration that is to be detected by the inertial igniter for initiation (direction of the firing acceleration in munitions) and lateral directions are normal to the direction of acceleration.

Figure 17:
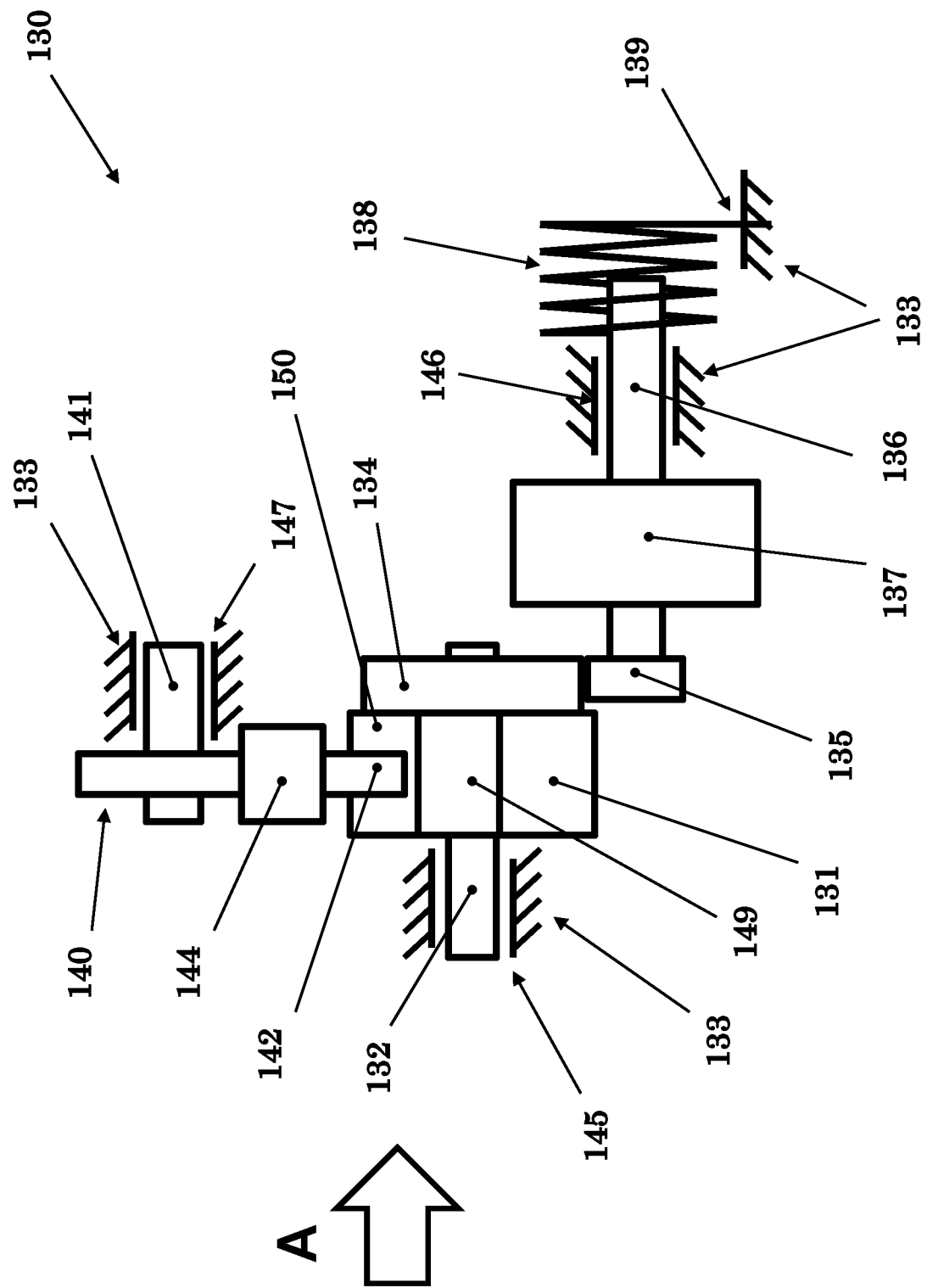
FIG. 17 illustrates the schematic of the lateral and spin acceleration and spin velocity insensitive mechanical delay mechanism embodiment for use in inertial igniters.

FIG. 17 shows the top view (the direction of acceleration that is to be detected by the inertial igniter for initiation being perpendicular to the view of FIG. 17 and outward) of the mechanical delay mechanism embodiment 130, which is configured to be insensitive to the aforementioned lateral and spin accelerations and spin velocity. The frontal view "A", FIG. 17, of the mechanical delay mechanism 130 is shown in the schematic of FIG. 18A.

As can be seen in the schematic of FIG. 17, the mechanical delay mechanism embodiment 130 of the inertial igniter consists of a wheel 131, which is fixedly attached to the shaft 132, which is free to rotate in the bearing 145 that is provided in the body of the inertial igniter 133 (shown as ground). Fixedly also attached to the shaft 132 is the gear 134, which is engaged with the pinion 135. The pinion 135 is fixedly attached to the shaft 136, which is free to rotate in the bearing 146 that is provided in the body of the inertial igniter 133. A wheel 137 is also fixedly attached to the shaft 136 as can be seen in the schematic of FIG. 17. A provided torsion spring 138 is connected on one end to the shaft 136 and on the other end 139 to the body of the inertial igniter 133.

Figure 18A:
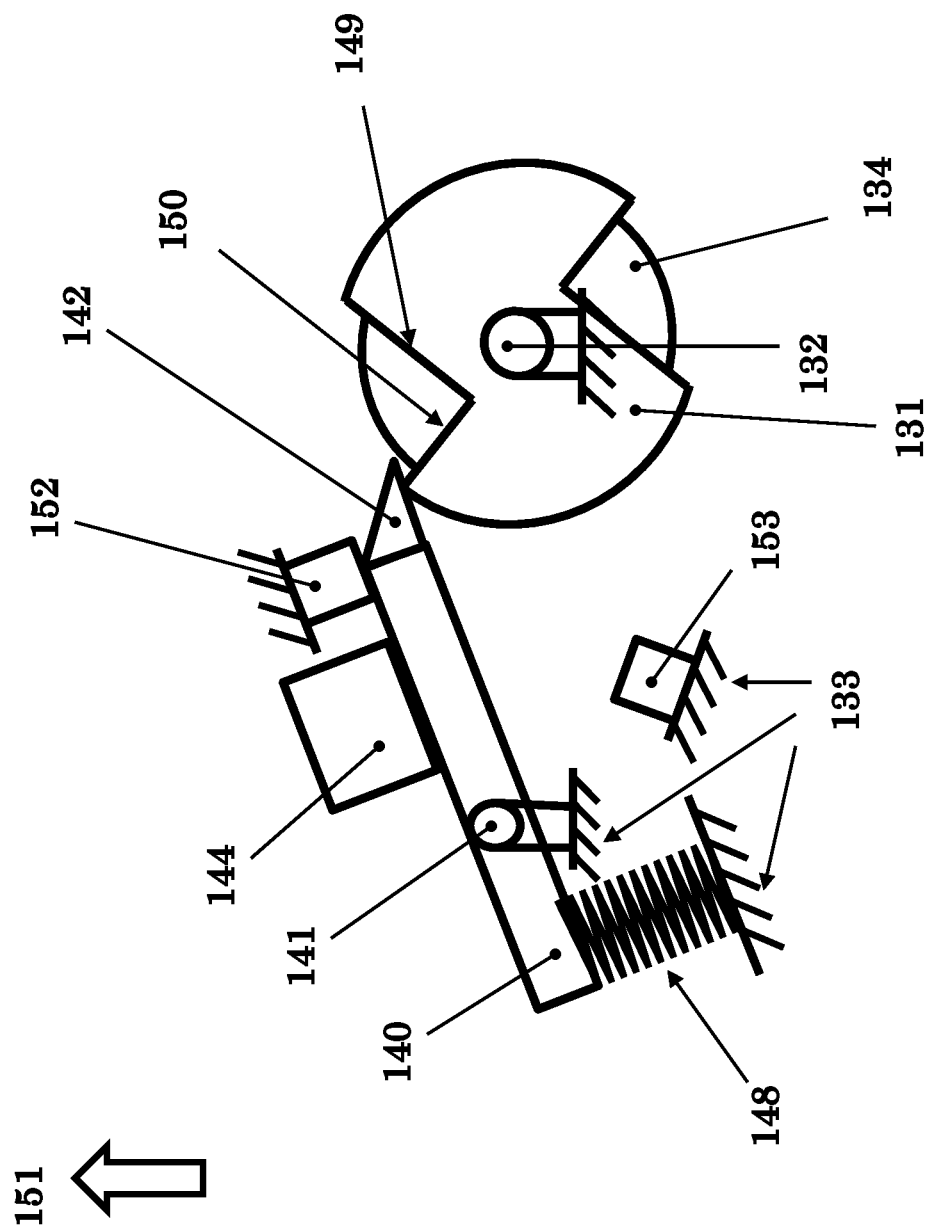
FIG. 18A illustrates the frontal view "A" of the lateral and spin acceleration and spin velocity insensitive mechanical delay mechanism embodiment of FIG. 17.

The mechanical delay mechanism embodiment 130 is also provided with a link member 140, FIGS. 17 and 18A, which is fixedly attached to the shaft 141, which is free to rotate in the bearing 147 that is provided in the body of the inertial igniter 133. A mass member 144 is provided on the link 140, which in practice would be integral to the link 140 structure, to shift the center of mass of the link 140 towards the wheel 131.

The frontal view "A" of FIG. 17 is shown in FIG. 18A. In the schematic of FIG. 17 and the front view 18A, the mechanical delay mechanism embodiment 130 is shown in its normal conditions, i.e., in the configuration before the inertial igniter being subjected to the previously described prescribed activation acceleration profile.

In the frontal view "A" of FIG. 18A, the pinion 135 and its connected components are not shown. As can be seen, the wheel 131 is provided with symmetric cuts with sides 149 and 150. The reason for providing such symmetric cuts is to ensure that the center of mass of the wheel 131 is located at the center of the shaft 132. The link member 140 is also provided with a slightly preloaded tensile spring 148 to bias the link against the stop 152, which is provided on the body 133 of the mechanical delay mechanism 130. In the normal configuration of the mechanical delay mechanism, the tensile spring 148 is preloaded to keep the link member against the stop 152 and its tip 142 over the surface 150 of the cut in the wheel 131 as shown in FIG. 18A. The tensile spring 148 is usually preloaded such that the acceleration in the direction of the arrow 151 of a few G (e.g., 2-3 G for a prescribed acceleration threshold of 20-30 G), would not generate enough downward force due to the mass member 144 and off-center mass of the link member 140 to rotate the link member in the clockwise direction as viewed in FIG. 18A.

In the schematic of FIG. 18A, the preloaded tensile spring 148 is used to bias the link 140 against the stop 152 and prevent its rotation for relatively low G accelerations in the direction of the arrow 151. It is appreciated that a similarly preloaded compressive spring may also be used and positioned on the opposite side of the link 140 to perform the same function. It is also appreciated that a preloaded torsion spring (not shown), positioned over the shaft 141 of the link 140, one end of which being attached to the mechanical delay mechanism body 133 and the other end being attached to the link 140 (similar to the torsion spring 138, FIG. 17) may also be used instead of the preloaded tensile spring 148.

The mechanical delay mechanism 130 of FIGS. 17 and 18A operates as follows. In normal conditions, the link 140 is held in the position shown in FIG. 18A by the preloaded tensile spring 148 and its tip 142 is over the edge 150 of the provided cut in the wheel 131 as can be seen in FIG. 18A. The wheel 131 is also held in the position shown in FIG. 18A by the torsion spring 138 via the gear 134 and pinion 135, in which position, the torsion spring is in its free unloaded configuration.

Then when the device to which the inertial igniter using the mechanical delay mechanism of FIG. 17 is attached is accelerated in the direction of the arrow 151, FIG. 18A, if the acceleration is high enough to overcome the tensile spring 148 preload, then the downward force due to the mass member 144 and the link 140 would result in a clockwise torque that tends to rotate the link 140 in the clockwise direction. Then as the link 140 begins to rotate in the clockwise direction, its tip 142 begins to apply a downward force as viewed in the schematic of FIG. 18A, which would tend to rotate the wheel 131 in the counterclockwise direction. The counterclockwise rotation of the wheel 131 is then transmitted to the pinion 135, rotating the shaft 136 an increased amount indicated by the ratio of the number of teeth on the gear 134 and the number of teeth on the pinion 135. The rotation of the shaft 136 will then results in winding of the torsion spring 138 and storing mechanical potential energy in the torsion spring.

Now if the acceleration in the direction of the arrow 151 continues and stays above the previously described prescribed threshold (all-fire acceleration level in munitions), then the link 140 will keep rotating in the clockwise direction, thereby keep on rotating the wheel 131 in the counterclockwise direction as shown in FIG. 18B, thereby further winding the torsion spring 138 and storing more mechanical potential energy in the torsion spring 138.

Now if the acceleration in the direction of the arrow 151 continues and stays above the previously described prescribed threshold (all-fire condition in munitions) long enough, then the link 140 will keep rotating in the clockwise direction and thereby rotating the wheel 131 in the counterclockwise direction until its tip 154 clears the tip 155 of the edge 150 of the cut in the wheel 131 as shown in the schematic of FIG. 18C. Otherwise, the tension spring 148 and the torsion spring 138 would force the link 140 and wheel 131 to return to their initial positioning of FIG. 18A.

Then if the acceleration in the direction of the arrow 151 continues and stays above the previously described prescribed threshold, the link 140 will stay down against the stop 153 as shown in FIG. 18C and the wheels 131 and 137 as coupled with the gear 134 and pinion 135 with their equivalent moment of inertia $I_{eq}$ and the torsion spring 138, forming a torsional vibration system, would undergo its oscillatory rotations.

It is appreciated by those skilled in the art that at the time of disengagement between the tip 154 of the link 140 and the tip 155 of the wheel 131, FIG. 18C, the wheel 131 has gained some rotational velocity and would therefore continue to rotate in the counterclockwise direction until the corresponding kinetic energy stored in the equivalent moment of inertia $I_{eq}$ of the mechanical delay mechanism has been converted to mechanical potential energy that is stored in the torsion spring 138. It is also appreciated that here and in the following descriptions of the operation of the mechanical delay mechanism embodiment 130 of FIG. 17 and for the sake of simplicity, the mechanical energy losses due to friction and other sources are going to be neglected.

During this oscillatory motion, assuming that the wheel 131 has come to a stop from its counterclockwise rotation in the position shown in FIG. 18C, the wheel 131 is accelerated rotationally in the clockwise direction as viewed in FIG. 18C until the torsion spring has transferred its entire stored mechanical potential energy to the wheels 131 and 137 assembly as mechanical kinetic energy, which neglecting friction and other losses, would take one quarter of the period of oscillation of the present oscillatory motion. At this point, the wheel 131 has reached its maximum clockwise rotational velocity. From this point on, the clockwise rotation of the wheel 131 is decelerated while the mechanical kinetic energy stored in the wheels 131 and 137 assembly is returned to the torsion spring 138 as mechanical potential energy, ending half the period of the system oscillatory motion, at which time the wheel 131 comes to a stop. The wheel 131 will then begin to rotate in the counterclockwise direction, similarly, reach its maximum rotational velocity after a quarter of the period of the system oscillation and comes to a stop at its initial position of FIG. 18C after completing one full cycle of the torsional system oscillation, during the corresponding period of the oscillatory motion.

It is appreciated by those skilled in the art that as is described above, as the wheel 131 is released as shown in the schematic of FIG. 18C, it starts rotating in the clockwise direction, passes its initial stationary position shown in FIG.

Figure 18D:
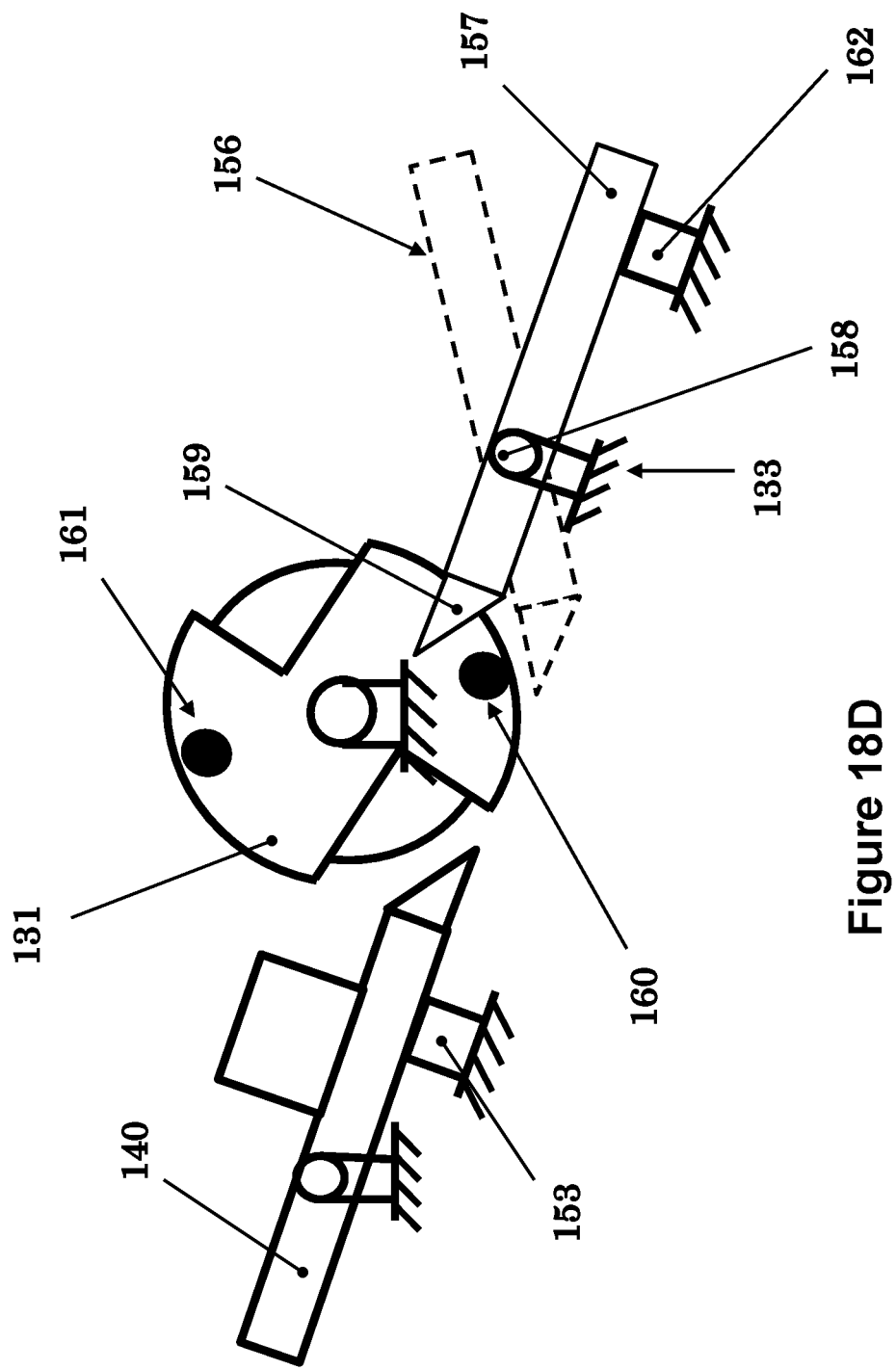
FIG. 18D illustrates the frontal view "A" of the lateral and spin acceleration and spin velocity insensitive mechanical delay mechanism embodiment of FIG. 17 used to actuate a striker release lever of an inertial igniter.

18A, and neglecting friction and other losses, would further rotate in the clockwise direction the same amount as shown in FIG. 18D, completing half of its cycle of oscillation in half the period of its oscillatory motion. Now as the wheel 131 is rotating in the clockwise direction, at some point the outward protruding member 160 (shown only in the schematic of FIG. 18D) engages the tip 159 of the link 157 and rotates it in the counterclockwise direction to the position shown by dashed lines and indicated by the numeral 156.

The link 157 is attached to the body 133 of the inertial igniter that is using the present mechanical delay mechanism 130 by the rotary joint 158. The link 157 is also provided with a preloaded torsion spring (not shown) at the joint 158, one end of which is attached to the link 157 and the other to the device body 133 and is used to keep the link 157 biased against the stop 162.

It is appreciated by those skilled in the art that the wheels 131 and 137 together with their geared transmission with an equivalent moment of inertial $I_{eq}$ together with the torsion spring 138, with spring constant $k_T$, form a mass-spring torsional vibration system vibrating at a natural frequency of $$\omega = \sqrt{\frac{k_T}{I_{eq}}} \quad (3)$$

where ω (radian/second) is the natural frequency of vibration of the torsional vibration system. The period T of each cycle of vibration (oscillation) of the torsional vibration system is then given as $$T = \frac{2\pi}{\omega} \text{ seconds} \quad (4)$$

It is appreciated by those skilled in the art that as can be seen in the schematic of FIG. 18D, which is shown after to torsional vibration system has gone through half of its cycle of oscillation, i.e., at half its period of oscillation T, equation (4), from the point at which the wheel 131 has come to a stop following its release, FIG. 18C. Now as can be seen in FIG. 18D, the link 157 is rotated to its position 156 before the wheel reaching its position of FIG. 18D, i.e., before half the period of oscillation T has elapsed, therefore it is concluded that from the time that the wheel 131 has come to a stop following its release, FIG. 18C, to the time of full rotation of the link 157, the total time t that has elapsed is t <T/2.

It is appreciated by those skilled in the art that the lever 157 can be used in any inertial igniter with preloaded spring (elastic element) striker mechanism for its release and initiation of the provided percussion primer or other provided pyrotechnic material, such as to serve as the striker mass release member 63 in the inertial igniter 50 of FIG. 9A, for releasing the striker mass 58 to ignite the percussion primer 68.

It is also appreciated by those skilled in the art that the method used in the inertial igniter 50 of FIG. 9A to increase the delay mechanism time t above half period T of oscillation of the torsional vibration system may also be used with the mechanical delay mechanism 130 of FIG. 17 by modifying the lever 157, FIG. 18D. Such a modified configuration of the lever 157 together with the mechanical delay mechanism 130 of FIG. 17 is shown in the schematic of FIG. 18E.

Figure 18E:
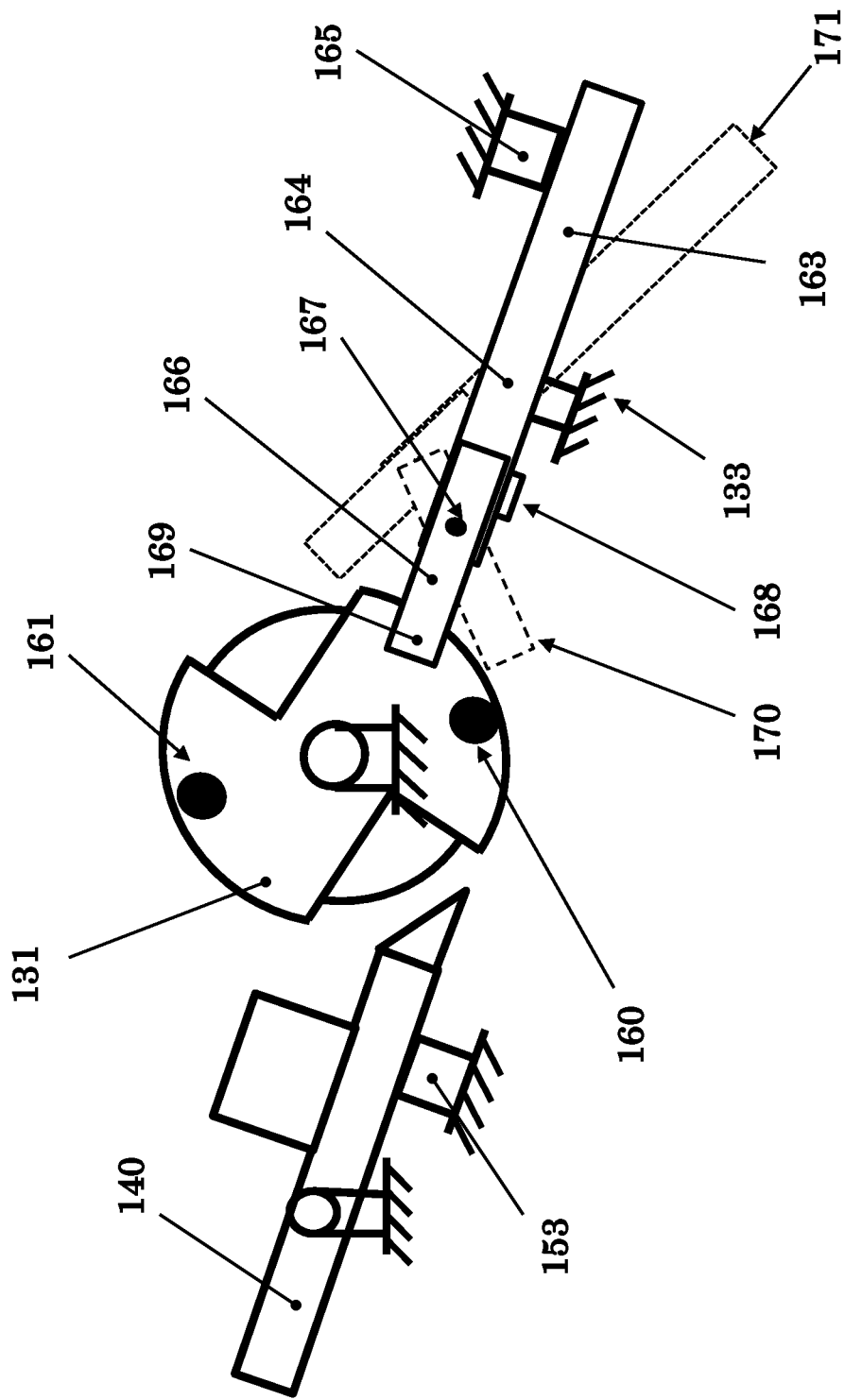
FIG. 18E illustrates the frontal view "A" of the lateral and spin acceleration and spin velocity insensitive mechanical delay mechanism embodiment of FIG. 17 with a modified release lever of FIG. 18D to increase the mechanism delay time.

In the modified release link configuration of FIG. 18E, the release link 163 (157 in FIG. 18D) is similarly attached to the body 133 of the inertial igniter that is using the present mechanical delay mechanism 130 by the rotary joint 164. The link 163 is also provided with a preloaded torsion spring (not shown) at the joint 164, one end of which is attached to the link 163 and the other to the device body 133 and is used to keep the link 163 biased against the stop 165.

The release link 163 is also provided with an engagement link 166, which is attached to the link 163 by the rotary joint 167. The engagement link 166 is free to rotate relative to the release link 163 but is provided with a lightly preloaded torsion spring (not shown) at the joint 167, one end of which is attached to the link 163 and the other to the engagement link 166 and is used to keep the link 166 biased against the stop 168, which is fixedly attached to the release link 163.

It is appreciated by those skilled in the art that as it was previously described, as the wheel 131 is released as shown in the schematic of FIG. 18C, it starts rotating in the clockwise direction, passes its initial stationary position shown in FIG. 18A, and neglecting friction and other losses, would further rotate in the clockwise direction the same amount as shown in FIG. 18D, completing half of its cycle of oscillation in half the period of its oscillatory motion. Now as the wheel 131 is rotating in the clockwise direction, as shown in FIG. 18E, at some point the outward protruding member 160 (shown only in the schematic of FIGS. 18D and 18E) engages the tip 169 of the engagement link 166 and begins to rotate it in the counterclockwise direction relative to the release link 163. It is appreciated that since the link 163 is prevented from rotating in the counterclockwise direction by the stop 165, the engagement link 166 is rotated in the counterclockwise direction relative to the release link 163 until it is rotated out of the path of the outward protruding member 160 as shown by the dashed lines and indicated by the numeral 170. The aforementioned provided lightly preloaded torsion spring (not shown) at the joint 167 would then return the engagement link 166 to its positioning against the stop 168 and the wheel 131 would continue to rotate in the clockwise direction until it is brought to a stop by the winding torsion spring 138, FIGS. 18E and 17, at which time half the period T of oscillation of the torsional vibration system has elapsed.

The wheel 131 will then begin to rotate in the counterclockwise direction by the torsion spring 138 until the outward protruding member 160 engages the lower section of the tip 169 of the engagement link 169 (as viewed in FIG. 18E), and begin to rotate the release link 163 in the clockwise direction and cause the release of an engaging striker mechanism as was described for the mechanism of FIG. 18D, once the release link 163 is rotated the required amount, such as shown by the dashed lines and indicated by the numeral 171. In general, the inertial igniter is configured such that after the release link 163 is rotated some amount further, the outward protruding member 160 is disengages the tip 169 of the engagement link 166 and continue its counterclockwise rotation.

It is appreciated that the aforementioned total time t that has elapsed, i.e., the delay time t, from the time of wheel 131 release shown in FIG. 18C to the time of clockwise rotation of the striker release link 163 become larger than half the period of oscillation T, i.e., the total delay time becomes t>T/2.

Now as can be seen in FIG. 18E, the link 157 is rotated to its position 156 before the wheel reaching its position of FIG. 18D, i.e., before half the period of oscillation T has elapsed, therefore it is concluded that from the time that the wheel 131 has come to a stop following its release, FIG. 18C, to the time of full rotation of the link 157, the total time t that has elapsed is t<T/2.

It is also appreciated that if the duration of acceleration in the direction of the arrow 151 is short, then the preloaded spring 148 would return the link 140 to its normal condition shown in FIG. 18A.

It is appreciated by those skilled in the art that many munitions are subjected to high spin rates during the firing (in the direction of the arrow 151, FIG. 18A) and for that reason, the mechanical delay mechanism of FIG. 17 is suitable for the configuration of such inertial igniters since their operation is not affected by spin acceleration and spin velocity.

In addition, since the center of mass of the wheels 131 and 137 and the gears 134 and 135 lies on the axes of rotation of the shafts 132 and 136, and by ensuring that the center of mass of the link 140 and mass 144 also lies in a plane perpendicular to the direction of the arrow 151 and containing the axis of rotation of the joint 141, then any lateral shock loading of the mechanical delay mechanism 130 of FIG. 17 would not cause in counterclockwise rotation of the wheel 131. Therefore, the mechanical delay mechanism 130 can be used in the configuration of inertial igniters that can withstand high G lateral shock loadings and high spin acceleration and spin rates.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An inertial mechanism comprising:
   an activating mechanism; and
   a time delay mechanism coupled to the activating mechanism for delaying a time in which the activating mechanism is activated after a predetermined acceleration profile occurs;
   the activating mechanism comprising:
   a first mass body movable between a first position and a second position, the first mass body having a first surface and a second surface;
   a first biasing member for biasing the first mass body in the first position;
   a second mass body movable between a third position corresponding to the first position of the first mass body and a fourth position corresponding to the second position of the first mass body, the second mass body having a third surface and a fourth surface engaged with the first surface of the first mass body when the second mass body is in the third position; and
   a second biasing member for biasing the second mass body in the third position; and
   the time delay mechanism comprising:
   a third mass body movable in a direction of acceleration, the third mass body having a fifth surface;
   a fourth mass body having a sixth surface for engaging with the fifth surface of the third mass body when the third mass body moves from a fifth position to a sixth position upon occurrence of the predetermined acceleration profile, the forth mass body having a seventh surface engaging with the third surface of the second mass body to activate the activating mechanism after a time delay; and
   a third biasing member for biasing the seventh surface towards engagement with the third surface;
   wherein the fifth and sixth surfaces are configured such that the fifth surface engaging with the sixth surface upon the occurrence of the predetermined acceleration profile causes the seventh surface to initially move away from engagement with the third surface before moving the seventh surface to engage with the third surface after the time delay; and
   the second surface of the first mass body is configured to one of:
   ignite a pyrotechnic upon occurrence of the predetermined acceleration profile; or
   one of open or close an electrical circuit upon occurrence of the predetermined acceleration profile.

2. The inertial mechanism of claim 1, wherein the time delay mechanism is configured to undergo an oscillatory movement during the time delay.

3. The inertial mechanism of claim 1, wherein:
   the first mass body and the second mass body move in rotation; and
   the third mass body and the fourth mass body move in translation.

4. The inertial mechanism of claim 1, wherein one or more of the first, second and third biasing members are springs.

5. The inertial mechanism of claim 1, wherein the first mass body further having an eighth surface, wherein:
   one of the second surface and the eighth surface of the first mass body is configured to ignite a pyrotechnic upon occurrence of the predetermined acceleration profile; and
   the other of the second surface and the eighth surface of the first mass body is configured to one of open or close an electrical circuit upon occurrence of the predetermined acceleration profile.

6. The inertial mechanism of claim 1, wherein:
   the sixth surface of the fourth mass body is configured to be movable between a seventh position into engagement with the third surface of the second mass body and a eighth position out of engagement with the third surface of the second mass body;
   the sixth surface being biased into the eighth position and movable into the seventh position upon occurrence of the predetermined acceleration profile.

7. The inertial mechanism of claim 1, wherein:
   the third surface of the second mass body is configured to be movable between a seventh position into engagement with the sixth surface of the fourth mass body and a eighth position out of engagement with the sixth surface of the fourth mass body;
   the third surface being biased into the eighth position and movable into the seventh position upon occurrence of the predetermined acceleration profile.

8. The inertial mechanism of claim 1, wherein:
   the sixth surface the fourth mass body is configured to be movable between a seventh position into engagement with the third surface of the second mass body and a eighth position out of engagement with the third surface of the second mass body;
   the sixth surface having a first sub-surface and a second sub-surface opposing the first sub-surface;
   the third surface having a third sub-surface and a fourth sub-surface opposing the third sub-surface, the first sub surface facing the third sub surface in a biasing direction in which the fourth mass body moves under a biasing force of the third biasing member; and the first sub-surface of the sixth surface contacting the third sub surface of the third surface to activate the activating mechanism upon the occurrence of the pre-determined acceleration profile when the third mass body moves in the biasing direction of the third biasing member.

9. The inertial mechanism of claim 1, wherein:

the sixth surface the fourth mass body is configured to be movable between a seventh position into engagement with the third surface of the second mass body and a eighth position out of engagement with the third surface of the second mass body;

the sixth surface having a first sub-surface and a second sub-surface opposing the first sub-surface;

the third surface having a third sub-surface and a fourth sub-surface opposing the third sub-surface, the second sub surface opposing the fourth sub surface in a biasing direction in which the fourth mass body moves under a biasing force of the third biasing member; and the second sub-surface of the sixth surface contacting the fourth sub surface of the third surface to activate the activating mechanism upon the occurrence of the pre-determined acceleration profile when the third mass body moves in a direction opposing the biasing direction of the third biasing member.

\* \* \* \* \*